United States Patent
Hanhart et al.

(10) Patent No.: US 12,445,646 B2
(45) Date of Patent: Oct. 14, 2025

(54) 360-DEGREE VIDEO CODING USING FACE CONTINUITIES

(71) Applicant: Interdigital VC Holdings, Inc., Wilmington, DE (US)

(72) Inventors: Philippe Hanhart, La Conversion (CH); Yuwen He, San Diego, CA (US); Yan Ye, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/650,518

(22) Filed: Apr. 30, 2024

(65) Prior Publication Data

US 2024/0283973 A1    Aug. 22, 2024

Related U.S. Application Data

(63) Continuation of application No. 16/603,991, filed as application No. PCT/US2018/026828 on Apr. 10, 2018, now abandoned.

(Continued)

(51) Int. Cl.
  *H04N 19/167*  (2014.01)
  *H04N 19/105*  (2014.01)
  (Continued)

(52) U.S. Cl.
  CPC ......... *H04N 19/597* (2014.11); *H04N 19/105* (2014.11); *H04N 19/117* (2014.11);
  (Continued)

(58) Field of Classification Search
  CPC .. H04N 19/597; H04N 19/105; H04N 19/117; H04N 19/174; H04N 19/593;
  (Continued)

(56) References Cited

U.S. PATENT DOCUMENTS 8,805,100 B2 *   8/2014   Ikai ................. H04N 19/70
                                              382/233
8,861,617 B2 *  10/2014   Chen ............... H04N 19/147
                                              375/240.26
(Continued)

FOREIGN PATENT DOCUMENTS

CN    102509350 A    6/2012
CN    102804776 A   11/2012
(Continued)

OTHER PUBLICATIONS

"VR Coaster", Available at <http://www.vrcoaster.com/>, 2014, pp. 1-7.

(Continued)

*Primary Examiner* — Philip P. Dang
(74) *Attorney, Agent, or Firm* — Condo Roccia Koptiw LLP

(57) ABSTRACT

A coding device (e.g., that may be or may include encoder and/or decoder) may receive a frame-packed picture of 360-degree video. The coding device may identify a face in the frame-packed picture that the current block belongs to. The coding device may determine that a current block is located at a boundary of the face that the current block belongs to. The coding device may identify multiple spherical neighboring blocks of the current block. The coding device may identify a cross-face boundary neighboring block. The coding device may identify a block in the frame-packed picture that corresponds to the cross-face boundary neighboring block. The coding device may determine whether to use the identified block to code the current block based on availability of the identified block. The coding device may code the current block based on the determination to use the identified block.

16 Claims, 45 Drawing Sheets

Related U.S. Application Data

(60) Provisional application No. 62/525,880, filed on Jun. 28, 2017, provisional application No. 62/484,218, filed on Apr. 11, 2017.

(51) Int. Cl.
*H04N 19/117* (2014.01)
*H04N 19/174* (2014.01)
*H04N 19/593* (2014.01)
*H04N 19/597* (2014.01)
*H04N 19/61* (2014.01)

(52) U.S. Cl.
CPC ......... *H04N 19/174* (2014.11); *H04N 19/593* (2014.11); *H04N 19/61* (2014.11)

(58) Field of Classification Search
CPC ...... H04N 19/61; H04N 19/167; H04N 19/52; H04N 19/176
See application file for complete search history.

(56) References Cited

U.S. PATENT DOCUMENTS

| | | | | |
|---|---|---|---|---|
| 9,077,998 B2* | 7/2015 | Wang | ................... | H04N 19/176 |
| 9,124,895 B2* | 9/2015 | Wang | ................... | H04N 19/13 |
| 9,237,359 B2* | 1/2016 | Huang | ................... | H04N 19/865 |
| 9,264,739 B2* | 2/2016 | Park | ................... | H04N 19/60 |
| 9,270,990 B2* | 2/2016 | Lee | ................... | H04N 19/82 |
| 9,369,708 B2* | 6/2016 | Zhang | ................... | H04N 19/70 |
| 9,473,784 B2* | 10/2016 | Mody | ................... | H04N 19/436 |
| 9,503,702 B2* | 11/2016 | Chen | ................... | H04N 13/161 |
| 9,510,021 B2* | 11/2016 | Cho | ................... | H04N 19/86 |
| 9,516,306 B2* | 12/2016 | Zhang | ................... | H04N 19/593 |
| 9,628,822 B2* | 4/2017 | Leontaris | ................... | H04N 19/182 |
| 9,706,230 B2* | 7/2017 | Sharman | ................... | H04N 19/91 |
| 9,723,331 B2* | 8/2017 | Van der Auwera | .. | H04N 19/174 |
| 9,736,454 B2* | 8/2017 | Hannuksela | ................... | H04N 19/597 |
| 9,736,488 B2* | 8/2017 | Hoang | ................... | H04N 19/96 |
| 9,774,870 B2* | 9/2017 | Sasai | ................... | H04N 19/70 |
| 9,854,252 B2* | 12/2017 | Mody | ................... | H04N 19/86 |
| 9,912,966 B2* | 3/2018 | Hannuksela | ................... | H04N 19/44 |
| 9,942,557 B2* | 4/2018 | Carmel | ................... | H04N 19/176 |
| 9,998,737 B2 | 6/2018 | Fu et al. | | |
| 10,038,919 B2* | 7/2018 | Zhai | ................... | H04N 19/82 |
| 10,057,570 B2* | 8/2018 | Ye | ................... | H04N 19/105 |
| 10,091,519 B2* | 10/2018 | Kang | ................... | H04N 19/30 |
| 10,097,844 B2* | 10/2018 | Saunders | ................... | H04N 19/33 |
| 10,104,386 B2* | 10/2018 | Suehring | ................... | H04N 19/12 |
| 10,136,150 B2* | 11/2018 | Ugur | ................... | H04N 19/51 |
| 10,154,274 B2* | 12/2018 | Lainema | ................... | H04N 19/70 |
| 10,205,950 B2* | 2/2019 | Terada | ................... | H04N 19/436 |
| 10,225,567 B2* | 3/2019 | Yamamoto | ................... | H04N 19/172 |
| 10,242,714 B2* | 3/2019 | Roy | ................... | H04N 21/440218 |
| 10,244,200 B2* | 3/2019 | Wozniak | ................... | H04N 19/597 |
| 10,244,215 B2* | 3/2019 | Wozniak | ................... | G06T 3/073 |
| 10,244,257 B2* | 3/2019 | Hannuksela | ................... | H04N 19/70 |
| 10,244,265 B2* | 3/2019 | Norkin | ................... | H04N 19/146 |
| 10,250,897 B2* | 4/2019 | Deshpande | ................... | H04N 19/44 |
| 10,306,246 B2* | 5/2019 | Chao | ................... | H04N 19/12 |
| 10,389,999 B2* | 8/2019 | Wang | ................... | H04N 13/189 |
| 10,397,615 B2* | 8/2019 | Norkin | ................... | H04N 19/167 |
| 10,432,928 B2* | 10/2019 | Li | ................... | H04N 19/105 |
| 10,499,382 B2* | 12/2019 | Dinan | ................... | H04W 72/044 |
| 10,511,843 B2* | 12/2019 | Fu | ................... | H04N 19/176 |
| 10,523,954 B2* | 12/2019 | Suehring | ................... | H04N 19/166 |
| 10,531,111 B2* | 1/2020 | Li | ................... | H04N 19/23 |
| 10,575,021 B2* | 2/2020 | Norkin | ................... | H04N 19/119 |
| 10,616,573 B2* | 4/2020 | Ugur | ................... | H04N 19/70 |
| 10,743,034 B2* | 8/2020 | Xu | ................... | H04N 19/86 |
| 10,750,170 B2* | 8/2020 | Kim | ................... | H04N 19/176 |
| 10,863,182 B2* | 12/2020 | Hannuksela | ................... | H04N 19/176 |
| 10,880,535 B2 | 12/2020 | Oh et al. | | |
| 11,153,562 B2* | 10/2021 | Zhang | ................... | H04N 19/154 |
| 11,172,208 B2* | 11/2021 | Curcio | ................... | H04N 13/332 |
| 11,290,751 B2* | 3/2022 | Gamei | ................... | H04N 19/91 |
| 11,323,723 B2* | 5/2022 | Hannuksela | ......... | H04N 19/105 |
| 11,418,816 B2 | 8/2022 | Hanhart et al. | | |
| 2006/0268985 A1* | 11/2006 | Liang | ................... | H04N 19/117 348/415.1 |
| 2013/0101031 A1 | 4/2013 | Van der Auwera et al. | | |
| 2013/0107973 A1* | 5/2013 | Wang | ................... | H04N 19/82 375/E7.193 |
| 2013/0272624 A1 | 10/2013 | Budagavi | | |
| 2013/0322253 A1 | 12/2013 | Jain et al. | | |
| 2013/0322523 A1 | 12/2013 | Huang et al. | | |
| 2014/0078249 A1* | 3/2014 | Wang | ................... | H04N 19/70 348/43 |
| 2014/0168362 A1 | 6/2014 | Hannuksela et al. | | |
| 2014/0282678 A1* | 9/2014 | Rodriguez | ......... | H04N 21/4882 725/32 |
| 2014/0286396 A1 | 9/2014 | Lee et al. | | |
| 2014/0328413 A1* | 11/2014 | Esenlik | ................... | H04N 19/61 375/240.29 |
| 2015/0003525 A1* | 1/2015 | Sasai | ................... | H04N 19/117 375/240.12 |
| 2015/0016503 A1* | 1/2015 | Rapaka | ................ | H04N 19/436 375/240.02 |
| 2015/0016506 A1 | 1/2015 | Fu et al. | | |
| 2015/0016543 A1 | 1/2015 | Rapaka et al. | | |
| 2015/0264404 A1* | 9/2015 | Hannuksela | ........... | H04N 19/30 375/240.16 |
| 2015/0271487 A1 | 9/2015 | Li et al. | | |
| 2015/0271515 A1* | 9/2015 | Pang | ................... | H04N 19/70 375/240.16 |
| 2015/0326886 A1* | 11/2015 | Chen | ................... | H04N 19/436 375/240.02 |
| 2016/0012855 A1 | 1/2016 | Krishnan | | |
| 2016/0112704 A1 | 4/2016 | Converse et al. | | |
| 2016/0165248 A1 | 6/2016 | Lainema et al. | | |
| 2016/0268599 A1 | 9/2016 | Damen et al. | | |
| 2017/0272758 A1 | 9/2017 | Lin et al. | | |
| 2017/0347109 A1 | 11/2017 | Hendry et al. | | |
| 2017/0366808 A1 | 12/2017 | Lin et al. | | |
| 2018/0054613 A1 | 2/2018 | Lin et al. | | |
| 2018/0192074 A1 | 7/2018 | Shih et al. | | |
| 2019/0200023 A1 | 6/2019 | Hanhart et al. | | |
| 2019/0260990 A1 | 8/2019 | Lim et al. | | |
| 2019/0268599 A1* | 8/2019 | Hannuksela | ........... | G03B 37/00 |
| 2020/0322632 A1 | 10/2020 | Hanhart et al. | | |

FOREIGN PATENT DOCUMENTS

| | | | |
|---|---|---|---|
| CN | 103518375 A | 1/2014 | |
| CN | 103947213 A | 7/2014 | |
| CN | 104702963 A | 6/2015 | |
| CN | 105049845 A | 11/2015 | |
| CN | 105580373 A | 5/2016 | |
| EP | 3 025 501 A1 | 6/2016 | |
| EP | 3 301 914 A1 | 4/2018 | |
| GB | 2555788 | * 11/2016 | ............. H04N 19/50 |
| GB | 2 555 788 A | 5/2018 | |
| JP | 2014-171227 A | 9/2014 | |
| JP | 2016-529782 A | 9/2016 | |
| KR | 10-2014-0085541 A | 7/2014 | |
| KR | 10-2016-0034998 A | 3/2016 | |
| KR | 10-2018-0042098 A | 4/2018 | |
| WO | 2012/119784 A1 | 9/2012 | |
| WO | 2013/063455 A1 | 5/2013 | |
| WO | 2013/155897 A1 | 10/2013 | |
| WO | 2016/010668 A1 | 1/2016 | |
| WO | 2016/064862 A1 | 4/2016 | |
| WO | 2017/051072 A1 | 3/2017 | |
| WO | 2017/142353 A1 | 8/2017 | |
| WO | 2018/009746 A1 | 1/2018 | |
| WO | 2018/170279 A1 | 9/2018 | |
| WO | 2018/191224 A1 | 10/2018 | |

OTHER PUBLICATIONS

360Lib, Available at <https://jvet.hhi.fraunhofer.de/svn/svn_360Lib/>, 1 page.

(56) References Cited

OTHER PUBLICATIONS

Abbas, et al., "AHG8: New GoPro Test Sequences for Virtual Reality Video Coding", JVET-D0026, GoPro, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.
Abbas, et al., "AHG8: New Test Sequences for Spherical Video Coding from GoPro", JVET-G0147, GoPro, Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-5.
Asbun, et al., "AHG8: InterDigital Test Sequences for Virtual Reality Video Coding", JVET-D0039, InterDigital Communications, Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, 4 pages.
Asbun, et al., "InterDigital Test Sequences for Virtual Reality Video Coding", JVET-G0055, InterDigital Communications, Inc., Joint Video Exploration Team (JVET) of ITU-T SG 16 WP 3 and ISO/IEC JTC 1/SC 29/WG 11, 7th Meeting: Torino, IT, Jul. 13-21, 2017, 4 pages.
Baroncini, et al., "Results of the Joint Call for Evidence on Video Compression with Capability beyond HEVC", JVET-G1004-V2, JVET, Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-17.
Boyce, et al., "JVET Common Test Conditions and Evaluation Procedures for 360° Video", JVET-E1030, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-6.
Boyce, et al., "JVET Common Test Conditions and Evaluation Procedures for 360° Video", JVET-F1030-V4, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-7.
Budagavi, et al., "360 Degrees Video Coding using Region Adaptive Smoothing", 2015 IEEE International Conference on Image Processing (ICIP), Quebec City, QC, Canada, Sep. 27-30, 2015, pp. 750-754.
Chen, et al., "Further Improvements to HMKTA-1.0", VCEG-AZ07, Qualcomm Incorporated, ITU—Telecommunications Standardization Sector, Study Group 16 Question 6, Video Coding Experts Group (VCEG), 52nd Meeting, Warsaw, Poland, Jun. 19-26, 2015, 8 pages.
Chen, J et al., "Algorithm Description of Joint Exploration Test Model 5 (JEM 5)", JVET-E1001-V2, Editors, Joint Video Exploration Team (JVET) of ITU-T SG 16 WP 3 and ISO/IEC JTC 1/SC 29/WG 11, 5th Meeting: Geneva, CH, Feb. 12-20, 2017, 56 pages.
Chen, Jianle et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT; Editors, Jul. 13-21, 2017, 48 pages.
Choi, et al., "Test Sequence Formats for Virtual Reality Video Coding", JVET-C0050, Samsung Electronics Co., Ltd., Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-6.
Choi, Byeongdoo, "Technologies under Consideration for Omnidirectional Media Application Format", Systems Subgroup, ISO/IEC JTC1/SC29/WG11 N15946, San Diego, CA, US, Feb. 2016, 16 pages.
Coban, et al., "AHG8: Adjusted Cubemap Projection for 360-Degree Video", JVET-F0025, Qualcomm Inc., Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-6.
Facebook360, "Facebook 360 Video", Available at <https://facebook360.fb.com/>, pp. 1-5.
Feng, et al., "Hardware Implementation of Deblocking Loop Filter in Video Decoder Chip", Computer Engineering, vol. 33, No. 7, Apr. 5, 2007, pp. 217-219.

Github, "Facebook's Equirectangular to Cube Map Tool on GitHub", Transform 360, Available at <https://github.com/facebook/transform?files=1>, pp. 1-3.
Google, "Bringing Pixels Front and Center in VR Video", Available at <https://www.blog.google/products/google-vr/bringing-pixels-front-and-center-vr-video/>, Mar. 14, 2017, pp. 1-8.
Google VR, "Google Cardboard", Available at <https://www.google.com/get/cardboard/>, pp. 1-4.
Hanhart, et al., "AHG8: Reference Samples Derivation using Geometry Padding for Intra Coding", JVET-D0092, InterDigital Communications Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.
Hanhart, Philippe et al., "AHG8: High Level Syntax Extensions for Signaling of 360-Degree Video Information", JVET-D0093, InterDigital Communications Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, 6 pages.
Hanhart, Philippe et al., "InterDigital's Response to the 360° Video Category in Joint Call for Evidence on Video Compression with Capability beyond HEVC", Joint Video Exploration Team (JVET) of ITU-T SG 16 WP 3 and ISO/IEC JTC 1/SC 29/WG 11; 7th Meeting: Torino, IT; InterDigital Communications Inc.; JVET-G0024, Jul. 13-21, 2017, 16 pages.
He, et al., "AHG8: InterDigital's Projection Format Conversion Tool", JVET-D0021, InterDigital Communications Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-13.
HTC, "HTC Vive", Available at <https://www.htcvive.com/us/>, pp. 1-3.
ISO/IEC, "Requirements for OMAF", Requirements, ISO/IEC JTC1/SC29/WG11 N16143, San Diego, CA, US, Feb. 2016, 2 pages.
Kuzyakov, et al., "Next-Generation Video Encoding Techniques for 360 Video and VR", Facebook Code, Available at <https://code.facebook.com/posts/1126354007399553/next-generation-video-encoding-techniques-for-360-video-and-vr/>, Jan. 21, 2016, pp. 1-6.
Lin, et al., "AHG8: Compact Cube Layout with Tile Partition", JVET-D0104, MediaTek Inc., Joint Video Exploration Team (JVET) of ITU-T SG 16 WP 3 and ISO/IEC JTC 1/SC 29/WG11, 4th meeting: Chengdu, CN, Oct. 15-21, 2016, pp. 1-6.
Norkin, et al., "Call for Test Materials for Future Video Coding Standardization", JVET-B1002, ITU-T Q6/16 Visual Coding (VCEG) and ISO/IEC JTC1/SC29/WG11 Coding of Moving Pictures and Audio (MPEG), Joint Video Exploration Team (JVET) of ITU-T SG 16 WP 3 and ISO/IEC JTC 1/SC 29/WG 11, 2nd Meeting: San Diego, USA, Feb. 20-26, 2016, pp. 1-4.
Oculus, "Oculus Rift", Available at <https://www.oculus.com/en-us/rift/>, pp. 1-19.
Panusopone, et al., "Unequal Weight Planar Prediction and Constrained PDPC", JVET-E0068-r1, ARRIS, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-6.
Schwarz, et al., "Tampere Pole Vaulting Sequence for Virtual Reality Video Coding", JVET-D0143, Nokia, Tampere University of Technology, Rakka Creative, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-2.
Segall, et al., "Draft Joint Call for Proposals on Video Compression with Capability beyond HEVC", JVET-G1002, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 28 pages.
Shih, et al., "AHG8: Face-based Padding Scheme for Cube Projection", JVET-E0057, MediaTek Inc., Joint Video Exploration Team (JVET) of ITU-T SG 16 WP 3 and ISO/IEC JTC1/SC 29/WG 11, 5th Meeting: Geneva, CH, Jan. 12-20, 2017, pp. 1-5.
Sullivan, et al., "Meeting Notes of the 3rd Meeting of the Joint Video Exploration Team (JVET)", JVET-C1000, Responsible Coordinators, Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-73.

(56) References Cited

OTHER PUBLICATIONS

Sun, et al., "AHG8: WS-PSNR for 360 Video Objective Quality Evaluation", JVET-D0040, Zhejiang University, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-5.

Sun, et al., "Test Sequences for Virtual Reality Video Coding from LetinVR", JVET-G0053, Letin VR Digital Technology Co., Ltd., Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-5.

Sun, et al., "Test Sequences for Virtual Reality Video Coding from LetinVR", JVET-D0179, Letin VR Digital Technology Co., Ltd., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-5.

Thomas, et al., "5G and Future Media Consumption", TNO, ISO/IEC JTC1/SC29/WG11 MPEG2016/m37604, San Diego, CA, US, Feb. 2016, 10 pages.

Wien, et al., "Joint Call for Evidence on Video Compression with Capability beyond HEVC", JVET-F1002, Joint Video Exploration Team (JVET), of ITU-T SG 16 WP 3 and ISO/IEC JTC 1/SC 29/WG 11, Hobart, AU, Mar. 31-Apr. 7, 2017, pp. 1-11.

Wien, et al., "Preliminary Joint Call for Evidence on Video Compression with Capability Beyond HEVC", JVET-E1002, JVET, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-9.

Xiu, Xiaoyu et al., "Description of SDR, HDR and 360° Video Coding Technology Proposal by InterDigital Communications and Dolby Laboratories", JVET-J0015-v1, InterDigital Communications, Inc., Dolby Laboratories, Inc., JVET of ITU-T SG 16 WP 3 and ISO/IEC JTC1/SC 29/WG 11; 10th Meeting: San Diego, US, Apr. 10-20, 2018, 82 pages.

Ye, et al., "Algorithm Descriptions of Projection Format Conversion and Video Quality Metrics in 360Lib", JVET-E1003, Editors, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-22.

Ye, et al., "Algorithm Descriptions of Projection Format Conversion and Video Quality Metrics in 360Lib", JVET-F1003-V1, Editors, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-33.

Youtube, "360 Video", Virtual Reality, Available at <https://www.youtube.com/channel/UCzuqhhs6NWbgTzMuM09WKDQ>, pp. 1-3.

Yu, et al., "A Framework to Evaluate Omnidirectional Video Coding Schemes", IEEE International Symposium on Mixed and Augmented Reality, Sep. 29-Oct. 3, 2015, pp. 31-36.

Yu, et al., "Content Adaptive Representations of Omnidirectional Videos for Cinematic Virtual Reality", Proceedings of the 3rd International Workshop on Immersive Media Experiences, Brisbane, Australia, Oct. 30, 2015, pp. 1-6.

Zakharchenko, et al., "Quality Metric for Spherical Panoramic Video", SPIE Optics and Photonics for Information Processing X, vol. 9970, Sep. 14, 2016.

Zheng, et al., "Adaptive Block Coding Order for Intra Prediction in HEVC", IEEE Transactions on Circuits and Systems for Video Technology, vol. 26, No. 11, Nov. 2016, pp. 2152-2158.

\* cited by examiner

FIG. 19

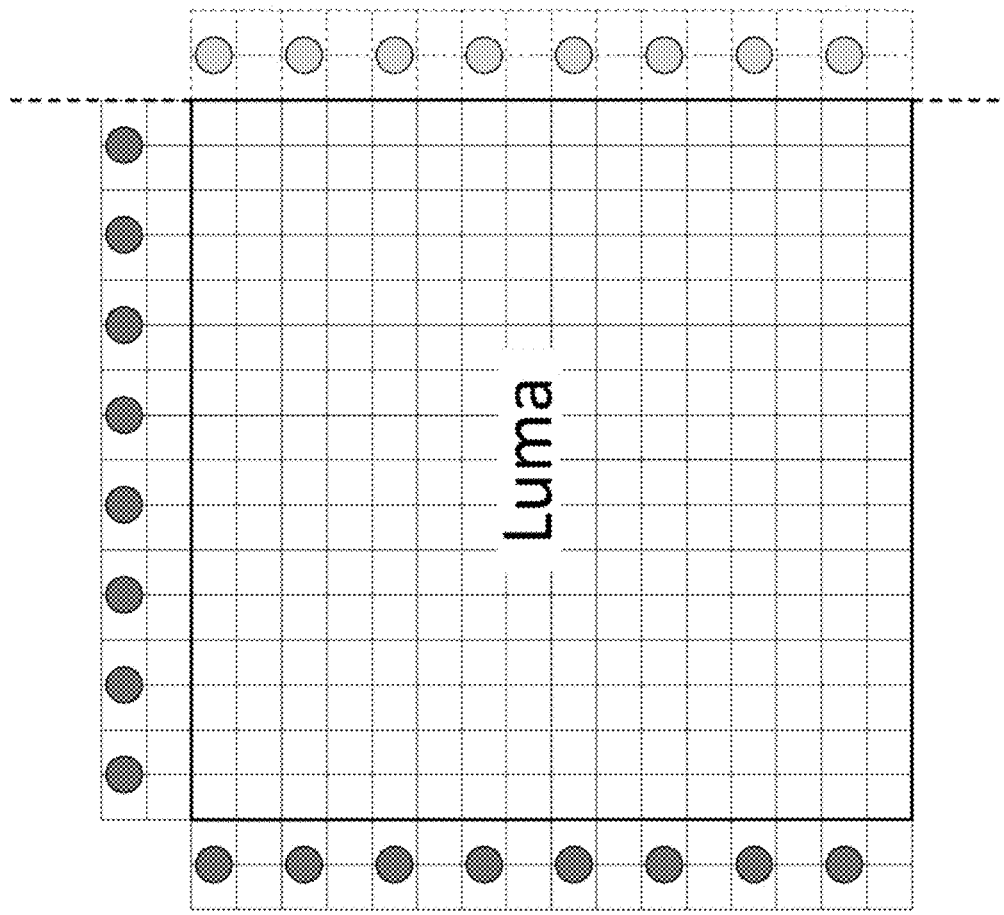
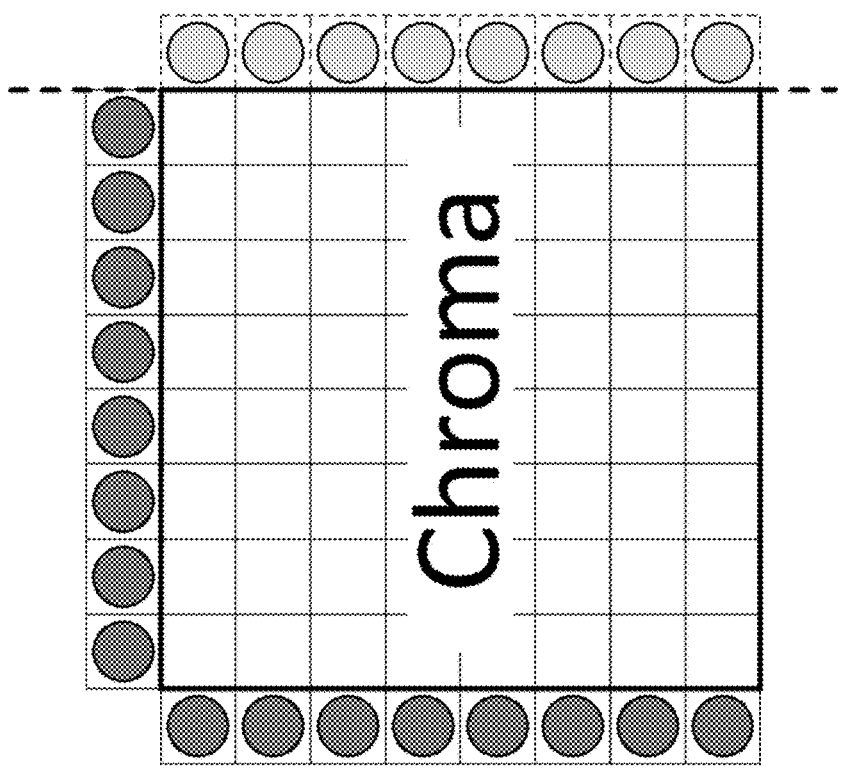
FIG. 27A $$\alpha = \frac{3 \cdot N \cdot \left[ \sum_{i=1}^{N}(L'_{i,0} \cdot C_{i,0}) + \sum_{i=1}^{N}\sum_{j=1}^{N}(L'_{0,j} \cdot C_{0,j}) + \sum_{j=1}^{N}(L'_{N+1,j} \cdot C_{N+1,j}) \right] - \left( \sum_{i=1}^{N} L'_{i,0} + \sum_{i=1}^{N}\sum_{j=1}^{N} L'_{0,j} + \sum_{j=1}^{N} L'_{N+1,j} \right) \cdot \left( \sum_{i=1}^{N} C_{i,0} + \sum_{i=1}^{N}\sum_{j=1}^{N} C_{0,j} + \sum_{j=1}^{N} C_{N+1,j} \right)}{3 \cdot N \cdot \left[ \sum_{i=1}^{N}(L'_{i,0} \cdot L'_{i,0}) + \sum_{i=1}^{N}\sum_{j=1}^{N}(L'_{0,j} \cdot L'_{0,j}) + \sum_{j=1}^{N}(L'_{N+1,j} \cdot L'_{N+1,j}) \right] - \left( \sum_{i=1}^{N} L'_{i,0} + \sum_{i=1}^{N}\sum_{j=1}^{N} L'_{0,j} + \sum_{j=1}^{N} L'_{N+1,j} \right)^2}$$

Equation (38)

$$\alpha = \frac{3 \cdot N \cdot \left[ \sum_{i=1}^{N}(L'_{i,0} \cdot C_{i,0}) + \sum_{i=1}^{N}\sum_{j=1}^{N}(L'_{0,j} \cdot C_{0,j}) + \sum_{i=1}^{N}(L'_{i,N+1} \cdot C_{i,N+1}) \right] - \left( \sum_{i=1}^{N} L'_{i,0} + \sum_{i=1}^{N}\sum_{j=1}^{N} L'_{0,j} + \sum_{i=1}^{N} L'_{i,N+1} \right) \cdot \left( \sum_{i=1}^{N} C_{i,0} + \sum_{i=1}^{N}\sum_{j=1}^{N} C_{0,j} + \sum_{i=1}^{N} C_{i,N+1} \right)}{3 \cdot N \cdot \left[ \sum_{i=1}^{N}(L'_{i,0} \cdot L'_{i,0}) + \sum_{i=1}^{N}\sum_{j=1}^{N}(L'_{0,j} \cdot L'_{0,j}) + \sum_{i=1}^{N}(L'_{i,N+1} \cdot L'_{i,N+1}) \right] - \left( \sum_{i=1}^{N} L'_{i,0} + \sum_{i=1}^{N}\sum_{j=1}^{N} L'_{0,j} + \sum_{i=1}^{N} L'_{i,N+1} \right)^2}$$

Equation (41)

$$\alpha = \frac{4 \cdot N \cdot \left[ \sum_{i=1}^{N}(L'_{i,0} \cdot C_{i,0}) + \sum_{i=1}^{N}\sum_{j=1}^{N}(L'_{0,j} \cdot C_{0,j}) + \sum_{j=1}^{N}(L'_{N+1,j} \cdot C_{N+1,j}) + \sum_{i=1}^{N}(L'_{i,N+1} \cdot C_{i,N+1}) \right] - \left( \sum_{i=1}^{N} L'_{i,0} + \sum_{i=1}^{N}\sum_{j=1}^{N} L'_{0,j} + \sum_{j=1}^{N} L'_{N+1,j} + \sum_{i=1}^{N} L'_{i,N+1} \right) \cdot \left( \sum_{i=1}^{N} C_{i,0} + \sum_{i=1}^{N}\sum_{j=1}^{N} C_{0,j} + \sum_{j=1}^{N} C_{N+1,j} + \sum_{i=1}^{N} C_{i,N+1} \right)}{4 \cdot N \cdot \left[ \sum_{i=1}^{N}(L'_{i,0} \cdot L'_{i,0}) + \sum_{i=1}^{N}\sum_{j=1}^{N}(L'_{0,j} \cdot L'_{0,j}) + \sum_{j=1}^{N}(L'_{N+1,j} \cdot L'_{N+1,j}) + \sum_{i=1}^{N}(L'_{i,N+1} \cdot L'_{i,N+1}) \right] - \left( \sum_{i=1}^{N} L'_{i,0} + \sum_{i=1}^{N}\sum_{j=1}^{N} L'_{0,j} + \sum_{j=1}^{N} L'_{N+1,j} + \sum_{i=1}^{N} L'_{i,N+1} \right)^2}$$

Equation (43)

$$\beta = \frac{\left( \sum_{i=1}^{N} C_{i,0} + \sum_{j=1}^{N} C_{0,j} + \sum_{j=1}^{N} C_{N+1,j} + \sum_{i=1}^{N} C_{i,N+1} \right) - \alpha \cdot \left( \sum_{i=1}^{N} L'_{i,0} + \sum_{j=1}^{N} L'_{0,j} + \sum_{j=1}^{N} L'_{N+1,j} + \sum_{i=1}^{N} L'_{i,N+1} \right)}{4 \cdot N}$$

Equation (44)

FIG. 28

360-DEGREE VIDEO CODING USING FACE CONTINUITIES

CROSS-REFERENCE TO RELATED APPLICATIONS

This application is a continuation application of U.S. Non-Provisional application Ser. No. 16/603,991 filed Oct. 9, 2019, which is the National Stage Entry under 35 U.S.C. § 371 of Patent Cooperation Treaty Application No. PCT/US2018/026828, filed Apr. 10, 2018, which claims the benefit of U.S. Provisional Application Ser. No. 62/484,218 filed Apr. 11, 2017 and U.S. Provisional Application Ser. No. 62/525,880 filed Jun. 28, 2017, the contents of which are incorporated by reference herein.

BACKGROUND

Virtual reality (VR) started to go into our daily lives. For example, VR has many application in areas including, but not limited to, healthcare, education, social networking, industry design/training, game, movie, shopping, and/or entertainment. VR may enhance a viewer's experience, for example, by creating a virtual environment surrounding the viewer and generating a true sense of "being there" for the viewer. A user's experience may rely on, for example, providing a full real feeling in the VR environment. For example, the VR system may support interactions through posture, gesture, eye gaze, and/or voice. The VR system may provide haptic feedback to the user to allow the user to interact with objects in the VR world in a natural way. VR systems may use 360-degree video to provide the users, for example, the capability to view the scene from 360-degree angles in the horizontal direction and/or 180-degree angles in the vertical direction.

SUMMARY

A coding device (e.g., a device that may be or may include an encoder and/or a decoder) may receive a frame-packed picture of 360-degree video. The frame-packed picture may include multiple faces and a current block. The coding device may identify a face in the frame-packed picture that the current block belongs to. The coding device may determine that the current block is located at an exiting boundary of the face that the current block belongs to. For example, the coding device may determine that the current block is located at the exiting boundary of the face that the current block belongs according to the coding order of the frame-packed picture. The exiting boundary of the face that the current block belongs to may be located in the same direction of the coding order that is relative to the current block.

The frame-packed picture may be coded in a coding order. In examples, the coding order may have left to right direction relative to a current block associated with the frame-packed picture. In examples, the coding order may have top to bottom direction relative to the current block. In examples, the coding order may have left to right and top to bottom direction relative to the current block. In examples, if the coding order has left to right direction relative to the current block, the exiting boundary of the face may be located on the right side (e.g., rightmost side of the face that the current block belongs to). In examples, if the coding order has top to bottom direction relative to the current block, the exiting boundary of the face may be located on the bottom side (e.g., bottommost side of the face that the current block belongs to). In examples, if the coding order has left to right and top to bottom direction relative to the current block, the exiting boundary of the face may be located at the right and bottom side (e.g., rightmost and bottommost side of the face that the current block belongs to).

Upon determining that the current block is located at the exiting boundary of the face that the current block belongs to, the coding device may use a cross-face boundary neighboring block located on a face that shares a boundary with the exiting boundary of the face that the current block belongs to for coding the current block. For example, the coding device may identify multiple spherical neighboring blocks of the current block. For example, the coding device may identify multiple spherical neighboring blocks of the current block based on the spherical characteristics of the 360-degree video. The coding device may identify a cross-face boundary neighboring block associated with the current block. For example, the coding device may identify the cross-face boundary neighboring block among the identified multiple spherical neighboring blocks of the current block. In examples, the cross-face boundary neighboring block may be located on a face that shares a boundary with the exiting boundary of the face that the current block belongs to. In examples, the cross-face boundary neighboring block may be located on an opposite side of the face boundary that the current block belongs to and is located in the same direction of the coding order relative to the current block.

The coding device may determine whether to use the cross-face boundary neighboring block to code the current block. For example, a block in the frame-packed picture that corresponds to the cross-face boundary neighboring block may be identified. The block in the frame-packed picture that corresponds to the cross-face boundary neighboring block may be identified based on the frame-packing information of the 360-degree video. The coding device may determine whether to use the identified block in the frame-packed picture that corresponds to the cross-face boundary neighboring block to code the current block based on availability of the identified block in the frame-packed picture. For example, the availability of the identified block in the frame-packed picture may be determined based on whether the identified block has been coded. The coding device may code the current block based on the determination to use the identified block in the frame-packed picture and may code the current block using the identified and available block that corresponds to the cross-face boundary neighboring block.

As used herein, a 360-degree video may include or may be a spherical video, an omnidirectional video, a virtual reality (VR) video, a panorama video, an immersive video (e.g., a light field video that may include 6 degree of freedom), a point cloud video, and/or the like.

BRIEF DESCRIPTION OF THE DRAWINGS

FIG. 19 depicts an example reconstructed samples used for predicting the current block in intra and inter coding.

FIGS. 27A-C depict example location of the samples used for cross-component linear model prediction at the (A) right face boundary; (B) bottom face boundary; and (C) bottom right face boundary.

FIG. 28 illustrates example equations for calculating linear model parameters (e.g., equations (38), (41), (43) and (44).

DETAILED DESCRIPTION

Figure 1B:
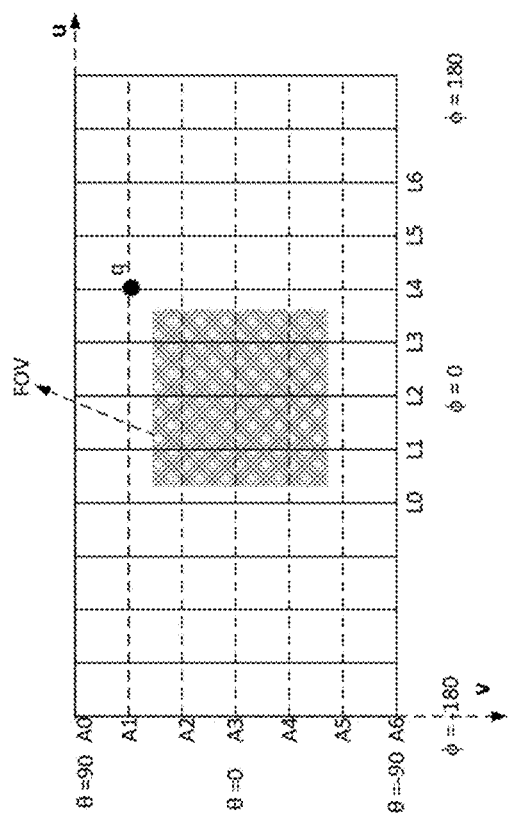
FIG. 1B depicts an example sphere being projected to 2D plane using a equirectangular projection (ERP).

A detailed description of illustrative embodiments will now be described with reference to the various Figures. Although this description provides a detailed example of possible implementations, it should be noted that the details are intended to be exemplary and in no way limit the scope of the application.

VR system and/or 360-degree video may be for media consumption beyond, for example, Ultra High Definition (UHD) service. Improving the quality of 360-degree video in VR and/or standardizing the processing chain for client's interoperability may have been focused by one or more groups. In examples, an ad hoc group may set up in ISO/IEC/MPEG to work on the requirements and/or technologies for omnidirectional media application format. In examples, an ad hoc group, may have performed exploration experiments for 360-degree 3D video application. The ad hoc group may have tested for 360-degree video (e.g., omnidirectional video) based system and/or multi-view based system. A joint video exploration team (JVET) from MPEG and ITU-T, which is exploring technologies for next generation video coding standard, issued a call for test sequences including VR. Ad hoc group (AHG8) was established and the mandates of the AHG8 group are to work out the common test conditions, test sequence formats, and evaluation criteria for 360-degree video coding. AHG8 may study the effect on compression when different projection methods are applied, as well as the conversion software. One or more companies were willing to provide some 360-degree videos as test sequences to develop coding technologies for 360-degree video. A reference software 360Lib is established by JVET to perform projection format conversion and measure objective 360-degree video quality metric in order to conduct experiments following a set of common test conditions and evaluation procedures. Considering the interest in 360-degree video coding, JVET agreed to include 360-degree video in the preliminary joint call for evidence on video compression with capability beyond HEVC.

Quality and/or user's experience of one or more aspects in the VR processing chain, including capturing, processing, display, and/or applications may be improved. For example, on the capturing side, VR system may use one or more cameras to capture a scene from one or more different views (e.g., 6~12 views). The different views may be stitched together to form 360-degree video in high resolution (e.g., 4K or 8K). For example, on the client or user side, the VR system may include a computation platform, a head mounted display (HMD), and/or a head tracking sensor. The computation platform may receive and/or decode the 360-degree video and may generate a viewport for display. Two pictures, one for each eye, may be rendered for the viewport. The two pictures may be displayed in the HMD for stereo viewing. Lens may be used to magnify the image displayed in the HMD for better viewing. The head tracking sensor may keep (e.g., constantly keep) track of the viewer's head orientation and may feed the orientation information to the system to display the viewport picture for that orientation. A VR system may provide a touch device (e.g., specialized touch device) for the viewer, e.g., to interact with objects in the virtual world. In examples, a VR system may be driven by a workstation with GPU support. In examples, a VR system may use a smartphone as a computation platform, a HMD display, and/or a head tracking sensor. The spatial HMD resolution may be 2160×1200. Refresh rate may be 90 Hz, and the field of view (FOV) may be 110 degree. The sampling rate for a head tracking sensor may be 1000 Hz, which may capture fast (e.g., very fast) movement. An example of VR system may use a smartphone as computation platform and may include of lens and/or cardboard. 360-degree video streaming service may exist.

Quality of experience, such as interactivity and/or haptic feedback, may be improved in the VR systems. For example, a HMD may be too big and/or may not convenient to wear. The resolution provided by the HMDs (e.g., 2160×1200 for stereoscopic views) may not be sufficient, and may cause dizziness and/or discomfort for a user. The resolution may be increased. A feeling from vision in VR environment may be combined with a feedback (e.g., force feedback) in the real world and may enhance VR experience. VR roller coaster may be an example such combined application.

360-degree video delivery may represent the 360-degree information, e.g., using a sphere geometry structure. For example, the synchronized one or more views captured by the one or more cameras may be stitched on a sphere as an integral structure. The sphere information may be projected to 2D planar surface with a geometry conversion process. For example, an equirectangular projection (ERP) and/or a cubemap projection (CMP) may be used to illustrate the projection format.

Figure 1C:
FIG. 1C depicts an example picture produced using ERP.
Figure 1A:
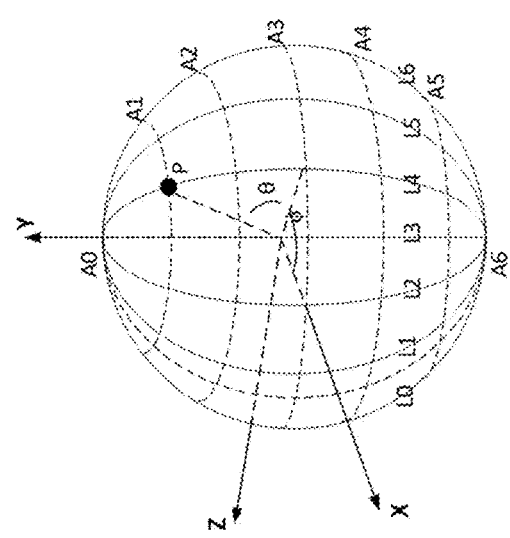
FIG. 1A depicts an example sphere sampling in longitudes ($\phi$) and latitudes ($\theta$).

ERP may map the latitude and/or longitude coordinates of a spherical globe onto (e.g., directly onto) horizontal and/or vertical coordinates of a grid. FIG. 1A depicts an example of sphere sampling in longitudes (ϕ) and latitudes (θ). FIG. 1B depicts an example of sphere being projected to 2D plane using, for example ERP. FIG. 1C depicts an example of projective picture with ERP. The longitude ϕ in the range [−π, π] may be yaw, and latitude θ in the range [−π/2, π/2] may be pitch in aviation. IT may be the ratio of a circle's circumference to its diameter. In FIGS. 1A-B, (x, y, z) may represent a point's coordinates in 3D space, and (ue, ve) may represent the coordinate of one point in 2D plane. ERP may be represented mathematically as shown in Equations 1 and/or 2:

$$ue = (\varphi/(2*\pi) + 0.5)*W \quad (1)$$

$$ve = (0.5 - \theta/\pi)*H \quad (2)$$

where W and H may be the width and height of the 2D planar picture. As shown in FIG. 1A, the point P, the cross point between longitude L4 and latitude A1 on the sphere, may be mapped to a unique point q (e.g., FIG. 1B) in the 2D plane using the Equation (1) and (2). The point q in 2D plane may be projected back to the point P on the sphere via inverse projection. The field of view (FOV) in FIG. 1B may show an example that the FOV in sphere may be mapped to 2D plane with the view angle along X axis being about 110 degrees.

360-degree video may be mapped to a 2D video using ERP. For example, the 360-degree video may be encoded with video codecs, such as H.264 and/or HEVC. The encoded 360-degree video may be delivered to the client. At the client side, the equirectangular video may be decoded. The equirectangular video may be rendered, e.g., based on user's viewport by projecting and/or displaying the portion belonging to FOV in the equirectangular picture onto the HMD. Spherical video may be transformed to 2D planar picture for encoding with ERP. The characteristic of equirectangular 2D picture may differ from a 2D picture (e.g., rectilinear video).

FIG. 1C depicts an example picture produced using ERP. As shown in FIG. 1C, the top and/or bottom portions of the ERP picture (e.g., North Pole and/or South Pole, respectively) may be stretched compared to, for example, the middle portion of the picture (e.g., equator). The stretching of the top and/or bottom portions of the ERP picture may indicate that the spherical sampling density may be uneven for ERP format. The motion field, which may describe the temporal correlation among neighboring ERP pictures, may become complicated than 2D video.

A video codec (e.g., MPEG-2, H.264, or HEVC) may use translational model to describe motion field. The video codec may not represent (e.g., not efficiently represent) shape varying movement in equirectangular projected 2D planar pictures. As shown in FIG. 1C, areas closer to the poles (e.g., North and/or South Pole) in ERP may be less interesting for a viewer and/or a content provider. For example, the viewer may not focus on the top and/or bottom regions for a long duration. Based on the warping effect, the stretched areas may become a large portion of the 2D plane after ERP, and compressing these regions may take a lot of bits. Equirectangular picture coding may be improved by applying pre-processing, such as smoothing to the pole areas to reduce the bandwidth to code the pole areas. One or more geometric projections may be used to map 360-degree video onto multiple faces. For example, the one or more geometric projections may include, but not limited to, cubemap, equal-area, cylinder, pyramid, and/or octahedron.

Figure 2A:
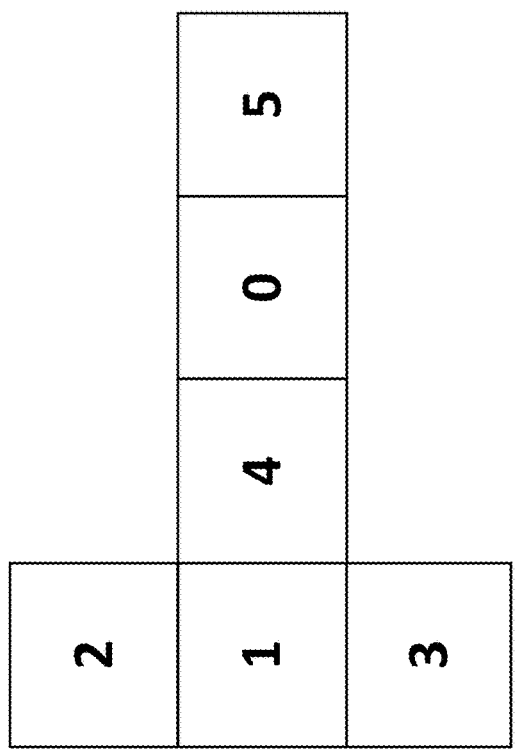
FIG. 2A depicts an example 3D geometry structure in a cubemap projection (CMP).
Figure 2B:
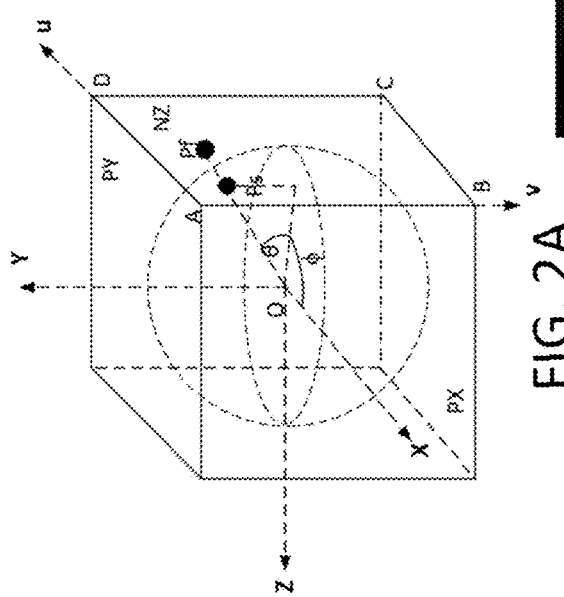
FIG. 2B depicts an example 2D planar with 4×3 frame packing and six faces.
Figure 2C:
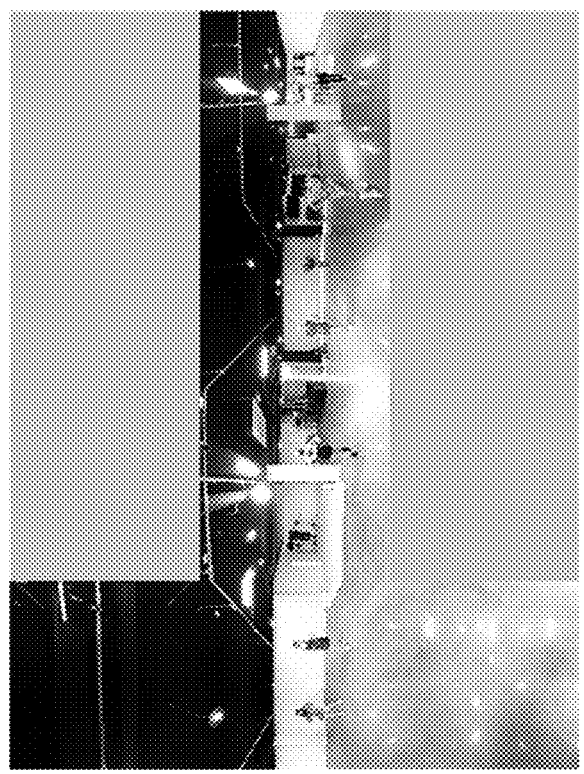
FIG. 2C depicts an example picture produced using CMP.

The cubemap projection (CMP) may be in a compression friendly format. The CMP includes 6 faces. For example, the CMP may include 6 square faces. The faces may be a planar square. FIG. 2A depicts an example 3D geometry structure in CMP. If the radius of the tangent sphere is 1 (e.g., FIG. 2A), the lateral length of one or more faces (e.g., square faces) of CMP may be 2. FIG. 2B depicts an example 2D packing method to place 6 faces into a rectangular picture, which may be used for encoding and/or delivery. FIG. 2C depicts an example picture produced using CMP. The shaded parts shown in FIG. 2C may be padded regions to fill in the rectangular picture. For a face, the picture may look the same as 2D picture. The boundary of a face may not be continuous. For example, the straight line crossing two neighboring faces may bend and/or may become multiple line segments (e.g., two line segments) at the boundary of the two faces. The motion at the face boundary may be discontinuous.

One or more objective quality metrics have been proposed for the coding efficiency of one or more different geometry projections. For example, peak signal-to-noise ratio (PSNR) measurements may include spherical PSNR (S-PSNR) and viewport PSNR. In S-PSNR, the distortion may be measured with mean square error (MSE) computed over a set of pre-defined samples (e.g., which may be evenly distributed on the sphere). The latitude based PSNR (L-PSNR) may be used. L-PSNR may consider the viewer's viewing behavior by weighting one or more samples based on the sample's latitude. The weight may be derived by tracking the view angle of viewers when the viewers view the training sequences. The weight may be larger if it is viewed frequently. From the statistics, the weight around the Equator may be larger. For example, the weight around the Equator may be larger than the weight near the Pole(s) as interesting content may be located around the Equator. For the viewport PSNR, a viewport may be rendered and the PSNR may be computed on the rendered viewport. A portion of the sphere may be considered, e.g., for the distortion measurement. Average viewport PSNR may be computed over multiple viewports that cover different portions of the sphere. S-PSNR may consider a number of samples. For example S-PSNR may consider samples that may be evenly distributed on the sphere. The weighted to spherically uniform PSNR (WS-PSNR) may be used. WS-PSNR may calculate PSNR using one or more (e.g., all) samples available on the 2D projection plane. For one or more positions on the 2D projection plane, the distortion may be weighted by the spherical area covered by that sample position. WS-PSNR may be computed, e.g., directly in the projection plane. Different weights may be derived for the different projection formats. Craster parabolic projection (CPP) may be used to project the 360-degree image and/or may compute PSNR on the projected image. This approach may be CPP-PSNR.

Equirectangular format may be supported with the 360-degree Cameras and/or stitching procedure. Encoding a 360-degree video in cubemap geometry may use conversion of equirectangular format to cubemap format. Equirectangular may have relationship with the cubemap. In FIG. 2A, there are six faces (e.g., PX, NX, PY, NY, PZ, and NZ), and three axes (e.g., X, Y, and Z) going from the center of sphere (e.g., O) to the center of a face. "P" may stand for positive, and "N" may stand for negative. PX may be the direction along positive X axis from the center of sphere, and NX may be the reverse direction of PX. Similar notion may be used PY, NY, PZ, and NZ. The six faces (e.g., PX, NX, PY, NY, PZ, and NZ) may correspond to the front, back, top, bottom, left, and right faces, respectively. The faces may be indexed from 0 to 5 (e.g., PX (0), NX (1), PY (2), NY (3), PZ (4), and NZ (5)). Ps (X_s, Y_s, Z_s) may be a point on the sphere with a radius being 1. Ps may be represented in yaw $\phi$ and pitch $\theta$ as follows:

$$X\_s = \cos(\theta)\cos(\phi) \quad (3)$$

$$Y\_s = \sin(\theta) \quad (4)$$

$$Z\_s = -\cos(\theta)\sin(\phi) \quad (5)$$

Pf may be a point on the cube when extending the line from the sphere center to Ps, and Pf may be on face NZ. The coordinates of Pf, (X_f, Y_f, Z_f), may be calculated as:

$$X\_f = X\_s/|Z\_s| \quad (6)$$

$$Y\_f = Y\_s/|Z\_s| \quad (7)$$

$$Z\_f = -1 \quad (8)$$

where |x| may be the absolute value of variable x. The coordinates of Pf, (uc, vc), in the 2D plane of face NZ may be calculated as:

$$uc = W * (1 - X\_f)/2 \quad (9)$$

$$vc = H * (1 - Y\_f)/2 \quad (10)$$

Using one or more equations (3) to (10), there may be a relationship between the coordinates (uc, vc) in cubemap on a particular face and the coordinates ($\phi$, $\theta$) on the sphere. The relationship between equirectangular point (ue, ve) and the point ($\phi$, $\theta$) on the sphere may be known from Equations (1) and/or (2). There may be a relationship between equirectangular geometry and cubemap geometry. The geometry mapping from cubemap to equirectangular may be expressed. For example, the point (uc, vc) may be given on a face on a cubemap. The output (ue, ve) on the equirectangular plane may be calculated. For example, the coordinates of 3D point P_f on the face may be calculated with (uc, vc) based on the Equations (9) and (10). The coordinates of 3D point P_s on the sphere may be calculated with P_f based on the Equations (6), (7), and (8). The ($\phi$, $\theta$) on the sphere may be calculated with P_s based on the Equations (3), (4) and (5). The coordinates of the point (ue, ve) on the equirectangular picture may be calculated from ($\phi$, $\theta$) based on the Equations (1) and (2).

A 360-degree video may be represented in a 2D picture. For example, a 360-degree video may be presented in a 2D picture using cubemap. The six faces of the cubemap may be packed into a rectangular area. This may be frame packing. The frame packed pictures may be treated (e.g., coded) as a 2D picture. Different frame packing configuration(s) may be used (e.g., 3×2 and/or 4×3 packing configuration). In 3×2 configuration, the six cubemap faces may be packed into 2 rows, with 3 faces in one row. In 4×3 configuration, the 4 faces (e.g., PX, NZ, NX, and PZ) may be packed into one row (e.g., the center row), and the faces PY and NY may be packed (e.g., packed separately) into two different rows (e.g., the top and bottom rows). FIG. 2C depicts an example of 4×3 frame packing that corresponds to the equirectangular picture in FIG. 1C.

A 360-degree video in equirectangular format may be input and may be converted into a cubemap format. For a (e.g., each) sample position (uc, vc) in cubemap format, the corresponding coordinates (ue, ve) in equirectangular format may be calculated. If the calculated coordinates (ue, ve) in equirectangular are not at an integer sample position, an interpolation filter may be used. For example, the interpolation filter may be used to obtain a sample value at the fractional position using samples from the neighboring integer positions.

Figure 3:
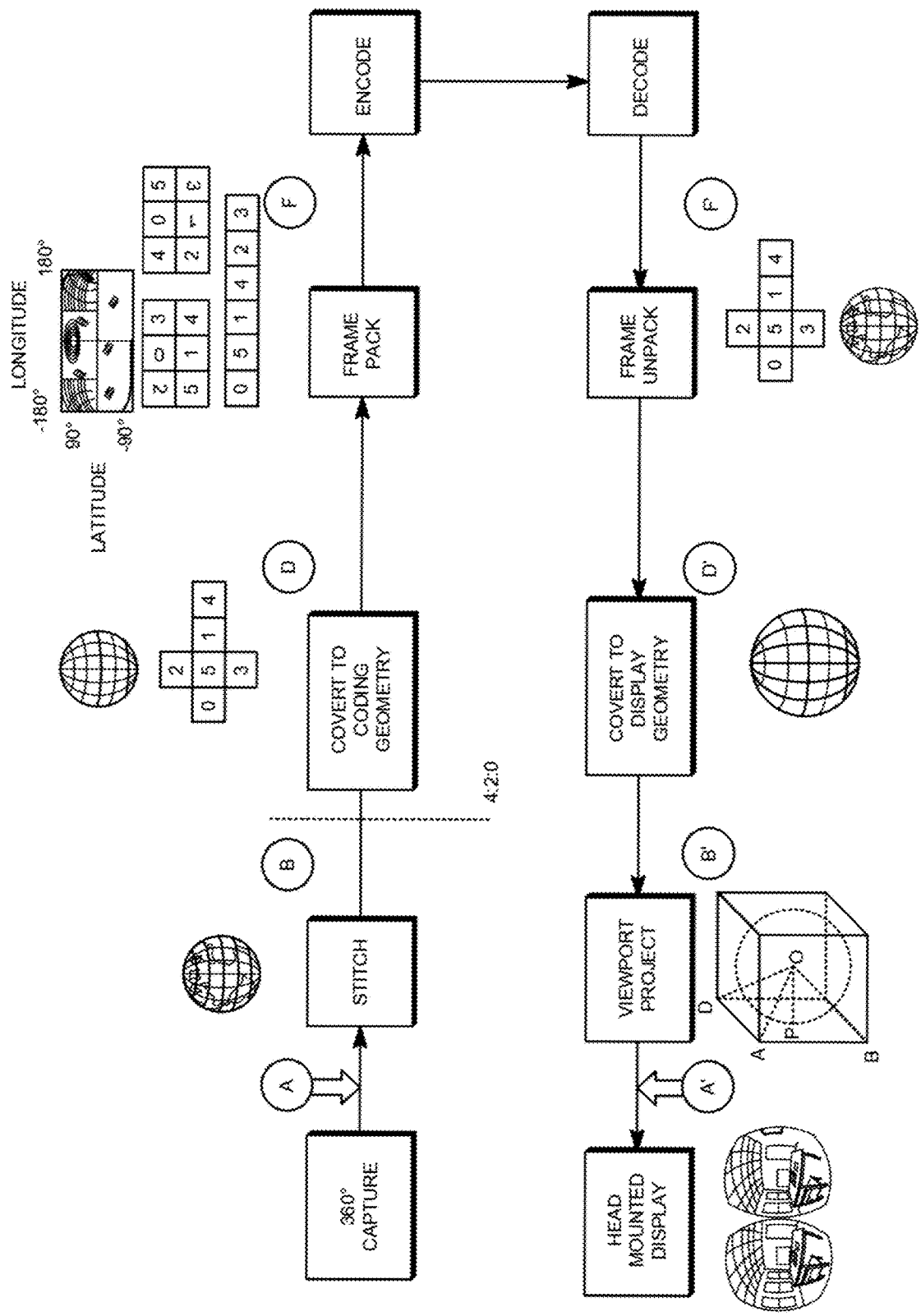
FIG. 3 depicts an example workflow for a 360-degree video system.

FIG. 3 depicts an example work flow for a 360-degree video system. The work flow may include a 360-degree video capture using one or more cameras (e.g., covering the whole sphere space). The videos may be stitched together in a geometry structure (e.g., using an equirectangular geometry structure). The equirectangular geometry structure may be converted to another geometry structure (e.g., cubemap or other projection formats) for encoding (e.g., encoding with video codecs). The coded video may be delivered to the client, for example via dynamic streaming or broadcasting. The video may be decoded. For example, the video may be decoded at the receiver. The decompressed frame may be unpacked to display geometry (e.g., equirectangular). The geometry may be used for rendering (e.g., via viewport projection according to a user's viewing angle).

Chroma components may be subsampled, e.g., to a smaller resolution. For example, chroma components may be subsampled to a smaller resolution than that of a luma component. Chroma subsampling may reduce the amount of video data used for encoding and may save bandwidth and/or computing power and may do so without affecting (e.g., significantly affecting) video quality. With a 4:2:0 chroma format, both of the chroma components may be subsampled to be ¼ of the luma resolution (e.g., ½ horizontally and ½ vertically). After chroma subsampling, the chroma sampling grid may be different from the luma sampling grid. In FIG. 3, throughout the processing flow, the 360-degree video being processed at each stage may be in a chroma format where the chroma components may have been subsampled.

Figure 4A:
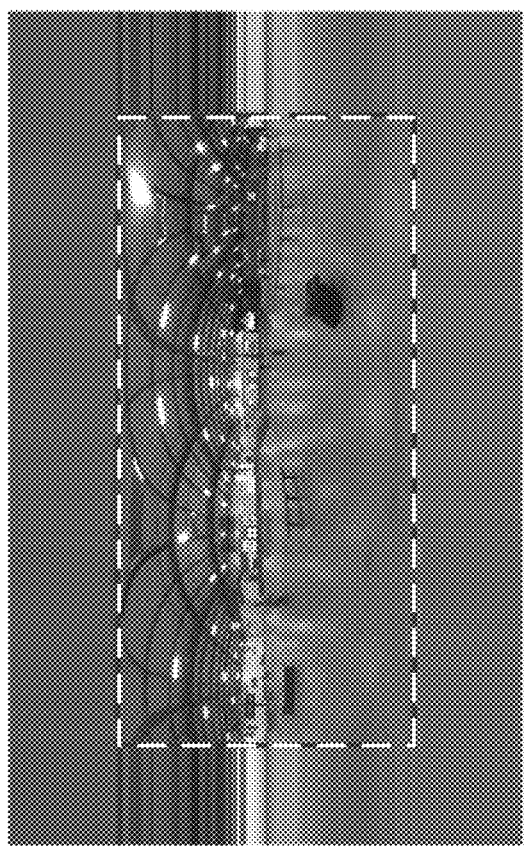
FIG. 4A depicts an example picture generated by the repetitive padding boundaries using ERP.
Figure 4B:
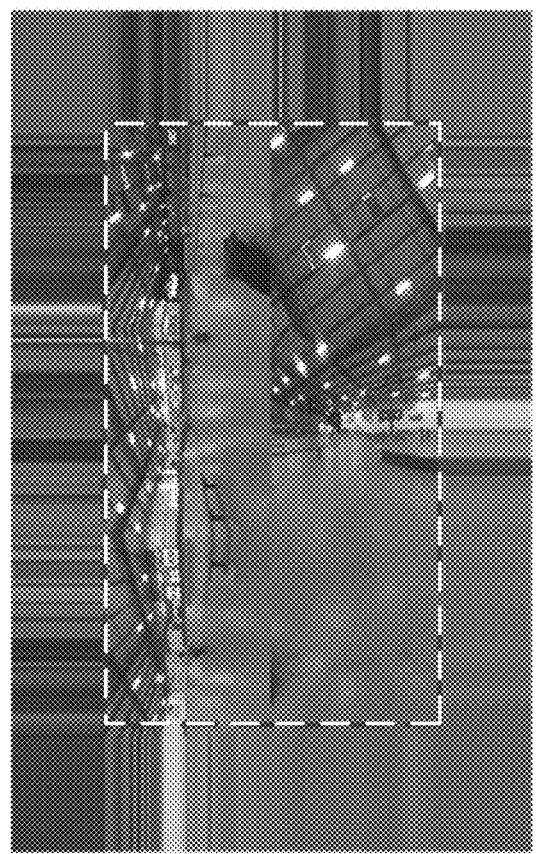
FIG. 4B depicts an example picture generated by the repetitive padding boundaries using CMP.

A video codec(s) may be designed considering 2D video captured on a plane. When motion compensated prediction uses one or more samples outside of a reference picture's boundary, padding may be performed by copying the sample values from the picture boundaries. For example, repetitive padding may be performed by copying the sample values from the picture boundaries. FIGS. 4A-B depict examples of extended pictures generated by the repetitive padding for ERP (e.g., FIG. 4A) and CMP (e.g., FIG. 4B). In FIGS. 4A-B, the original picture may be within the dotted box, and extended boundary may be outside of the dotted box. A 360-degree video may include video information on the whole sphere and may have a cyclic property. When considering the cyclic property of the 360-degree video, the reference pictures of the 360-degree video may not have boundaries, as the information that the picture of the 360-degree video includes may be wrapped around a sphere. The cyclic property may be maintained for one or more different projection formats or which frame packing is used to represent the 360-degree video on a 2D plane. Geometry padding may be used for 360-degree video coding. For example, geometry padding may be used for the 360-degree video coding by padding the samples and/or by considering the 3D geometry structure represented in 360-degree video.

Figure 5B:
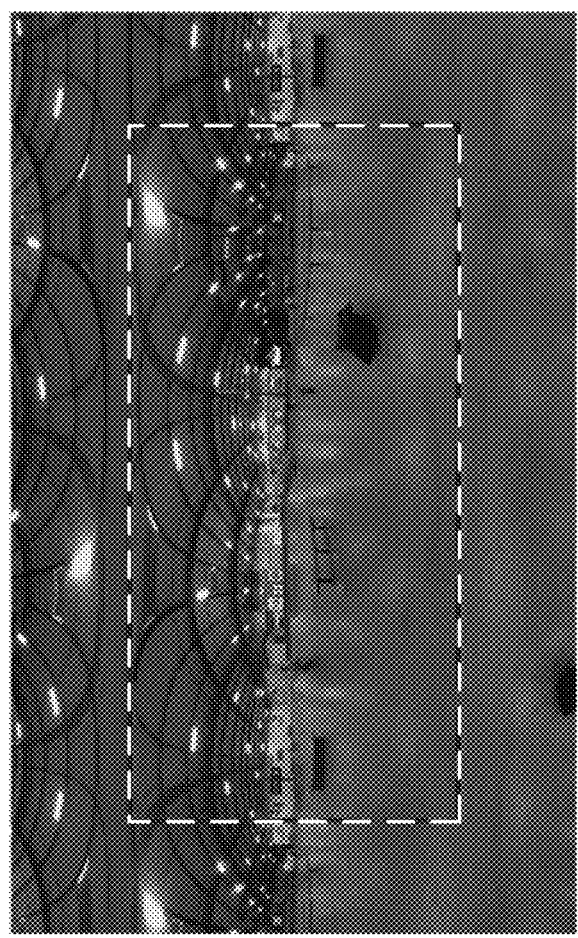
FIG. 5B depicts an example geometry padding for ERP showing padded ERP picture.
Figure 5A:
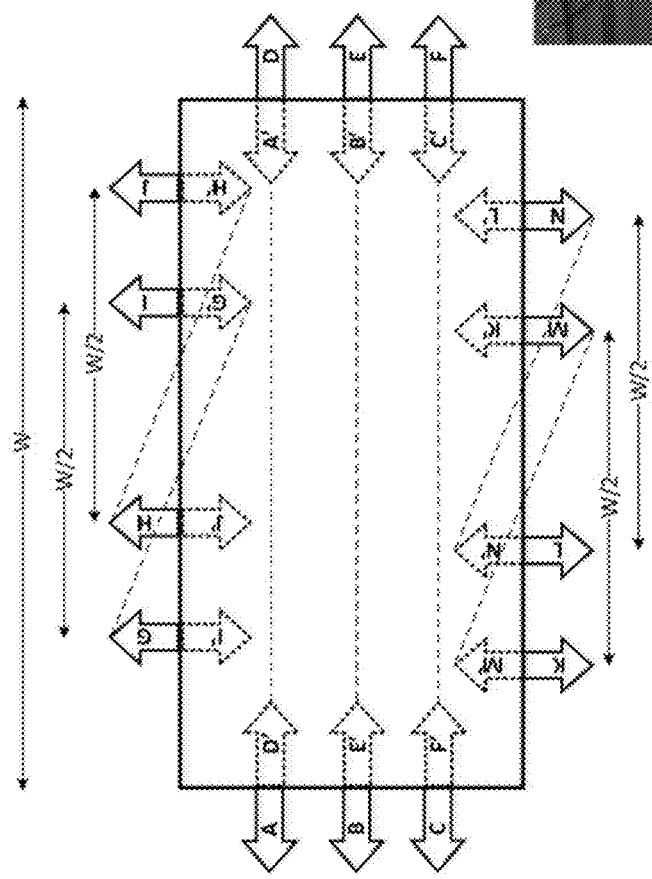
FIG. 5A depicts an example geometry padding for ERP showing padding geometry.

Geometry padding for ERP may be defined on the sphere with longitude and/or latitude. For example, given a point (u, v) to be padded (e.g., outside of the ERP picture), the point (u', v') used to derive the padding sample may be calculated as follows:

$$\text{if } (u < 0 \text{ or } u \geq W) \text{ and } (0 \leq v < H), u' = u \% W, v' = v; \quad (11)$$

$$\text{if } (v < 0), v' = -v - 1, u' = \left(u + \frac{W}{2}\right) \% W; \quad (12)$$

$$\text{if } (v \geq H), v' = 2*H - 1 - v, u' = \left(u + \frac{W}{2}\right) \% W; \quad (13)$$

where W and H may be the width and height of the ERP picture. FIG. 5A depicts an example geometry padding process for ERP. For padding outside of the left boundary of the picture, that is, the samples at A, B, and C in FIG. 5A, the samples may be padded with the corresponding samples at A', B', and C', which are located inside the right boundary of the picture. For padding outside of the right boundary of the picture (e.g., the samples at D, E, and F in FIG. 5A), the samples may be padded with the corresponding samples at D', E', and F', which are located inside the left boundary of the picture. For samples located outside of the top boundary, that is, the samples at G, H, I, and J in FIG. 5A, the samples are padded with the corresponding samples at G', H', I', and J', which are located inside the top boundary of the picture with an offset of half the width. For samples located outside of the bottom boundary of the picture (e.g., the samples at K, L, M, and N in FIG. 5A), the samples may be padded with the corresponding samples at K', L', M', and N', which are located inside the bottom boundary of the picture with an offset of half the width. FIG. 5B depicts an example extended ERP picture using geometry padding. The geometry padding shown in FIGS. 5A-B may provide meaningful samples and/or improve continuity of neighboring samples for areas outside of the ERP picture boundaries.

Figure 6B:
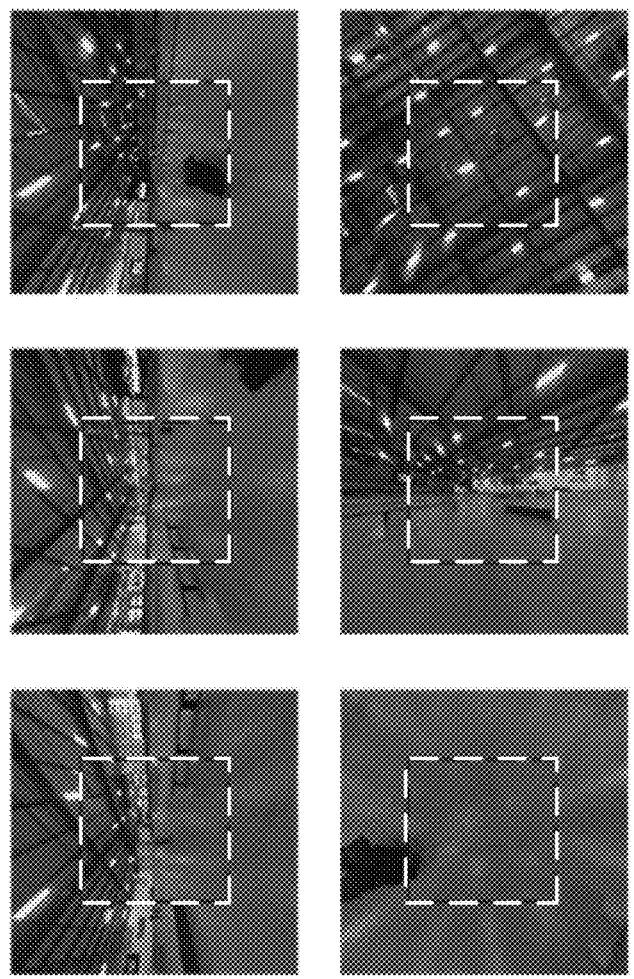
FIG. 6B depicts an example geometry padding process for CMP showing padded CMP faces.
Figure 6A:
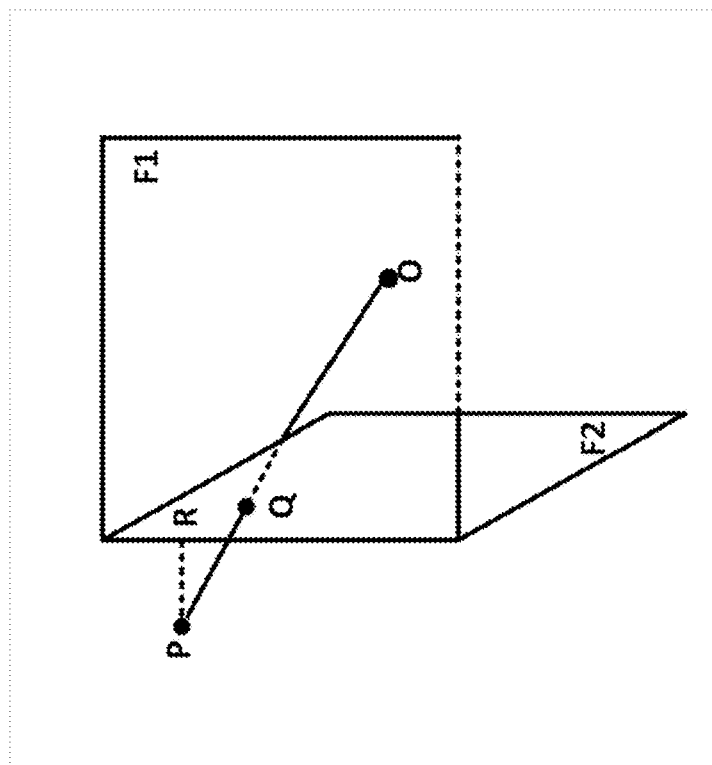
FIG. 6A depicts an example geometry padding process for CMP showing padding geometry.

If the coded picture is in CMP format, a face of CMP may be extended by using geometry padding through projecting the samples of the neighboring faces onto the extended area of the current face. FIG. 6A depicts an example of how the geometry padding may be performed for a given CMP face in 3D geometry. In FIG. 6A, point P may be on face F1 and may be outside of face F1's boundaries. Point P may be padded. Point O may be the center of the sphere. R may be the left boundary point closest to P and may be inside face F1. Point Q may be the projection point of point P on face F2 from the center point O. Geometry padding may use the sample value at point Q to fill the sample value at point P (e.g., rather than using sample value at point R to fill the sample value at point P). FIG. 6B depicts an example extended faces with geometry padding for the CMP 3×2 picture. The geometry padding shown in FIGS. 6A-B may provide meaningful samples for areas outside of the CMP face boundaries.

Figure 7:
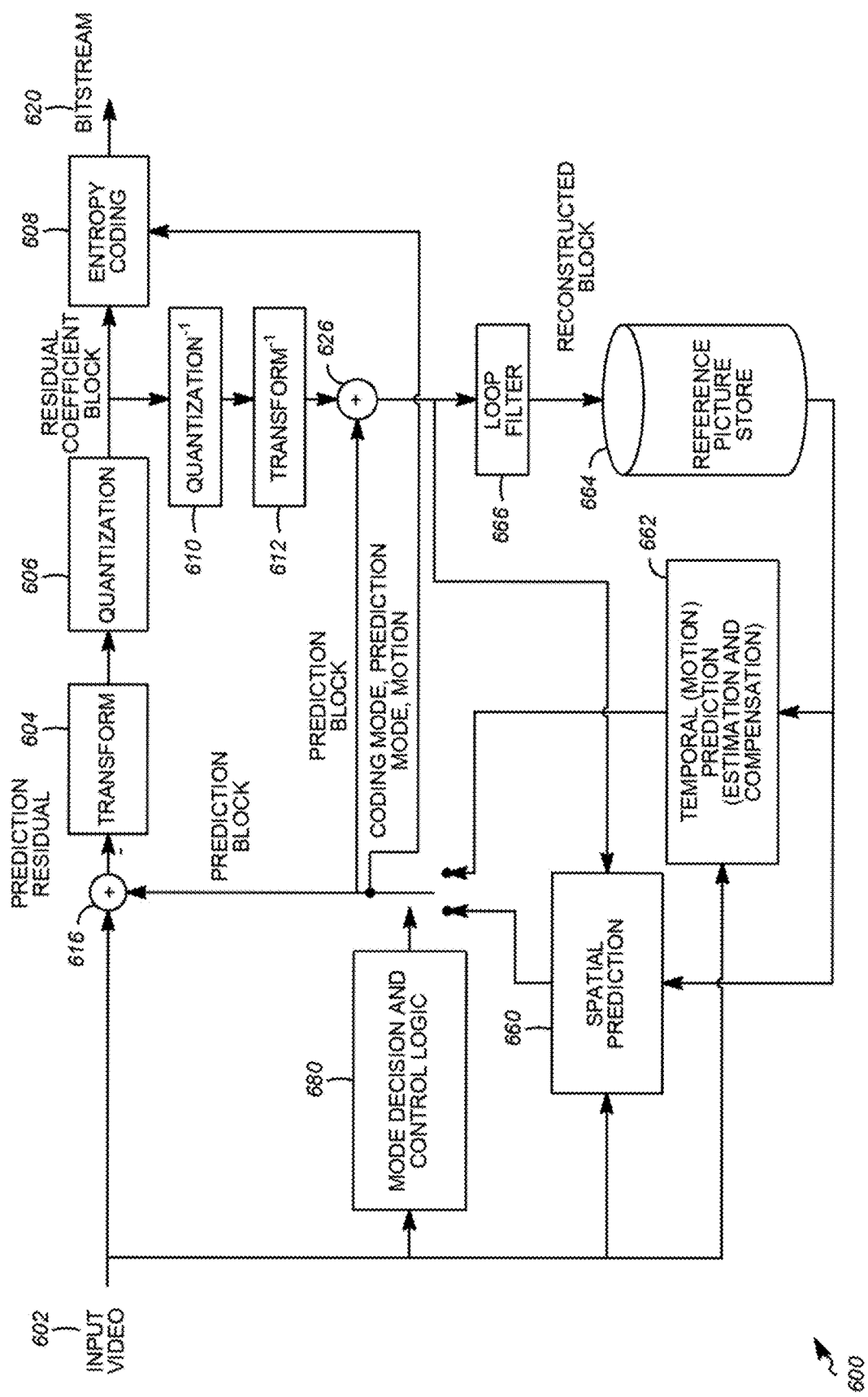
FIG. 7 is an example diagram of block-based video encoder.

FIG. 7 illustrates an example block-based hybrid video encoding system 600. The input video signal 602 may be processed block by block. Extended block sizes (e.g., a coding unit or CU) may be used (e.g., in HEVC) to compress high resolution (e.g., 1080p and/or beyond) video signals. A CU may have up to 64×64 pixels (e.g., in HEVC). A CU may be partitioned into prediction units or PUs, for which separate predictions may be applied. For an input video block (e.g., a macroblock (MB) or CU), spatial prediction 660 or temporal prediction 662 may be performed. Spatial prediction (e.g., intra prediction) may use pixels from already coded neighboring blocks in the same video picture and/or slice to predict a current video block. Spatial prediction may reduce spatial redundancy inherent in the video signal. Temporal prediction (e.g., inter prediction or motion compensated prediction) may use pixels from already coded video pictures to predict a current video block. Temporal prediction may reduce temporal redundancy inherent in the video signal. A temporal prediction signal for a given video block may be signaled by a motion vector that indicates the amount and/or direction of motion between the current block and its reference block. If multiple reference pictures are supported (e.g., in H.264/AVC or HEVC), the reference picture index of a video block may be signaled to a decoder. The reference index may be used to identify from which reference picture in a reference picture store 664 the temporal prediction signal may come.

After spatial and/or temporal prediction, a mode decision 680 in the encoder may select a prediction mode, for example based on a rate-distortion optimization. The prediction block may be subtracted from the current video block at 616. Prediction residuals may be de-correlated using a transform module 604 and a quantization module 606 to achieve a target bit-rate. The quantized residual coefficients may be inverse quantized at 610 and inverse transformed at 612 to form reconstructed residuals. The reconstructed residuals may be added back to the prediction block at 626 to form a reconstructed video block. An in-loop filter such as a de-blocking filter and/or an adaptive loop filter may be applied to the reconstructed video block at 666 before it is put in the reference picture store 664. Reference pictures in the reference picture store 664 may be used to code future video blocks. An output video bit-stream 620 may be formed. Coding mode (e.g., inter or intra), prediction mode information, motion information, and/or quantized residual coefficients may be sent to an entropy coding unit 608 to be compressed and packed to form the bit-stream 620.

Figure 8:
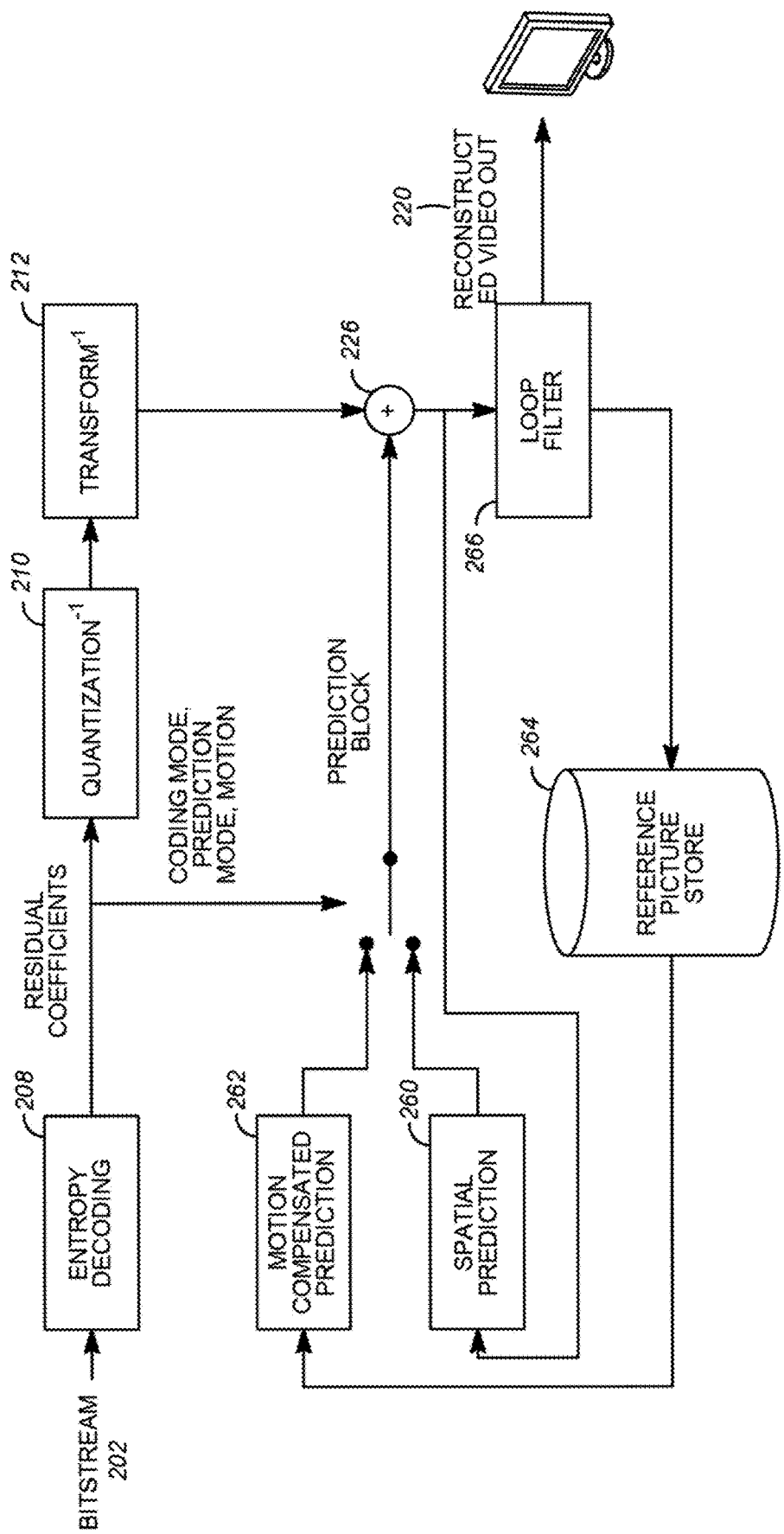
FIG. 8 is an example diagram of block-based video decoder.

FIG. 8 illustrates an example block-based hybrid video decoder. The decoder in FIG. 8 may correspond to the encoder in FIG. 7. A video bit-stream 202 may be received, unpacked, and/or entropy decoded at an entropy decoding unit 208. Coding mode and/or prediction information may be sent to a spatial prediction unit 260 (e.g., if intra coded) and/or to a temporal prediction unit 262 (e.g., if inter coded). A prediction block may be formed the spatial prediction unit 260 and/or temporal prediction unit 262. Residual transform coefficients may be sent to an inverse quantization unit 210 and an inverse transform unit 212 to reconstruct a residual block. The prediction block and residual block may be added at 226. The reconstructed block may go through in-loop filtering 266 and may be stored in a reference picture store 264. Reconstructed videos in the reference picture store 264 may be used to drive a display device and/or to predict future video blocks.

Figures 9, 10:
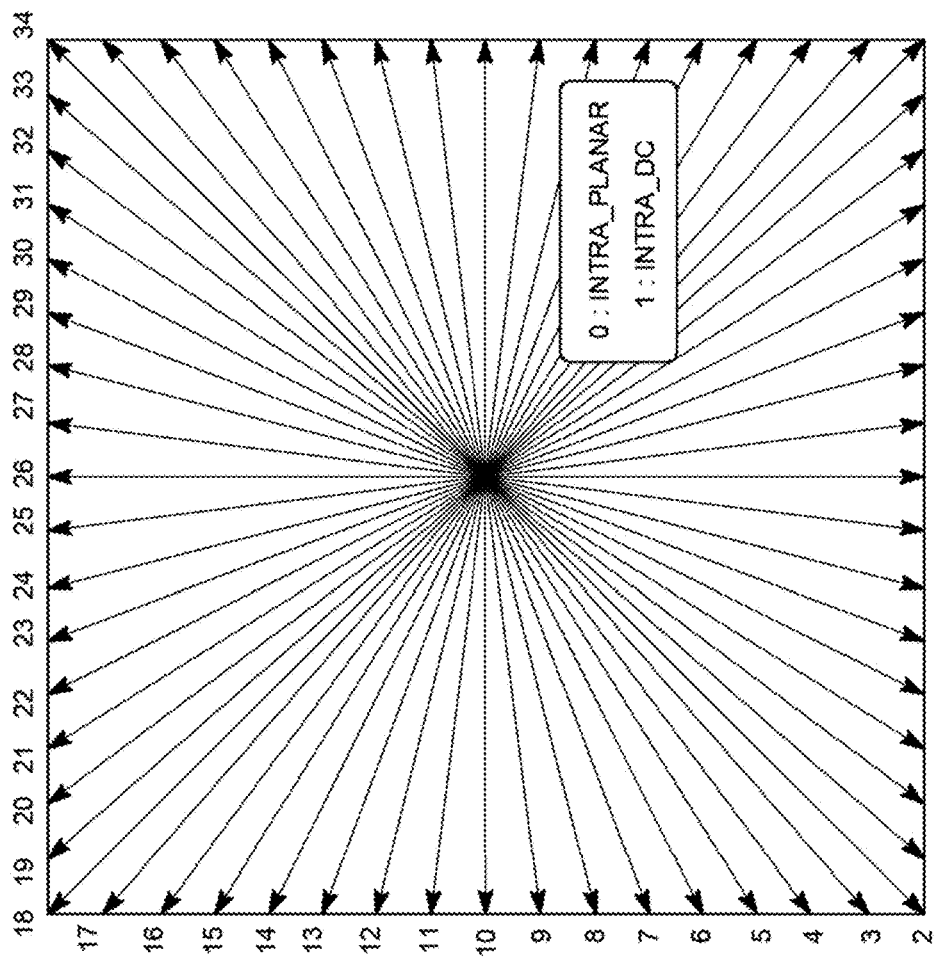
FIG. 9 depicts example reference samples used in high efficiency video coding (HEVC) intra prediction.
FIG. 10 depicts an example indication of intra prediction directions in HEVC.

A video codec(s), such as H.264 and HEVC, may be used to code 2D planar rectilinear video(s). Video coding may exploit spatial and/or temporal correlation(s), e.g., to remove information redundancies. Various prediction techniques such as intra prediction and inter prediction may be applied during video coding. Intra prediction may predict a sample value with its neighboring reconstructed samples. FIG. 9 depicts an example reference samples that may be used to intra-predict a current transform unit (TU). The current TU described herein may be a current block, and the two terms may be used interchangeably. As described herein, the reference samples may include reconstructed samples located above or to the left of the current TU.

One or more intra prediction modes may be selected. For example, HEVC may specify 35 intra prediction modes that include planar (0), DC (1), and angular predictions (2~34), as shown in FIG. 10. The planar prediction may generate a first order approximation for the current block, e.g., using the top and/or left reconstructed samples. The top right and bottom left sample values may be copied along the right column and bottom row, respectively (e.g., because of the raster scan order). A vertical predictor may be formed for one or more positions within the block, e.g., using a weighted average of the corresponding top and bottom samples. A horizontal predictor may be formed using the corresponding left and right samples. The final predictor may be formed, e.g., by averaging the vertical and horizontal predictors. The bottom right sample value may be extrapolated as the average of the top right and bottom left sample values. The right column (e.g., bottom row) may be extrapolated using the top right and bottom right samples (e.g., bottom left and bottom right samples).

Figure 11B:
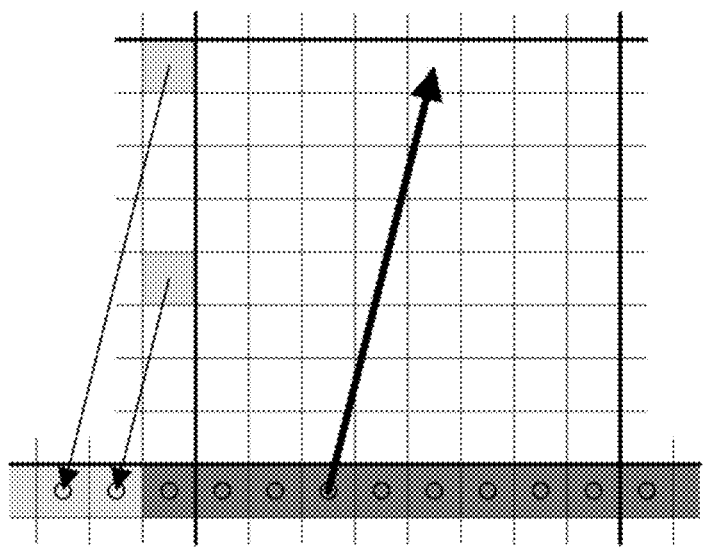
FIG. 11B depicts an example projection of above reference samples to extend the left reference column upward.
Figure 11A:
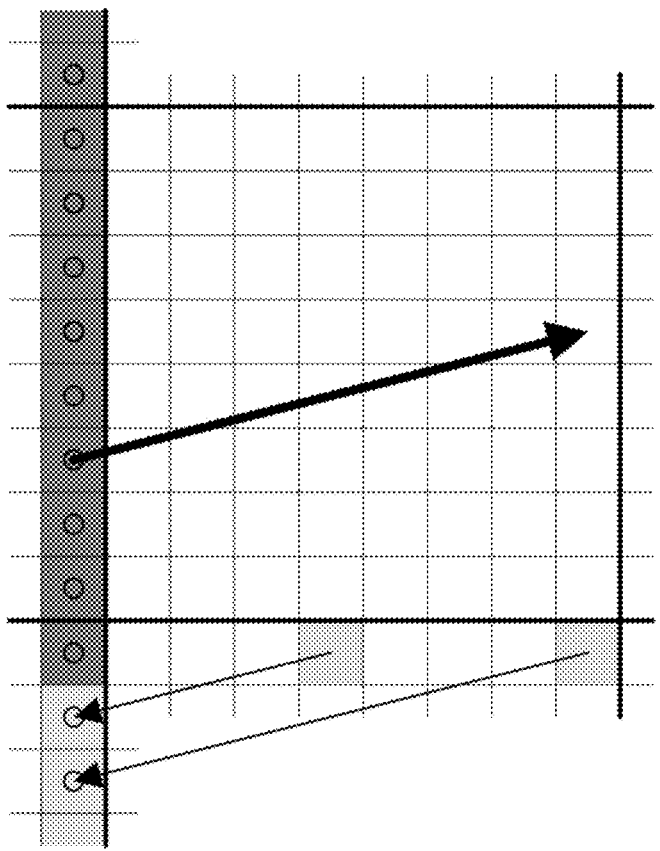
FIG. 11A depicts an example projection of left reference samples to extend the top reference row to the left.

The angular predictions may be designed to predict the directional textures. For example, in HEVC, the intra angular prediction process may be performed by extrapolating sample values from the reconstructed reference samples utilizing a given direction. One or more (e.g., all) sample locations within the current block may be projected to a reference row or column (e.g., depending on the angular mode). If the projected pixel locations have negative indexes, the reference row may be extended to the left by projecting the left reference column for vertical prediction, whereas the reference column may be extended upward by projecting the top reference row for horizontal prediction. FIGS. 11A-B depict example projection for left reference samples (e.g., FIG. 11A) and above reference samples (e.g., FIG. 11B). The bold arrow in FIGS. 11A-B may represent the prediction direction and the thin arrows may represent the reference sample projection. FIG. 11A depicts an example process for extending the top reference row using samples from the left reference column. The predicted samples may be filtered at the block boundaries to reduce blocking artifacts (e.g., the intra prediction block has been generated). For vertical intra mode (e.g., in HEVC), the left-most column of the prediction samples $s_{i,j}$ may be adjusted using the left reference column $R_{i,j}$ as follows:

$$s_{1,j} = s_{1,j} + (R_{0,j} - R_{0,0}) \quad j = 1 \ldots N \quad (14)$$

Figure 12B:
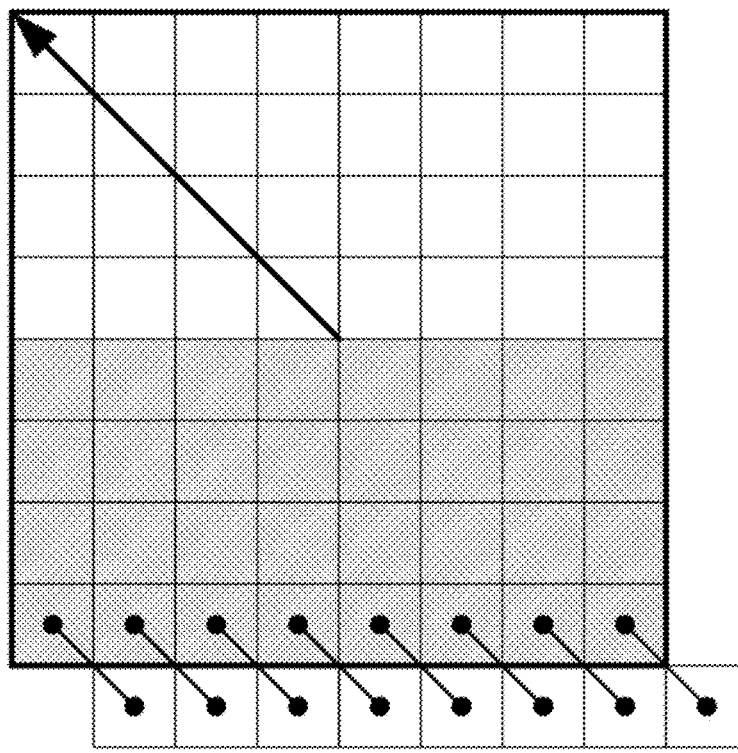
FIGS. 12A-D depict example boundary prediction filtering for (A) intra mode 2; (B) intra mode 34; (C) intra modes 3-6; and (D) intra modes 30-33.
Figure 12A:
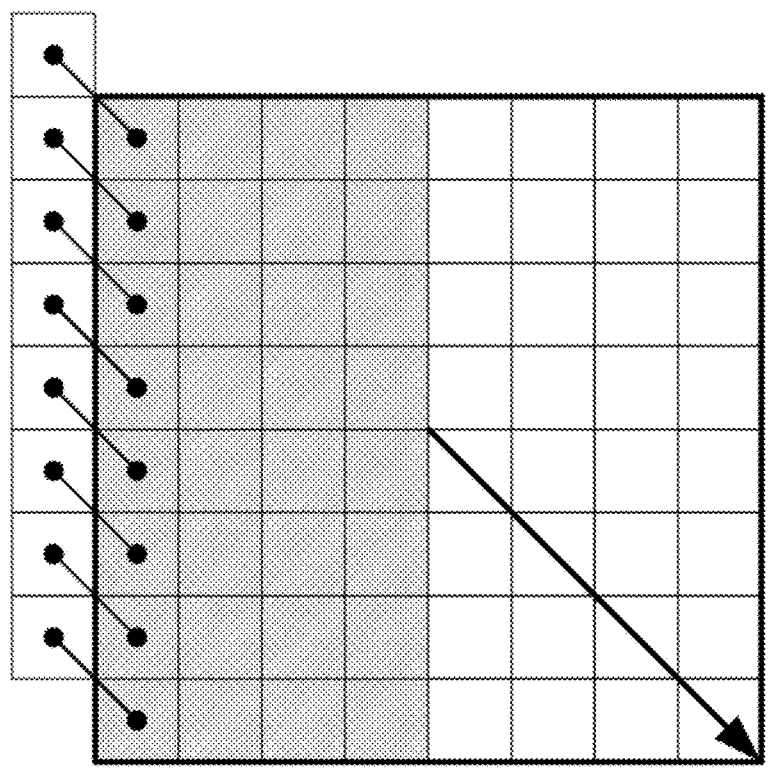
Figure 12D:
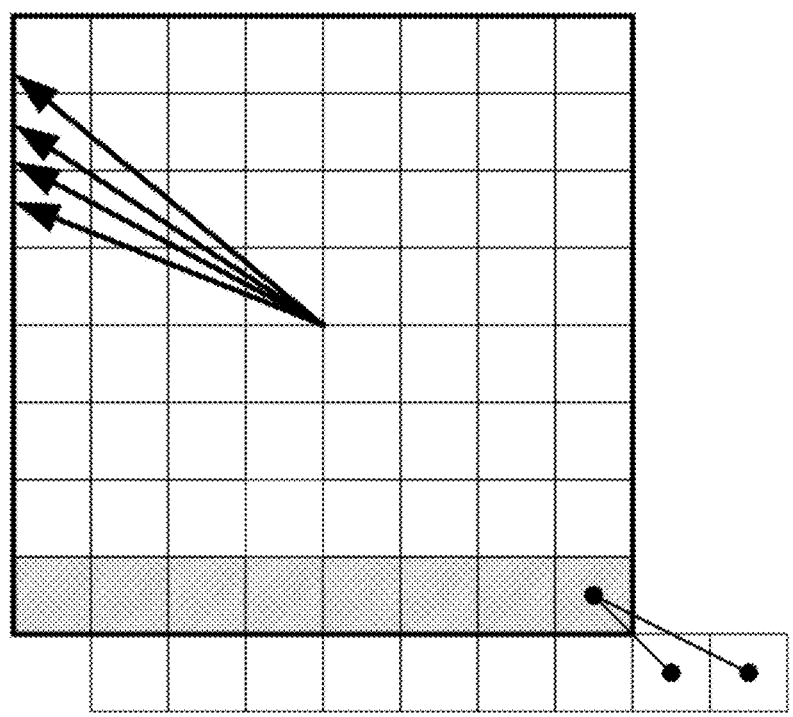
Figure 12C:
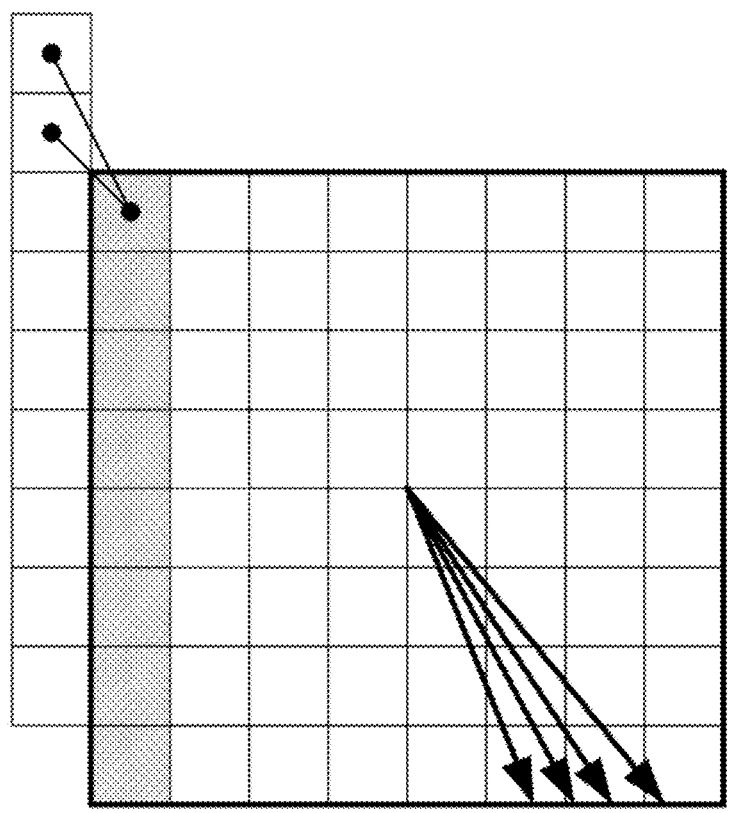

For horizontal intra mode, the top-most row of the prediction samples may be adjusted using a similar process. FIGS. 12A-D depict examples of boundary prediction filtering for other angular modes. For example, FIG. 12A depicts an example boundary prediction filtering for intra mode 2. For example, FIG. 12B depicts an example boundary prediction filtering for intra mode 34. For example, FIG. 12C depicts an example boundary prediction filtering for intra mode 3-6. For example, FIG. 12D depicts an example boundary prediction filtering for intra mode 30-33. An appropriate intra prediction mode may be selected at the encoder side by minimizing the distortion between prediction generated by one or more intra prediction modes and original samples. Most probable mode (MPM) may be used for intra coding (e.g., to encode the intra prediction mode efficiently). The MPM may reuse the intra angular mode of spatial neighboring PUs. For example, the MPM may reuse the intra angular mode of spatial neighboring PUs so that it may not code the intra angular mode for current PU.

Figure 13:
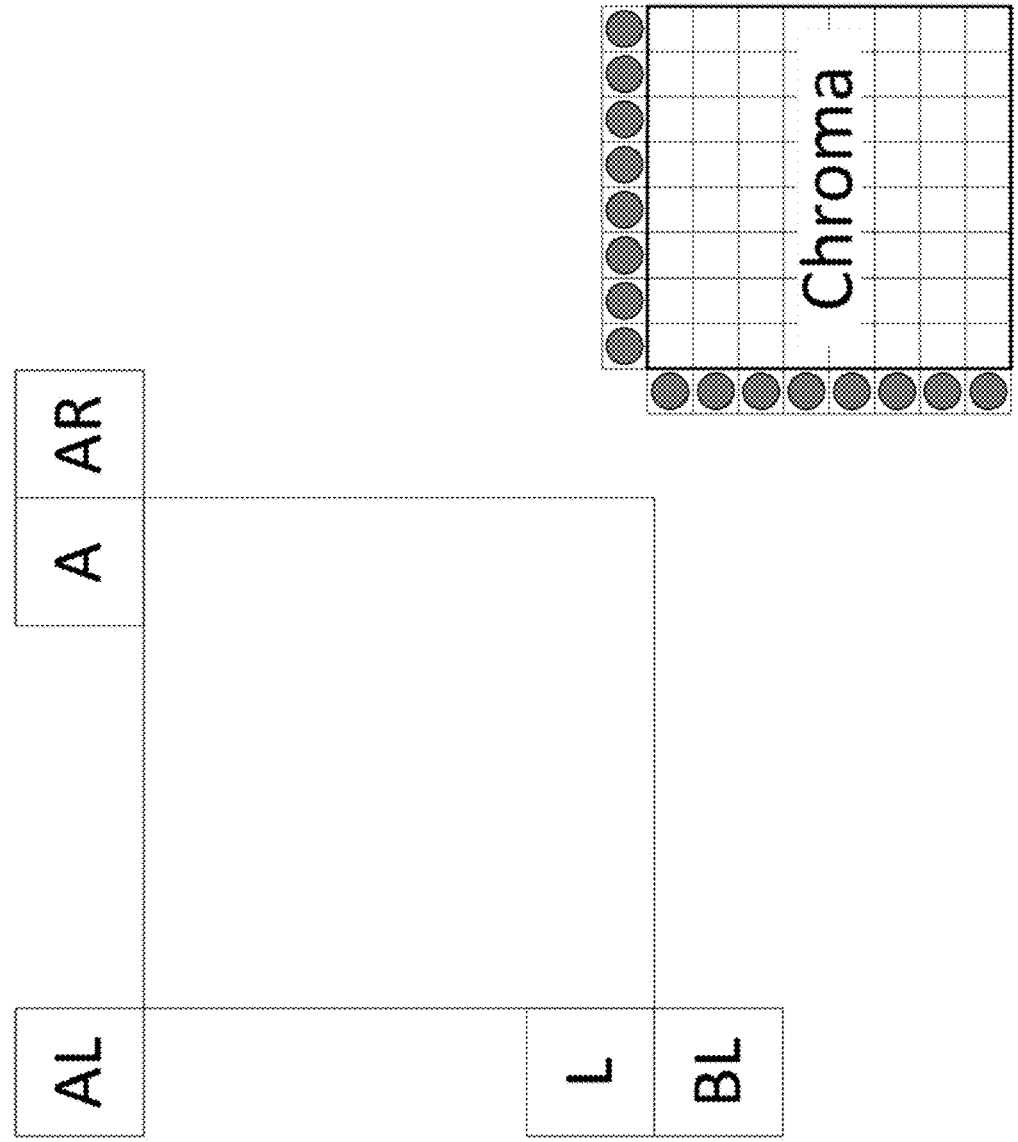
FIG. 13 depicts example spatial neighbors used for most probable modes in the HEVC intra angular process.

FIG. 13 depicts an example spatial neighbors (e.g., bottom left (BL), left (L), above right (AR), top (A), above left (AL)) used for MPM candidate derivation. The selected MPM candidate index may be coded. The MPM candidate list may be constructed at the decoder side in the same way as the encoder side. The entry with the signaled MPM candidate index may be used as the intra angular mode of current PU. RGB to YUV color conversion may be performed, e.g., to reduce the correlation between the different channels. A correlation between the luma and chroma channels may exist. The cross-component linear model prediction may exploit this correlation to predict the chroma channels from the luma channels using a liner model to predict the chroma sample values, $p_{i,j}$, from the downsampled reconstructed luma sample values, $L'_{i,j}$, as follows (e.g., assuming a chroma block of N×N samples and following the same notation as in FIG. 9):

$$p_{i,j} = \alpha \cdot L'_{i,j} + \beta \quad (15)$$

The downsampled luma samples may be computed as follows:

$$L'_{i,j} = \frac{L_{2i-2,2j-1} + 2 \cdot L_{2i-1,2j-1} + L_{2i,2j-1} + L_{2i-2,2j} + 2 \cdot L_{2i-1,2j} + L_{2i,2j}}{8} \quad (16)$$

The parameters of the linear model may be derived by minimizing the regression error between the top and left neighboring reconstructed samples. The parameters of the linear model may be computed as follows:

$$\alpha = \frac{2 \cdot N \cdot \left[\sum_{i=1}^{N}(L'_{i,0} \cdot C_{i,0}) + \sum_{j=1}^{N}(L'_{0,j} \cdot C_{0,j})\right] - \left(\sum_{i=1}^{N} L'_{i,0} + \sum_{j=1}^{N} L'_{0,j}\right) \cdot \left(\sum_{i=1}^{N} C_{i,0} + \sum_{j=1}^{N} C_{0,j}\right)}{2 \cdot N \cdot \left[\sum_{i=1}^{N}(L'_{i,0} \cdot L'_{i,0}) + \sum_{j=1}^{N}(L'_{0,j} \cdot L'_{0,j})\right] - \left(\sum_{i=1}^{N} L'_{i,0} + \sum_{j=1}^{N} L'_{0,j}\right) \cdot \left(\sum_{i=1}^{N} L'_{i,0} + \sum_{j=1}^{N} L'_{0,j}\right)} \quad (17)$$

$$\beta = \frac{\left(\sum_{i=1}^{N} C_{i,0} + \sum_{j=1}^{N} C_{0,j}\right) - \alpha \cdot \left(\sum_{i=1}^{N} L'_{i,0} + \sum_{j=1}^{N} L'_{0,j}\right)}{2 \cdot N} \quad (18)$$

Figure 14:
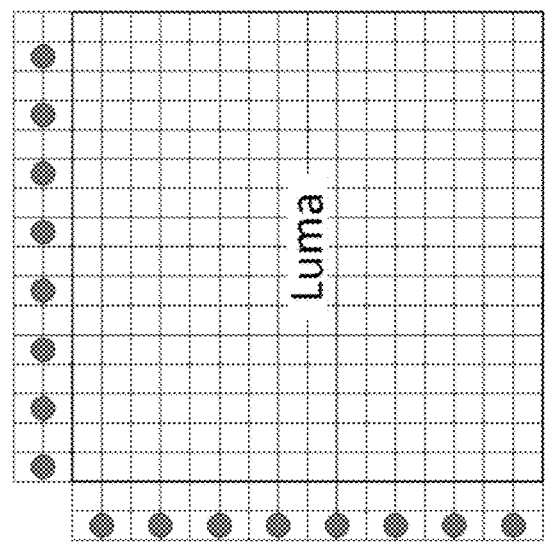
FIG. 14 depicts an example location of the samples used for derivation of a and B in cross-component linear model prediction.
Figure 15:
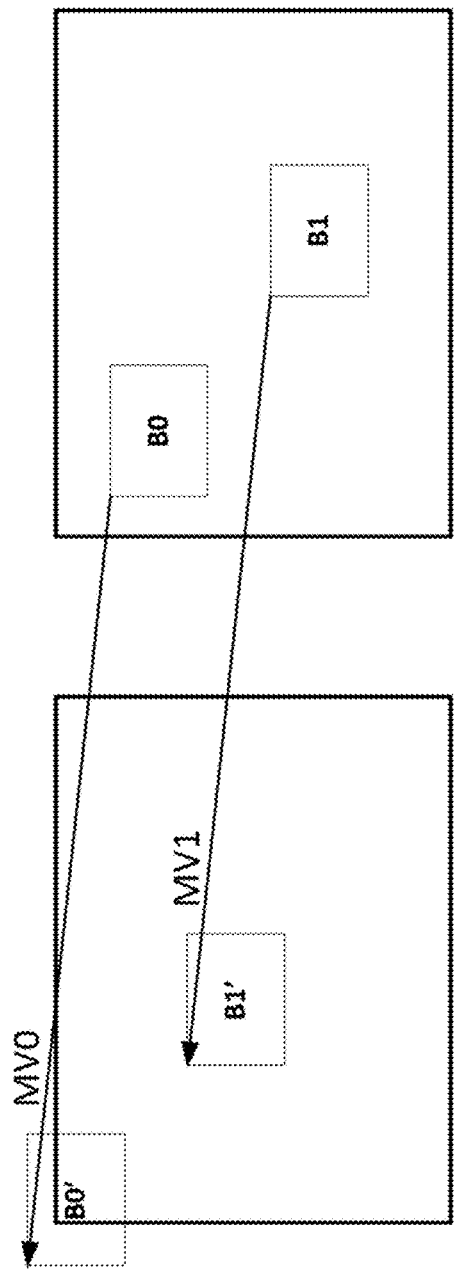
FIG. 15 depicts an example inter prediction with one motion vector.
Figure 16:
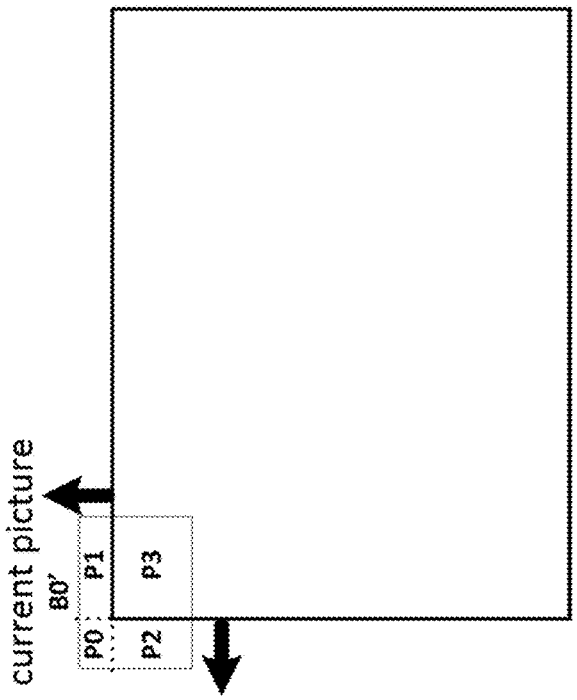
FIG. 16 depicts an example padding for reference samples outside the picture boundary.
Figure 17:
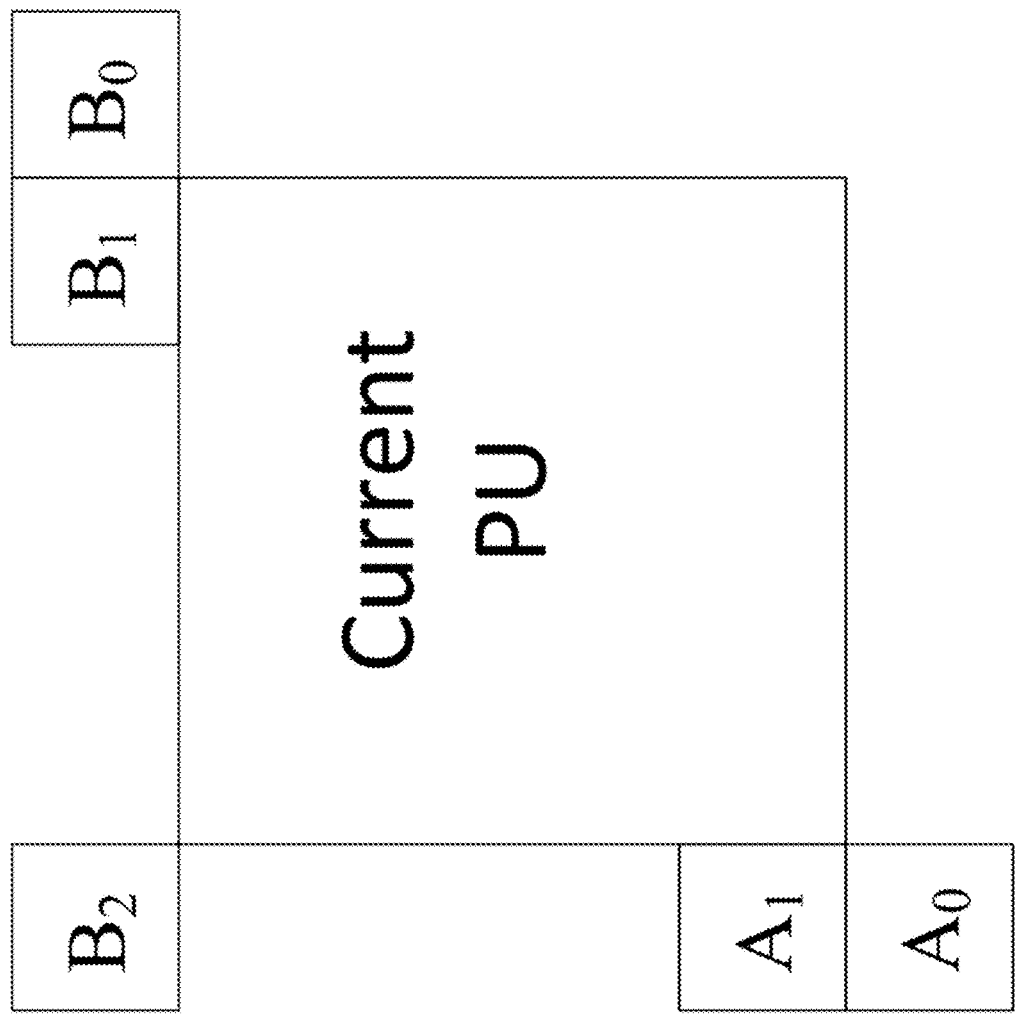
FIG. 17 depicts an example spatial neighbors used for merge candidates in the HEVC merge process.

FIG. 14 depicts an example location of the top and left neighboring reconstructed samples used for the derivation of α and β. FIG. 15 depicts an example inter prediction with a motion vector (MV). The block B0' and B1' in the reference picture may be the reference block of block B0 and B1, respectively. The reference block B0' may be partially outside the picture boundary. The padding process (e.g., in HEVC/H.264) may be configured to fill unknown samples outside the picture boundary. FIG. 16 depicts an example padding for reference samples outside the picture boundary (e.g., Block B0') in HEVC/H.264. The Block B0' may have 4 parts, e.g., P0, P1, P2, and P3. Part P0, P1, and P2 may be outside the picture boundary and may be filled with padding process. Part P0 may be filled with the top-left sample of the picture. Part P1 may be filled with vertical padding using the topmost row of the picture. Part P2 may be filled with horizontal padding using the leftmost column of the picture. Motion vector prediction and merge mode may be used for inter coding to encode the motion vector information. The motion vector prediction may use the motion vectors from its neighboring PUs or temporal collocated PU as current MV's predictor. The encoder and/or the decoder may form a motion vector predictor candidate list, e.g., in the same manner. The index of the selected MV predictor from the candidate list may be coded and signaled to the decoder. The decoder may construct a MV predictor list, and the entry with the signaled index may be used as the predictor of current PU's MV. The merge mode may reuse the MV information of spatial and temporal neighboring PUs, so that it may not code the motion vectors for current PU. The encoder and/or the decoder may form a motion vector merge candidate list, e.g., in the same manner. FIG. 17 depicts an example spatial neighbors (e.g., bottom left, left, above right, above, above left) used for merge candidate derivation. The selected merge candidate index may be coded. The merge candidate list may be constructed at a decoder side, e.g., in the same way as at an encoder. The entry with the signaled merge candidate index may be used as the MV of current PU.

A frame packed 360-degree video may have different characteristics than the 2D video. The 360-degree video may include 360-degree information of the environment surrounding a viewer. The 360-degree information may indicate that the 360-degree video has an intrinsic circular symmetry. The 2D video does not have this symmetry characteristic. A video codec(s) may have been designed for a 2D video and may not consider the symmetric feature of the 360-degree video. For example, the codec(s) may process (e.g., code) the video in a coding order. For example, the codec(s) may process the video signal block-by-block using a coding order, such as a raster scan order, that codes the block from top to bottom and/or from left to right. The information for coding the current block may be inferred from blocks located above and/or on the left of the current block.

Figure 18A:
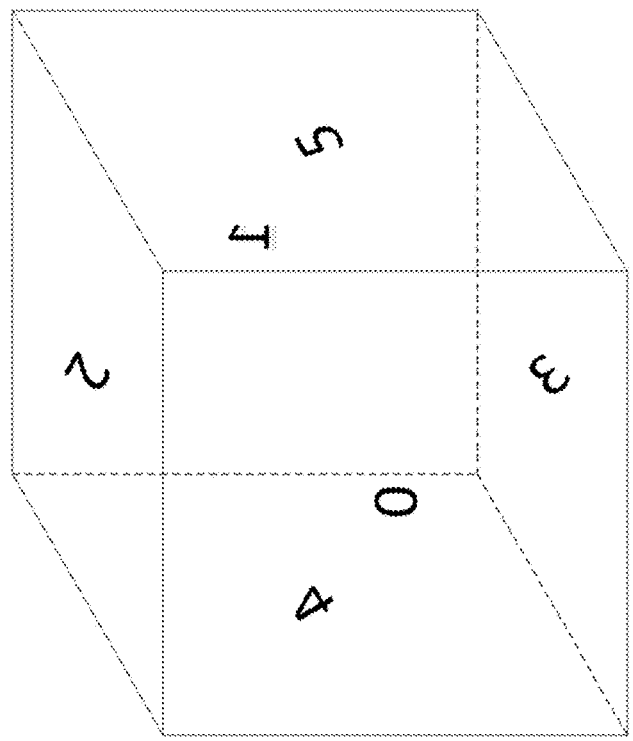
FIG. 18A depicts an example 3D representation of CMP.
Figure 18B:
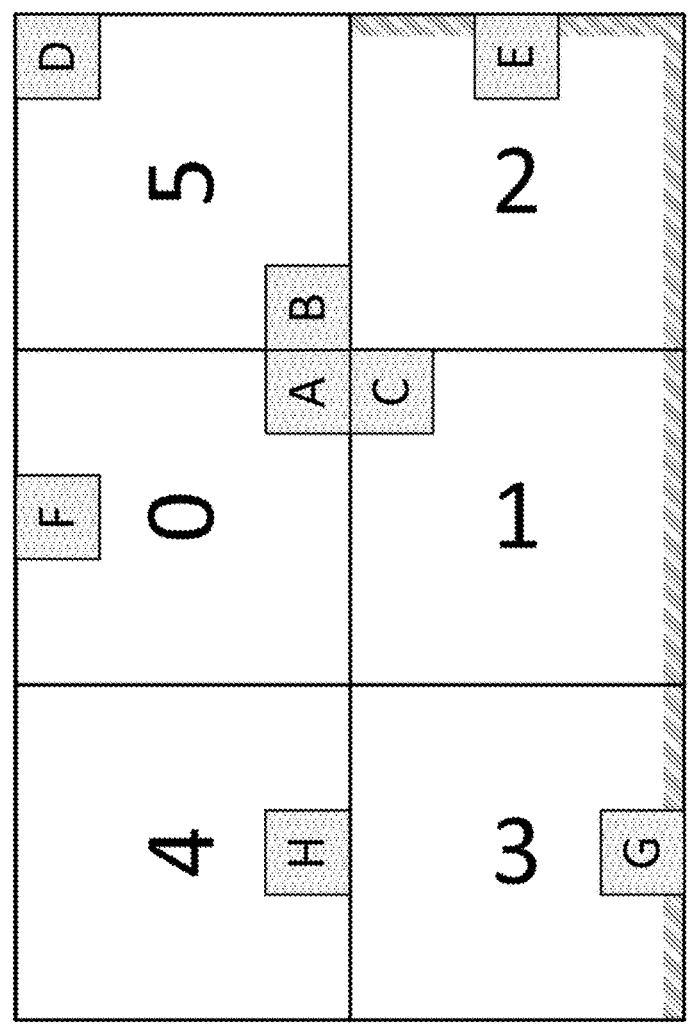
FIG. 18B depicts an example 3×2 frame packing configuration of CMP.

For 360-degree video, a neighboring block in the frame packed picture may not be the relevant one, e.g., to code the current block. Blocks that are neighbors of the current block in the frame packed picture may be frame packed neighbors. Blocks that are neighbors of the current block in the 3D geometry may be as face neighbors or spherical neighboring blocks. FIGS. 18A-B depict examples of CMP. FIG. 18A depicts an example 3D representation of CMP. FIG. 18B depicts an example 3×2 frame packing configuration of CMP. In FIGS. 18A-B, block A may be the frame packed neighbor located above block C. Considering the 3D geometry, block D may be the correct face neighbor (e.g., or spherical neighboring block) located above block A. An additional face neighbor block in 360-degree video coding may be used. For example, when the current block is at the right and/or bottom face boundary associated with a face of the frame-packed picture, the right and/or bottom face neighbor block may be used. The right and/or bottom face neighbor block may be located in the face that is on the other side (e.g., on the opposite side or cross-face) of the boundary. For example, the right and/or bottom face neighboring block may share boundary located at the right and/or bottom face boundary of the face that the current block belongs to. The face arrangement and/or scan processing order (e.g., raster scan order) may be used to determine which blocks may be used to code the current block as described herein. In the example depicted in FIG. 18B, block B may be the right face neighbor with respect to block A. If the block B is the right face neighbor with respect to block A, the right face neighbor may match the right frame packed neighbor. If the block is scanned from left to right (e.g., a raster scan having the scan order moving from left to right), block B may not be coded when coding block A, and the right face neighbor may not be available (e.g., may not be coded yet). When encoding block E, its right face neighbor (e.g., block F using the intrinsic spherical characteristics of 360-degree video), may have been coded and may be used to code (e.g., predict) block E. When encoding block G, its below face neighbor (e.g., block H using the intrinsic spherical characteristics of 360-degree video) may have been coded and may be used to code (e.g., predict) block G. In FIGS. 18A-B, a block located at the face boundary in one of the hatched areas (e.g., FIG. 18B) may use its right and/or below face neighbor block(s) in the coding (e.g., prediction) process of the current block, as their right and/or bottom neighbors have already been coded (e.g., available), e.g., considering the spherical characteristic(s) of 360-degree video. The right and/or bottom face neighbor blocks may be used as reference blocks.

For example, the left (L), above (A), above right (AR), above left (AL), and/or below left (BL) neighbors may be used to infer information (e.g., because of the scan order, such as raster scan processing) in 2D video coding (e.g., as shown in FIG. 13 and FIG. 17). With 360-degree video, if the current block is at the right face boundary, the right (R) and below right (BR) face neighbor blocks may be used for inferring attributes (e.g., for deriving the list of MPMs in intra prediction) for deriving motion vector candidates in motion vector prediction and/or merge mode. If the current block is at the bottom face boundary, the below (B) and below right (BR) face neighbor blocks may be used for inferring attribute(s). One or more additional spatial candidates may be used for inferring attribute(s) from neighboring blocks.

Figure 19:
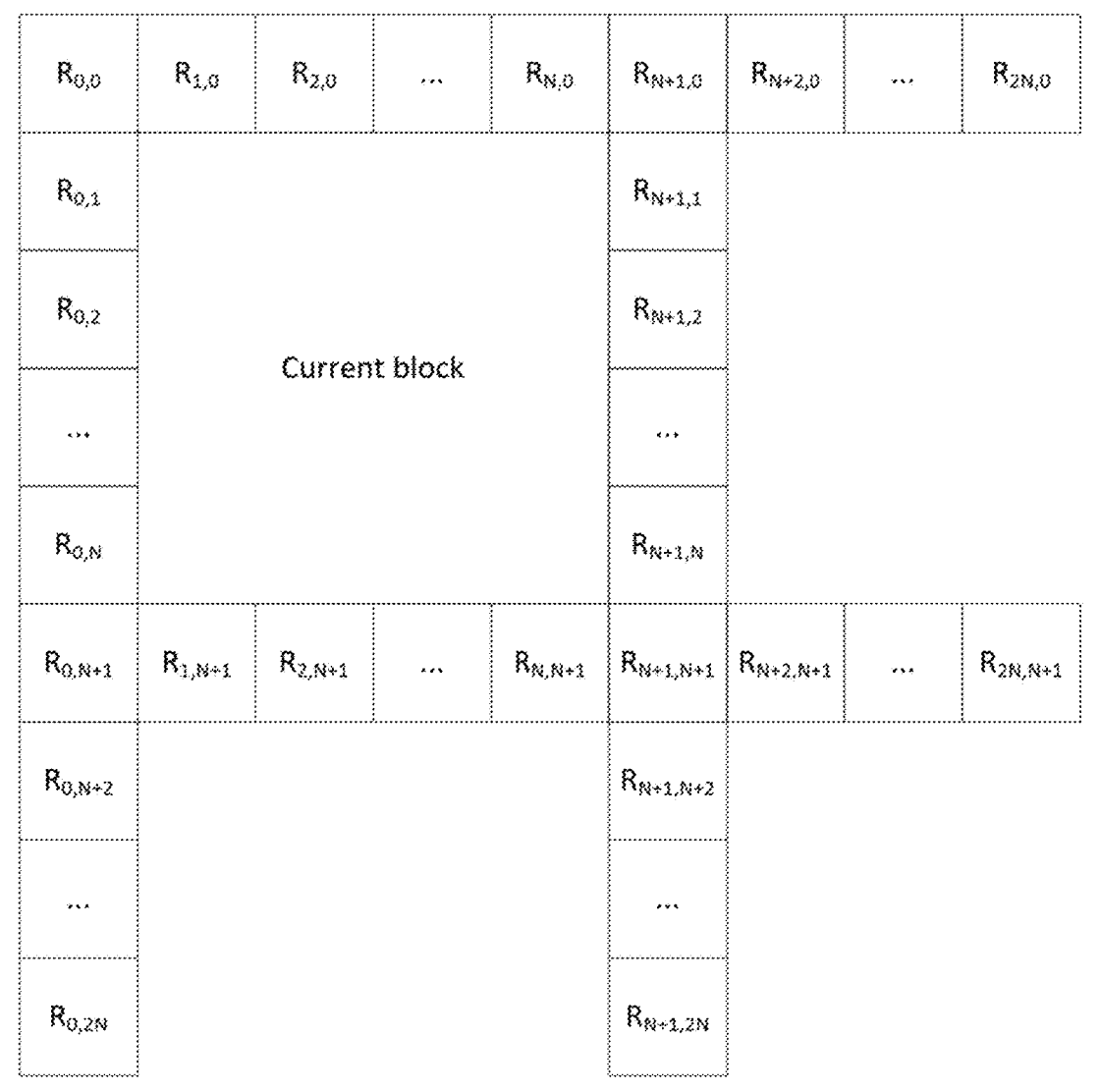

For example, reconstructed samples located above and/or on the left of the current block may be used (e.g., because of the raster scan processing) in 2D video coding for predicting the current block (e.g., as shown in FIG. 9). With 360-degree video, if the neighboring reconstructed samples are located outside of the face that the current block belongs to, the samples may be extrapolated, e.g., using geometry padding. For example, if a block is at the right face boundary, samples $R_{N+1,0}$ .... $R_{2N,0}$ may be obtained using geometry padding. The reconstructed samples located on the right side of the block (e.g., $R_{N+1,0}$ .... $R_{N+1,2N}$ shown in FIG. 19) may be used. FIG. 19 depicts example reconstructed samples used for prediction the current block in intra and inter coding. When a block is at the bottom face boundary, samples located on the bottom side of the block (e.g., $R_{0,N+1}$ .... $R_{2N,N+1}$) may be used. As described herein, reconstructed samples (e.g., additional and/or more meaningful reconstructed samples) may be used in different prediction methods (e.g., DC, planar, and/or angular modes in intra prediction, cross-component linear model prediction, boundary prediction filtering, and/or in-loop filtering).

360-degree video coding may use spatial neighbors and reconstructed samples for intra prediction and/or inter prediction. A block described herein may include a current block or a sub-block and may be used interchangeably. If a block is on the right (e.g., or bottom) face boundary, its right and below right (e.g., or below and below right) face neighbor blocks may be considered as a candidate(s) for the different procedure(s) that infer attributes from spatial neighbors (e.g., for deriving the MPM in the intra angular process, for deriving the merge mode in inter prediction, for motion vector prediction and/or the like). The blocks outside of the current face may be obtained from the neighboring face(s). The position of spatial candidates at face boundaries may be described herein.

For intra and/or inter prediction, if a block (e.g., current block) is on the right (e.g., or bottom) face boundary, the reconstructed samples from its right and below right (e.g., or below and below right) face neighbor blocks may be used for coding (e.g., predicting) the current block. The reconstructed samples may be outside of the current face and may be obtained, e.g., using geometry padding. The position of reconstructed samples at face boundaries may be identified as described herein.

For intra prediction, if a block is on the right (e.g., or bottom) face boundary, the reconstructed samples from its right and below right (e.g., or below and below right) face neighbor blocks may be used for deriving the reference samples. If a block is on the right (e.g., or bottom) face boundary, one or more additional horizontal (e.g., or vertical) angular prediction modes may be defined. The reference samples derivation process and one or more additional angular modes at face boundaries may be described herein.

For intra angular prediction, if a block is on the right (e.g., or bottom) face boundary, the boundary filtering may be applied at the block right (e.g., or bottom) boundary. For example, the boundary filtering may be applied at the block right (e.g., bottom) boundary to reduce the discontinuity that may appear at the intersection between interpolated and reconstructed samples. The boundary prediction filtering at face boundaries may be described herein.

In 2D video coding, the top, right, bottom, and/or left picture boundaries may not be filtered, e.g., during the in-loop filtering process. For deblocking, a sample(s) outside of the boundaries (e.g., top, right, bottom, and/or left) may not exist. For 360-degree video coding, the top, right, bottom, and/or left boundaries of a face may be connected to another face boundary. For example, 360-degree video coding, the top, right, bottom, and/or left boundaries of a face may be connected to another face boundary because of the intrinsic circular characteristic of the 360-degree video. In-loop filtering may be applied across one or more (e.g., all) face boundaries. The in-loop filtering process at face boundaries may be described herein.

For cross-component linear model prediction, if a block is on the right (e.g., or bottom) face boundary, the reconstructed samples from its right (e.g., or below) face neighbor blocks may be used for estimating the parameters of the linear model. The reconstructed samples may be outside of the current face and may be obtained, e.g., using geometry padding. The position of reconstructed samples at face boundaries, downsampling of the reconstructed luma samples, and/or derivation of the linear model parameters may be described herein.

One or more faces may be processed (e.g., processed sequentially) by using a scan order (e.g., raster scan order) within a face. With a face scan order, the availability of face neighbor blocks may be increased. The face scan order is described herein.

For CMP and/or related cube-based geometries, one or more faces may be packed using a configuration described herein. For example, the one or more faces may be packed, e.g., having a 3×2 packing configuration. The 3×2 packing configuration described herein may maximize the availability of face neighbor blocks.

A coding device (e.g., a device that may be or may include an encoder and/or a decoder) may use one or more additional neighboring blocks, e.g., based on a position of a current block inside a geometry face. For example, a coding device may use one or more additional neighboring blocks based on the position of the current block inside of the geometry face to increase a number of candidates that infer information from neighboring block(s). A coding device may use MPM in intra prediction, motion estimation in inter prediction, and/or merge mode in inter prediction to infer information from the neighboring block(s).

In examples, a coding device (e.g., a device that may be or may include an encoder and/or a decoder) may receive a frame-packed picture coded in a coding order. The current block may be located at an exiting boundary of the face in the frame-packed picture that the current block belongs to. For example, the coding device may determine that the current block is located at the exiting boundary of the face that the current block belongs according to the coding order of the frame-packed picture. The exiting boundary of the face that the current block belongs to may be located in the same direction of the coding order relative to the current block.

In examples, the coding block may have left to right direction relative to the current block. If the coding block has left to right direction relative to the current block, the exiting boundary of the face in the frame-packed picture that the current block belongs to may be located at the right face boundary (e.g., rightmost face boundary) that the current block belongs to (e.g., that may be in the same direction as the coding order). In examples, the coding block may have top to bottom direction relative to the current block. If the coding block has top to bottom direction relative to the current block, the exiting boundary of the face in the frame-packed picture that the current block belongs to may be located at the bottom face boundary (e.g., bottommost face boundary) that the current block belongs to (e.g., that may be in the same direction as the coding order). In examples, the coding block may have left to right and top to bottom direction relative to the current block. If the coding block has left to right and top to bottom direction relative to the current block, the exiting boundary of the face in the frame-packed picture that the current block belongs to may be located at the right and bottom face boundary (e.g., rightmost and bottommost face boundary) that the current block belongs to (e.g., that may be in the same direction as the coding order).

If the coding device determines that the current block is located at an exiting boundary of the face that the current block belongs to (e.g., the rightmost and/or bottommost face boundary that the current block belongs to), the coding device may identify one or more (e.g., multiple) spherical neighboring blocks of the current block. For example, the coding device may identify the spherical neighboring block(s) of the current block based on the spherical characteristics of the 360-degree video.

The coding device may identify a cross-face boundary neighboring block located on a face (e.g., another face) among the identified spherical neighboring blocks. The face that the cross-face boundary neighboring block belongs to may share the boundary (e.g., right and/or bottom face boundary) of the face that the current block belongs to. For example, the cross-face boundary neighboring block may be located outside of the current block and may be located across the face that the current block belongs to and/or in an opposite side of the face boundary from the current block. The cross-face boundary neighboring block may be located in the same direction of the coding order relative to the current block. For example, the cross-face boundary neighboring block may be the right (R) block, below (B) block, and/or below right (BR) block of the current block.

In examples, if the current block is located at the right boundary (e.g., rightmost boundary) of the face that the current block belongs to, the coding device may determine whether the identified block that corresponds to the cross-face neighboring block (e.g., right (R) block and/or below right (BR) block) may be used as candidate(s) (e.g., additional candidate(s)), as depicted on FIG. 20A.

Figures 20A, 20B, 20C:
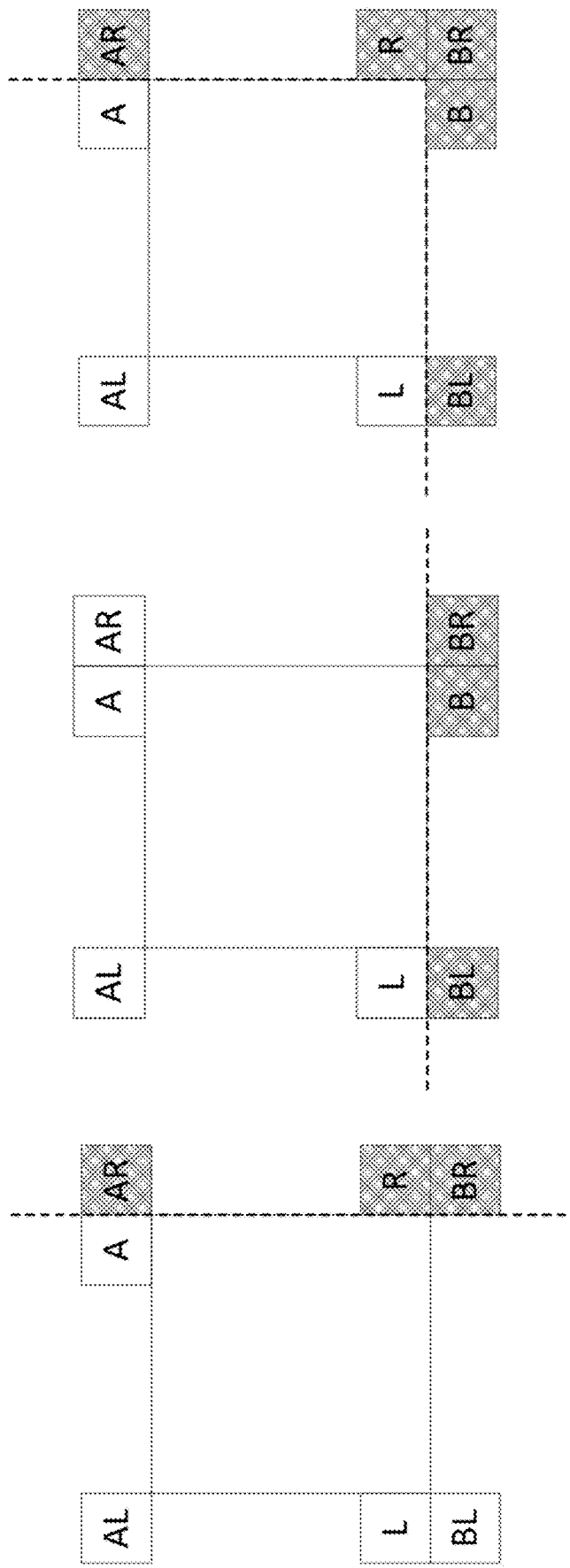
FIGS. 20A-C depict example spatial neighbors at the (A) right face boundary; (B) bottom face boundary; and (C) bottom right face boundary.

FIGS. 20A-C depict example spatial neighbors at the right face boundary (e.g., FIG. 20A), bottom face boundary (e.g., FIG. 20B), and bottom right face boundary (e.g., FIG. 20C) of the face that the current block belongs to. Block(s) depicted using a hatched pattern in FIGS. 20A-C may be located outside of the current face. If the current block is at the bottom face boundary, the below (B) and/or below right (BR) (e.g., already coded neighboring blocks) may be used as candidates (e.g., additional candidates), as depicted on FIG. 20B, e.g., to predict the current block. The current block located at the bottom face boundary may follow similar approach as described herein for the right face boundary. If the current block is at the bottom right face boundary, the right, below, and/or below right (e.g., already coded neighboring blocks) may be used as candidates (e.g., additional candidates), as depicted on FIG. 20C, e.g., to predict the current block. The current block located at the bottom right face boundary may follow similar approach as described herein for the right face boundary. If a neighboring block position is outside of the current face, the corresponding block may be obtained from the corresponding neighboring face (e.g., by mapping sample position for deriving a spatial neighboring block as described herein).

Upon identifying the cross-face boundary neighboring block, the coding device may identify a block in the frame-packed picture that corresponds to the cross-face neighboring block. For example, the coding device may identify a block in the frame-packed picture that corresponds to the cross-face neighboring block based on frame-packing information of the 360-degree video.

The coding device may determine whether to use the identified block in the frame-packed picture that corresponds to the cross-face neighboring block to code the current block. For example, the coding device may determine whether to use the identified block that corresponds to the cross-face neighboring block to code the current block, e.g., based on the availability of the identified block in the frame-packed picture. The identified block in the frame-packed picture may be considered available if the identified block has been coded. The coding device may determine whether the identified block that corresponds to the cross-face neighboring block (e.g., right and/or below right block(s)) has been coded and/or available to code the current block. If the coding device determines that the identified block that corresponds to the cross-face neighboring block (e.g., right and/or below right block(s)) are available (e.g., already been coded), the coding device may use the identified block that corresponds to the cross-face neighboring block.

The coding device may determine not to use the identified block that corresponds to the cross-face neighboring block. In examples, the coding device may determine that the identified block that corresponds to the cross-face neighboring block has not been coded and/or unavailable to code the current block. In examples, the coding device may determine that the current block is located within a face that the current block belongs to. In examples, the coding device may determine that the current block is located at an entering boundary of the face that the current belongs to. The entering boundary of the face that the current block belongs to may be located according to the coding order relative to the frame-packed picture. If the coding device determines not to use the identified block that corresponds to the cross-face neighboring block (e.g., when the cross-face neighboring block is not available and/or has not been coded, the current block is located within a face, or the current block is located at an entering boundary of a face that the current block belongs to), the coding device may use one or more spherical neighboring block(s) that has been coded to code the current block. A spherical neighboring block(s) described herein may include a neighboring block of a frame-packed or a neighboring block of the 3D geometry (e.g., that have been already coded). For example, the coding device may use at least one of left (L), above (A), and/or above left blocks as the one or more spherical neighboring block(s) to code (e.g., predict) the current block. In examples, the coding device may use geometry padding to code (e.g., predict) the current block.

A coding device may use one or more additional blocks (e.g., associated with an identified block that corresponds to a cross-face neighboring block described herein) to increase the number of available samples associated with the one or more additional block to predict the current block (e.g., intra prediction). For example, the coding device may use one or more additional reconstructed samples, e.g., based on the position of the current block inside a geometry face. For example, the coding device may use one or more reconstructed samples (e.g., additional reconstructed samples) associated with an identified block that corresponds to a cross-face neighboring block described herein and/or shown in FIG. 19.

In examples, the coding device may not use one or more (e.g., all) reconstructed samples (e.g., additional reconstructed samples as described herein). For example, if the coding device determines that a current block is within a face and/or if the current block is located at the face boundary and the current block is located in the opposite direction of the coding order relative to the current block (e.g., at the top face boundary and/or at the left face boundary), the coding device may use one or more reconstructed samples depicted in FIG. 9. For example, the coding device may use one or more reconstructed samples that are available (e.g., coded). The one or more available reconstructed samples may be located in the left and/or above neighboring block(s) of the current block (e.g., spatial neighboring block(s)). One or more samples located at the right and/or bottom neighboring block of the current block may not be available (e.g., may not have been coded and/or reconstructed). If one or more reconstructed samples are outside of the current block (e.g., current block associated with the current face), the coding device may obtain one or more reconstructed samples, e.g., using geometry padding.

Figures 21A, 21B:
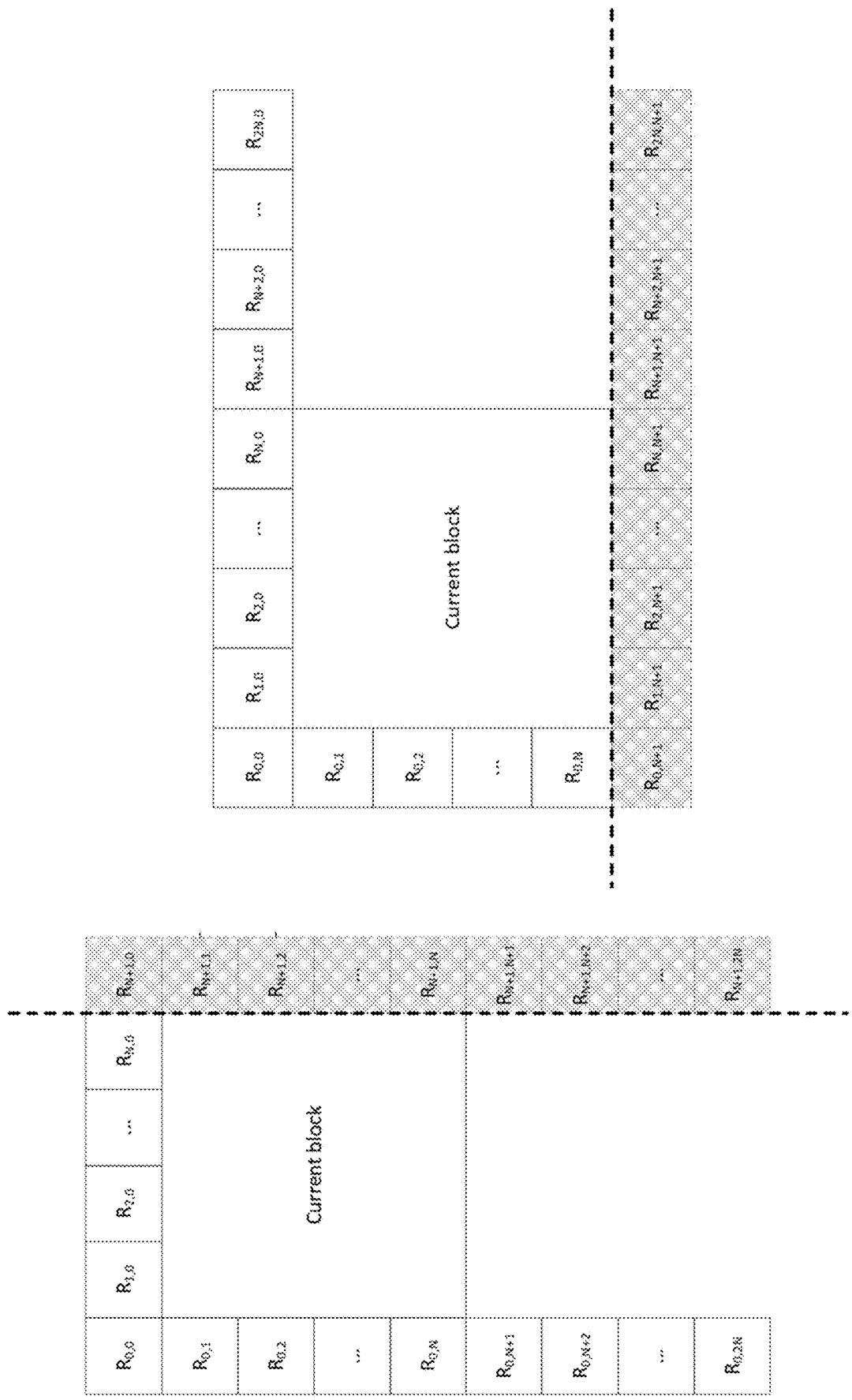
FIGS. 21A-C depict example availability of reconstructed samples at the (A) right face boundary; (B) bottom face boundary; and (C) bottom right face boundary.
Figure 21C:
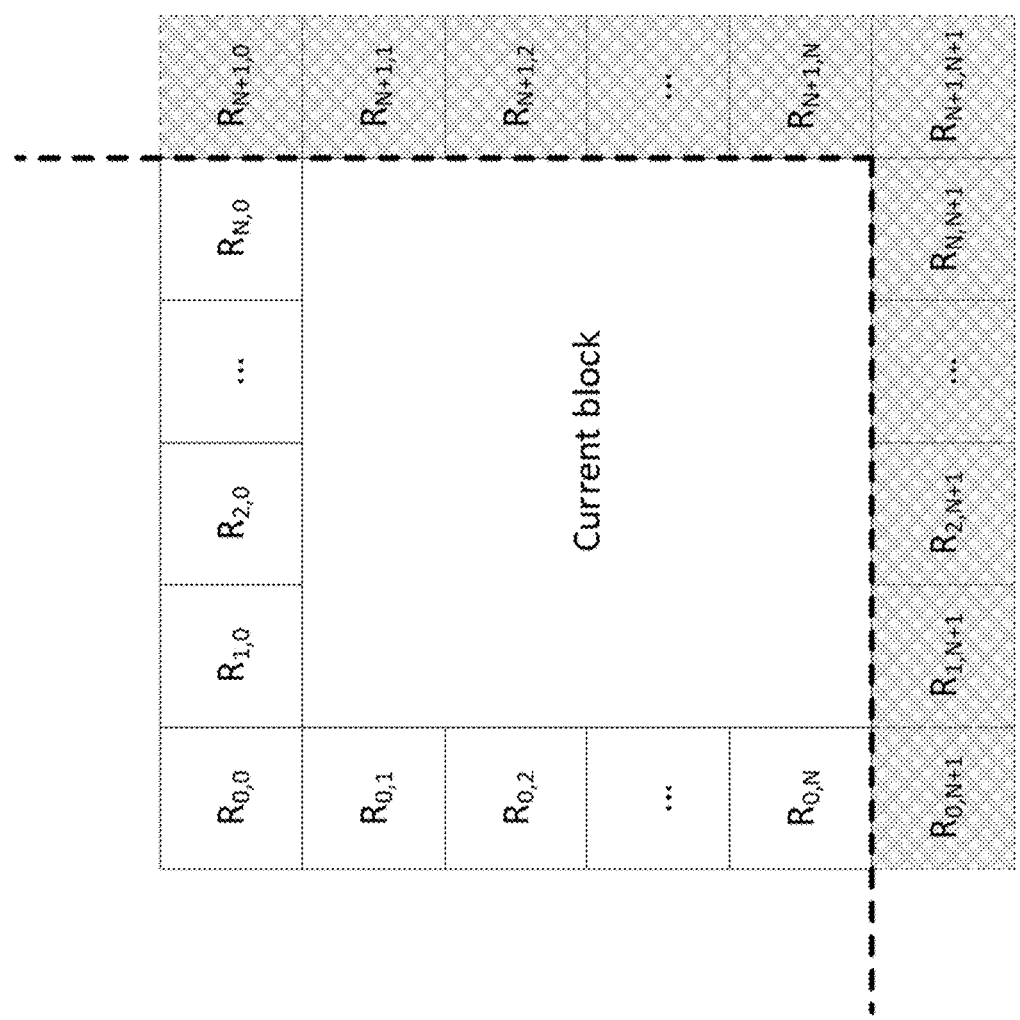

As described herein, a coding device may determine to use one or more samples from the identified block that corresponds to the cross-face neighboring block for coding the current block. In examples, if the coding device determines that the current block is located at the right face boundary of a face associated with a frame-packed picture, the coding device may use one or more reconstructed samples located on the right side of the current block (e.g., $R_{N+1,0} \ldots R_{N+1,2N}$) (e.g., in addition to the one or more reconstructed samples associated with a block(s) located on the left and/or above the current block (e.g., $R_{0,0} \ldots R_{0,2N}$ and/or $R_{0,0} \ldots R_{N,0}$, respectively), as depicted on FIG. 21A). FIGS. 21A-C depict examples of one or more (e.g., additional) available reconstructed samples at the right face boundary (e.g., FIG. 21A), bottom face boundary (e.g., FIG. 21B), and bottom right face boundary (e.g., FIG. 21C). Reconstructed sample(s) depicted using a hatched pattern in FIGS. 21A-C may be located outside of the current block (e.g., or current face). A coding device may apply pre-processing to one or more of the reconstructed samples. For example, pre-processing may include, but not limited to filtering, interpolation, and/or resampling. If the coding device applies pre-processing (e.g., filtering, interpolation, and/or resampling) on the one or more of the reconstructed samples located on the left side of the current block, the coding device may apply similar (e.g., same) pre-processing on the one or more reconstructed samples located on the right side of the current block.

In examples, if the coding device determines that the current block is at located at the bottom face boundary of a face associated with a frame-packed picture, the coding block may use one or more reconstructed samples located below the current block (e.g., $R_{0,N+1} \ldots R_{2N,N+1}$) (e.g., in addition to the one or more reconstructed samples associated with a block(s) located on the left and/or above the current block (e.g., $R_{0,0} \ldots R_{0,N}$ and/or $R_{0,0} \ldots R_{2N,0}$, respectively), as depicted on FIG. 21B). If the coding device applies pre-processing (e.g., filtering, interpolation, and/or resampling) on the reconstructed sample(s) located above the current block, the coding device may apply similar (e.g., same) pre-processing on the reconstructed sample(s) located below the current block.

In examples, if the coding device determines that the current block is located at the bottom right face boundary of a face associated with a frame-packed picture, the coding block may use one or more reconstructed samples located on the right side of and below the current block (e.g., $R_{N+1,0} \ldots R_{N+1,N+1}$ and/or $R_{0,N+1} \ldots R_{N+1,N+1}$, respectively) (e.g., in addition to the one or more reconstructed samples associated with a block(s) located on the left and/or above the current block (e.g., $R_{0,0} \ldots R_{0,N}$ and/or $R_{0,0} \ldots R_{N,0}$, respectively), as depicted on FIG. 21C). If the coding device applies pre-processing (e.g., filtering, interpolation, and/or resampling) on the reconstructed sample(s) located on the left side of and/or above the current block, the coding device may apply similar (e.g., same) pre-processing on the reconstructed sample(s) located on the right side of and/or below the current block.

The coding device may use one or more reference sample lines in one or more (e.g., all) cases described herein. The coding device may apply one or more cases described herein to a rectangular block(s).

If a current block associated with a face is at a right face boundary of the face, a sample(s) located on a cross-face boundary neighboring block (e.g., that is located to the right side of the current block) (e.g., $R_{N+1,0} \ldots R_{N+1,2N}$) may be used as depicted on FIGS. 21A-C. The reference sample(s) to be predicted that is derived from the cross-face boundary neighboring block (e.g., $R_{N+1,0} \ldots R_{N+1,2N}$) may be located closer to the samples located on the above right (AR) side of the current block (e.g., $R_{N+1,0} \ldots R_{2N,0}$). The reference sample(s) (e.g., $R_{N+1,0} \ldots R_{N+1,2N}$) may be filtered. For example, the one or more reference samples (e.g., $R_{N+1,0} \ldots R_{N+1,2N}$) may be filtered prior to performing prediction (e.g., similar to the intra prediction process in HEVC).

Figure 22B:
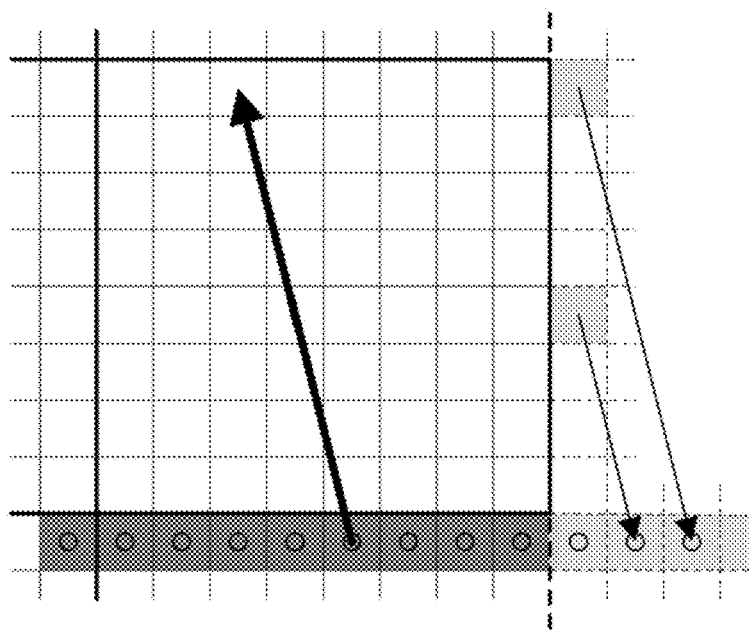
FIGS. 22A-B depict example additional intra prediction modes at (A) right face boundary; and (B) bottom face boundary.
Figure 22A:
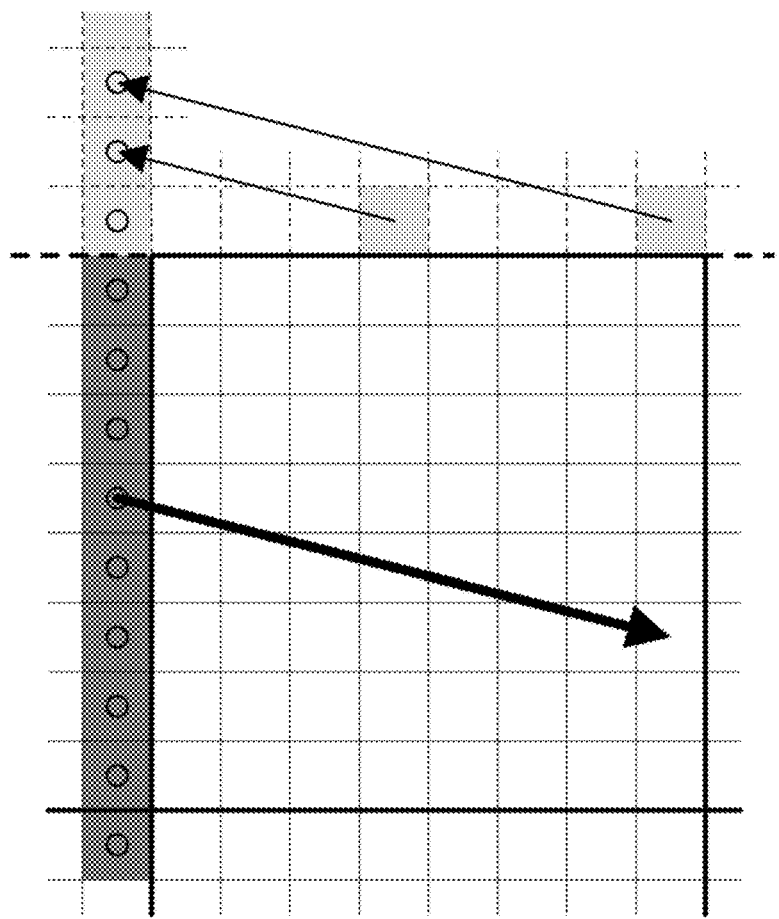

A cross-face boundary neighboring block may be used to predict the current block (e.g., as described herein). A reference row or a reference column (e.g., depending on the directionality of the selected prediction mode) may be used. The above reference row may be extended to the right, e.g., by projecting the right reference column, as depicted in FIG. 22A. FIGS. 22A-B depict examples of intra prediction at right face boundary (e.g., FIG. 22A) and bottom face boundary (e.g., FIG. 22B). The bold arrow shown in FIGS. 22A-B may represent the prediction direction and the thin arrows may represent the reference sample projection. Reference samples depicted using dashed lines in FIGS. 22A-B may be located outside of the current face. Considering the intra angular prediction directions defined in FIG. 10, samples $R_{N+1,N} \ldots R_{N+1,2N}$ may not be used for extending the above reference row to the right. Samples $R_{N+1,N} \ldots R_{N+1,2N}$ may be used for filtering the right reference column.

Figure 23B:
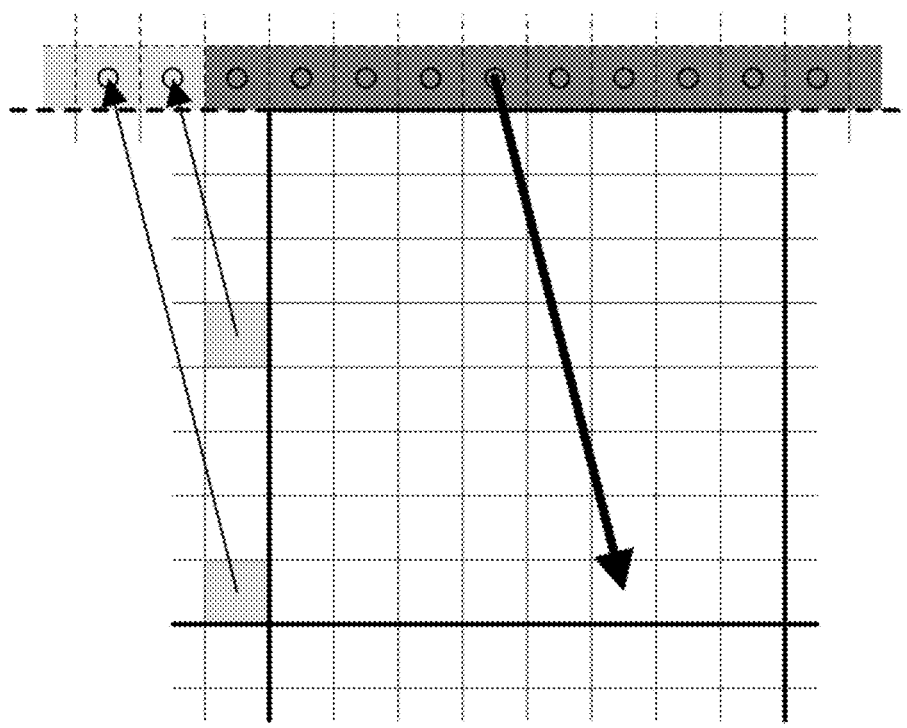
FIGS. 23A-D depict example additional intra prediction modes at the (A-B) right face boundaries; and (C-D) bottom face boundaries.
Figure 23A:
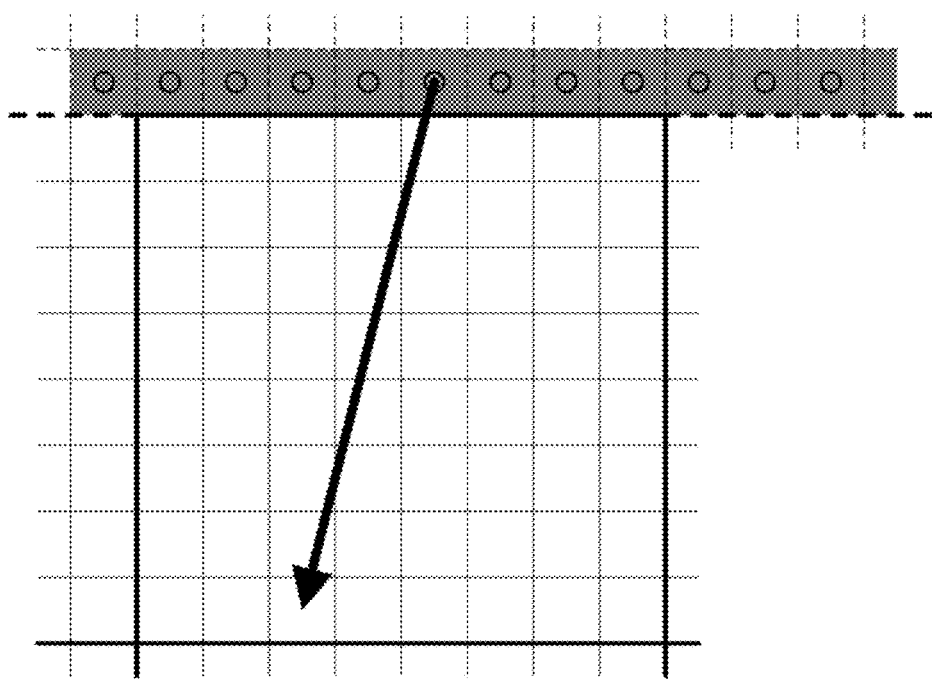

The samples located below right of the current block (e.g., $R_{N+1,N+1} \ldots R_{N+1,2N}$) may be used when considering intra angular prediction directions, e.g., covering a wider range than the $[-3\pi/4, \pi/4]$ range depicted in FIG. 10. The right reference column may be used, as depicted in FIG. 23A, or extended upwards by projecting the above reference row, as depicted in FIG. 23B. FIGS. 23A-D depict examples of additional intra prediction modes at the right face boundaries (e.g., FIGS. 23A-B) and bottom face boundaries (e.g., FIGS. 23C-D). The bold arrow shown in FIGS. 23A-D may represent the prediction direction and the thin arrows may represent the reference sample projection. Reference samples depicted using dashed lines in FIGS. 23A-D may be located outside of the current face.

Figure 24B:
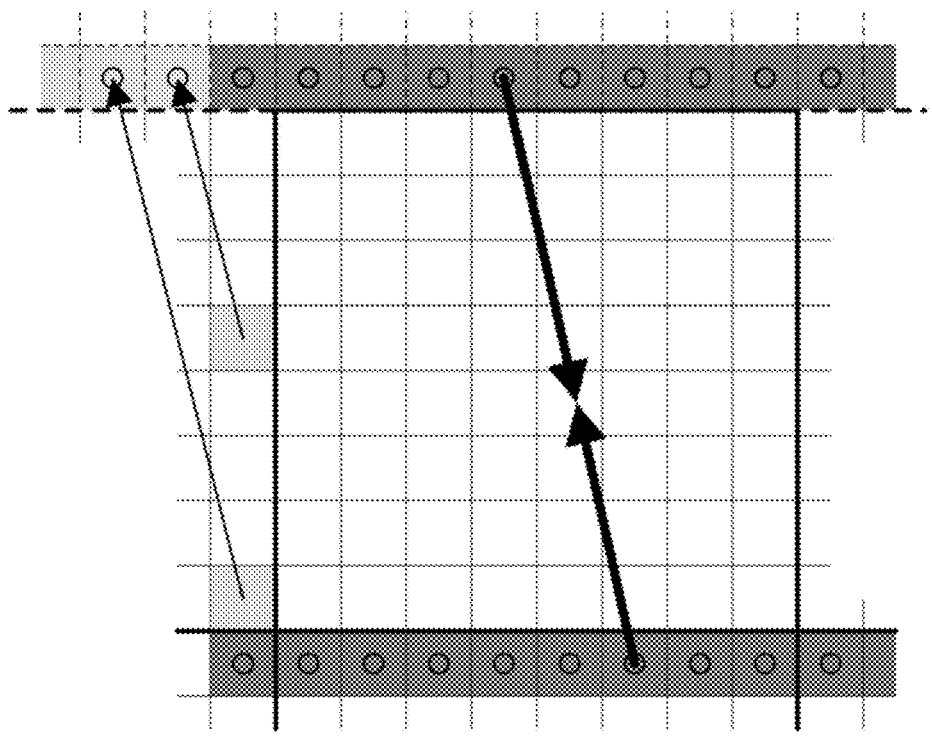
FIGS. 24A-D depict example bi-directional intra predictions at the (A-B) right face boundaries; and (C-D) bottom face boundaries.
Figure 24A:
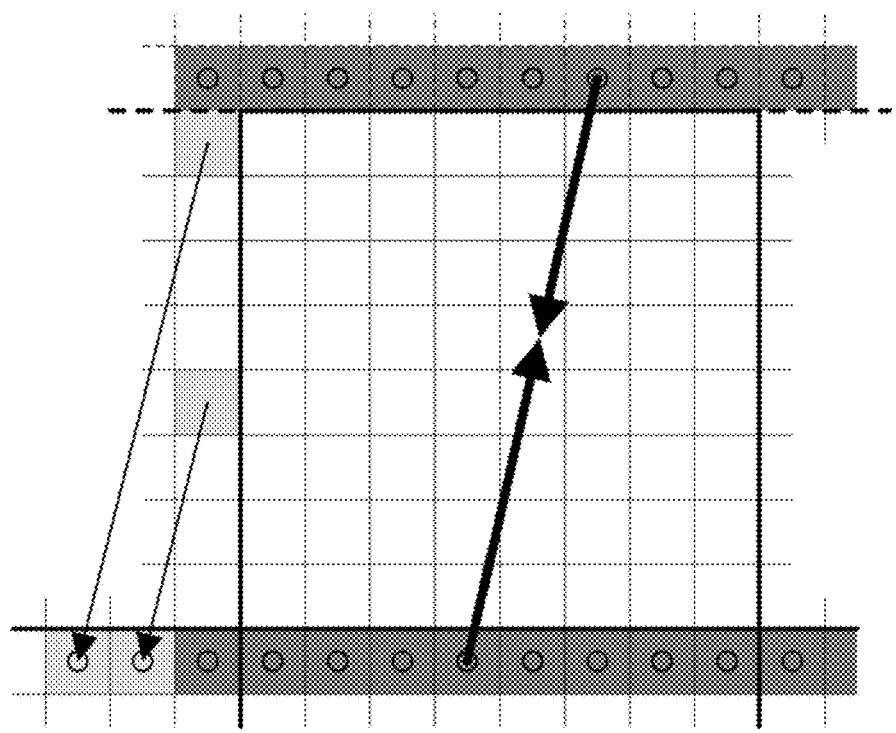

For horizontal angular directions, a blending between the left and the right reference columns may be performed to predict the current block samples, as depicted in FIGS. 24A-B. A linear weighting or similar process may be performed, e.g., considering the distance between the sample to be predicted and the reference samples. In examples, the projected pixel locations may have negative indexes. If the projected pixel locations have negative indexes, the left reference column may be extended upwards, e.g., by projecting the above reference row, as depicted in FIG. 24A, and/or the right reference column may be extended upwards, e.g., by projecting the above reference row, as depicted in FIG. 24B. FIGS. 24A-D depict example bi-directional intra prediction at the right face boundaries (e.g., FIGS. 24A-B) and bottom face boundaries (e.g., FIGS. 24C-D). The bold arrow shown in FIGS. 24A-D may represent the prediction direction and the thin arrows may represent the reference sample projection. Reference samples depicted using dashed lines in FIGS. 24A-D may be located outside of the current face.

For DC mode, if the current block is at the right face boundary, the samples located on the right side of the current block may be used to compute the DC predictor:

$$p = \frac{1}{3N}\left(\sum_{i=1}^{N} R_{i,0} + \sum_{j=1}^{N} R_{0,j} + \sum_{j=1}^{N} R_{N+1,j}\right) \quad (19)$$

For planar mode, if the current block is at the right face boundary, the samples $R_{N+1,1} \ldots R_{N+1,N}$ obtained, e.g., using geometry padding, may be used for the horizontal predictor. For the vertical predictor, the value of sample $R_{i,N+1}$, $i=1 \ldots N$, may be interpolated from $R_{0,N+1}$ and $R_{N+1,N+1}$, e.g., using a linear weighting or similar process considering the distance to these two samples. The value of $R_{N+1,N+1}$ may be obtained from the corresponding available reconstructed sample.

If the current block is at the bottom face boundary, the samples located below the current block (e.g., $R_{0,N+1} \ldots R_{2N,N+1}$) may be used as depicted on FIG. 21B. In this manner, the reference samples (e.g., derived from the reconstructed samples) derived from a block associated with the cross-face boundary neighboring block as described herein may be closer to the current block samples to be predicted. The reference samples $R_{0,N+1} \ldots R_{2N,N+1}$ may be filtered, e.g., prior to performing prediction. For example, the reference samples $R_{0,N+1} \ldots R_{2N,N+1}$ may be filtered prior to performing prediction similar to the intra prediction process (e.g., in HEVC).

For example, the left reference column may be extended downwards (e.g., by projecting the below reference row, as depicted in FIG. 22B). Considering the intra angular prediction directions in FIG. 10, samples $R_{N,N+1} \ldots R_{2N,N+1}$ may not be used for extending the left reference column downwards. The samples $R_{N,N+1} \ldots R_{2N,N+1}$ may be used for filtering the below reference row.

Figure 23D:
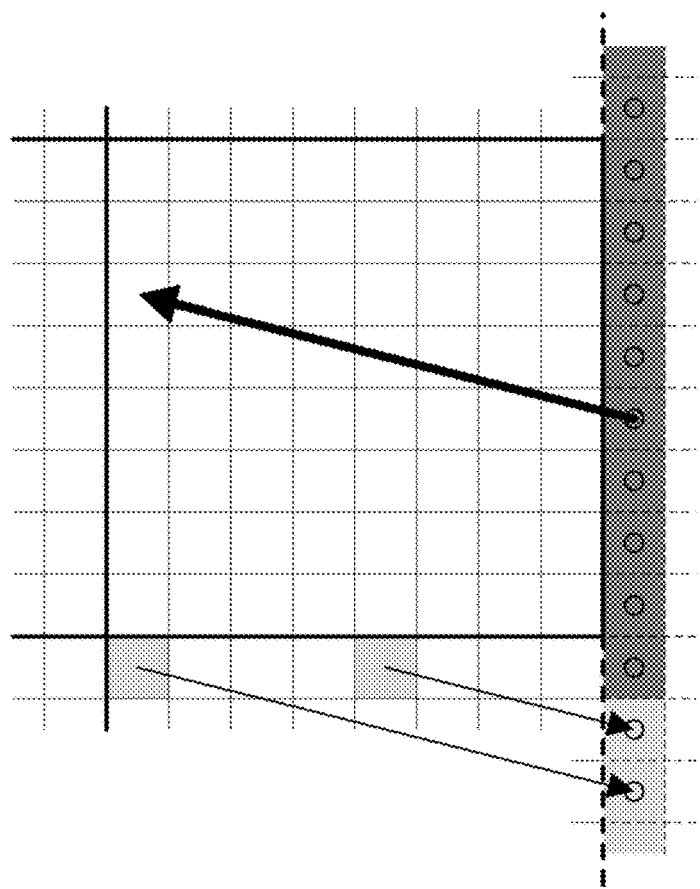
Figure 23C:
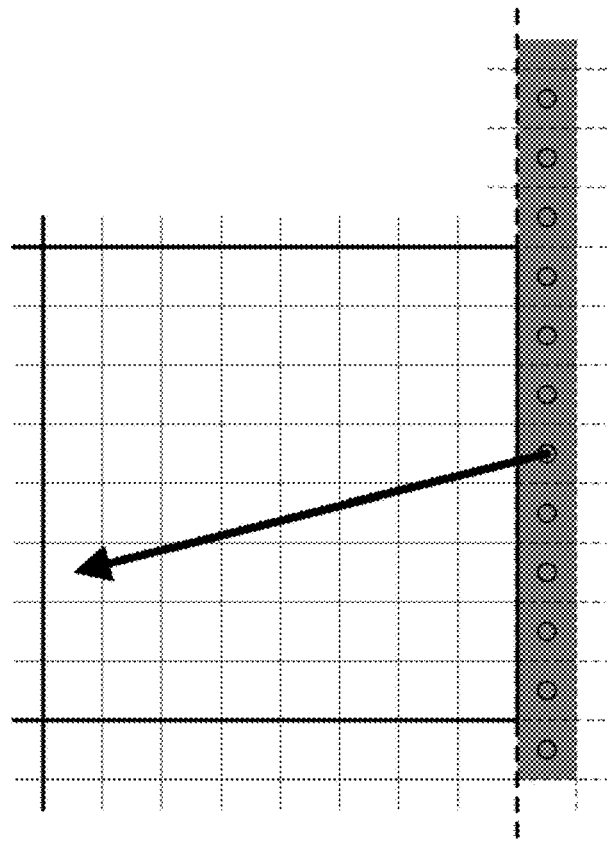

The samples located below right of the current block (e.g., $R_{N+1,N+1} \ldots R_{2N,N+1}$) may be used when considering intra angular prediction directions, e.g., covering a wider range than the $[-3\pi/4, \pi/4]$ range depicted in FIG. 10. In this case, the below reference row may be used, as depicted in FIG. 23C. The below reference row may be extended to the left, e.g., by projecting the left reference column, as depicted in FIG. 23D.

Figure 24D:
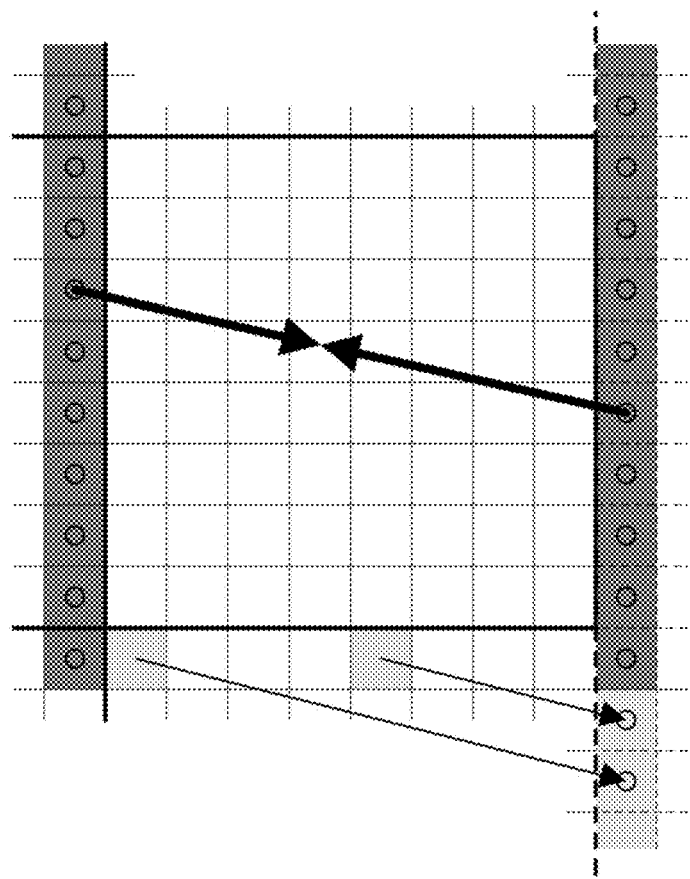
Figure 24C:
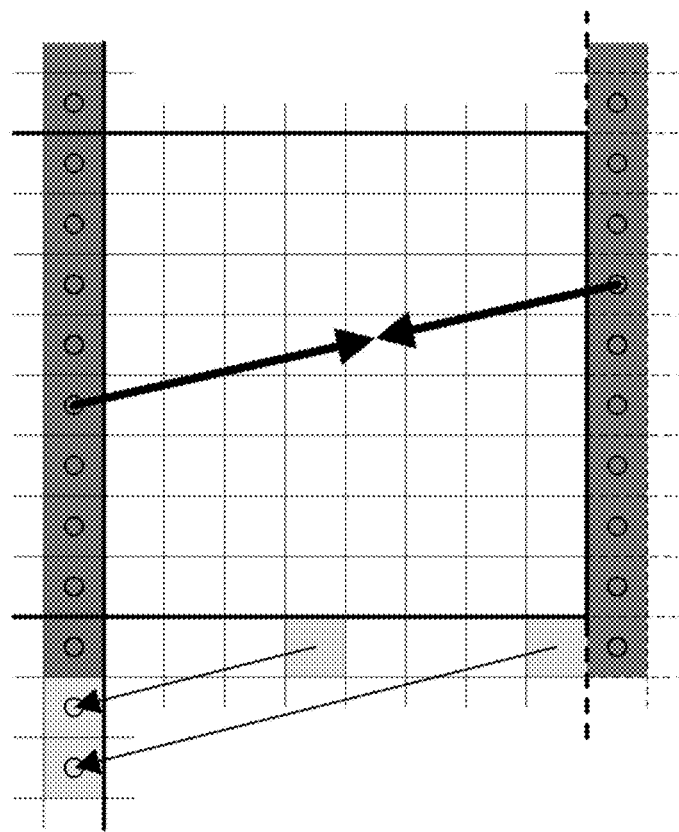

For vertical angular directions, a blending between the above and below reference rows may be performed to predict the current block samples, as depicted in FIGS. 24C-D. In this case, a linear weighting or similar process may be performed, e.g., considering the distance between the sample to be predicted and the reference samples. In some cases, the projected pixel locations may have negative indexes. If the projected pixel locations have negative indexes, the above reference row may be extended to the left, e.g., by projecting the left reference column, as depicted in FIG. 24C. The below reference row may be extended to the left, e.g., by projecting the left reference column, as depicted in FIG. 24D.

For DC mode, if the current block is at the bottom face boundary, the samples located below the current block may be used to compute the DC predictor:

$$p = \frac{1}{3N}\left(\sum_{i=1}^{N} R_{i,0} + \sum_{j=1}^{N} R_{0,j} + \sum_{i=1}^{N} R_{i,N+1}\right) \quad (20)$$

For planar mode, if the current block is at the bottom face boundary, samples $R_{1,N+1} \ldots R_{N,N+1}$ obtained using geometry padding may be used for the vertical predictor. For the horizontal predictor, the value of sample $R_{N+1,j}$, $j=1 \ldots N$, may be interpolated from $R_{N+1,0}$ and $R_{N+1,N+1}$, e.g., using a linear weighting or similar process considering the distance to these two samples. The value of $R_{N+1,N+1}$ may be obtained from the corresponding available reconstructed sample.

If the current block is at the bottom right face boundary, the samples located on the right side of the current block (e.g., $R_{N+1,0} \ldots R_{N+1,N+1}$) may be used. The samples located below the current block (e.g., $R_{0,N+1} \ldots R_{N+1,N+1}$) may be used as depicted on FIG. 21C. The reference samples derived from the cross-face boundary neighboring block as described herein may be closer to the current block samples to be predicted.

For DC mode, if the current block is at the bottom right face boundary, the samples located on the right side of and/or below the current block may be used to compute the DC predictor:

$$p = \frac{1}{4N}\left(\sum_{i=1}^{N} R_{i,0} + \sum_{j=1}^{N} R_{0,j} + \sum_{i=1}^{N} R_{i,N+1} + \sum_{j=1}^{N} R_{N+1,j}\right) \quad (21)$$

For planar mode, if the current block is at the bottom right face boundary, the samples $R_{N+1,1} \ldots R_{N+1,N}$ obtained using geometry padding may be used for the horizontal predictor, and samples $R_{1,N+1} \ldots R_{N,N+1}$ obtained using geometry padding may be used for the vertical predictor.

One or more reference sample lines may be used in one or more (e.g., all) cases described herein, and rectangular blocks may be configured to use reconstructed samples as described herein.

If a current block is at the right, bottom, and/or bottom right face boundary, e.g., of a face in a frame-packed picture associated with 360-degree video, additional boundary prediction filtering(s) (e.g., after intra prediction) may be applied. For example, additional boundary prediction filtering(s) after intra prediction may be applied to reduce discontinuities at face boundaries. The filtering described herein may be applied on top of boundary prediction filtering. In examples, the filtering described herein may be applied to the block's top row(s) (e.g., top-most row(s)) and/or left column(s) (e.g., left-most column(s)).

For horizontal intra mode(s), e.g., that may be close to horizontal, if the current block is at the right face boundary, the predicted sample(s) $s_{i,j}$ of the block located at the right column (e.g., right-most column) may be adjusted, e.g., using the right reference column $R_{i,j}$ as follows:

$$s_{N,j} = s_{N,j} + (R_{N+1,j} - R_{N+1,0}) \quad j = 1 \ldots N \tag{22}$$

Figure 25B:
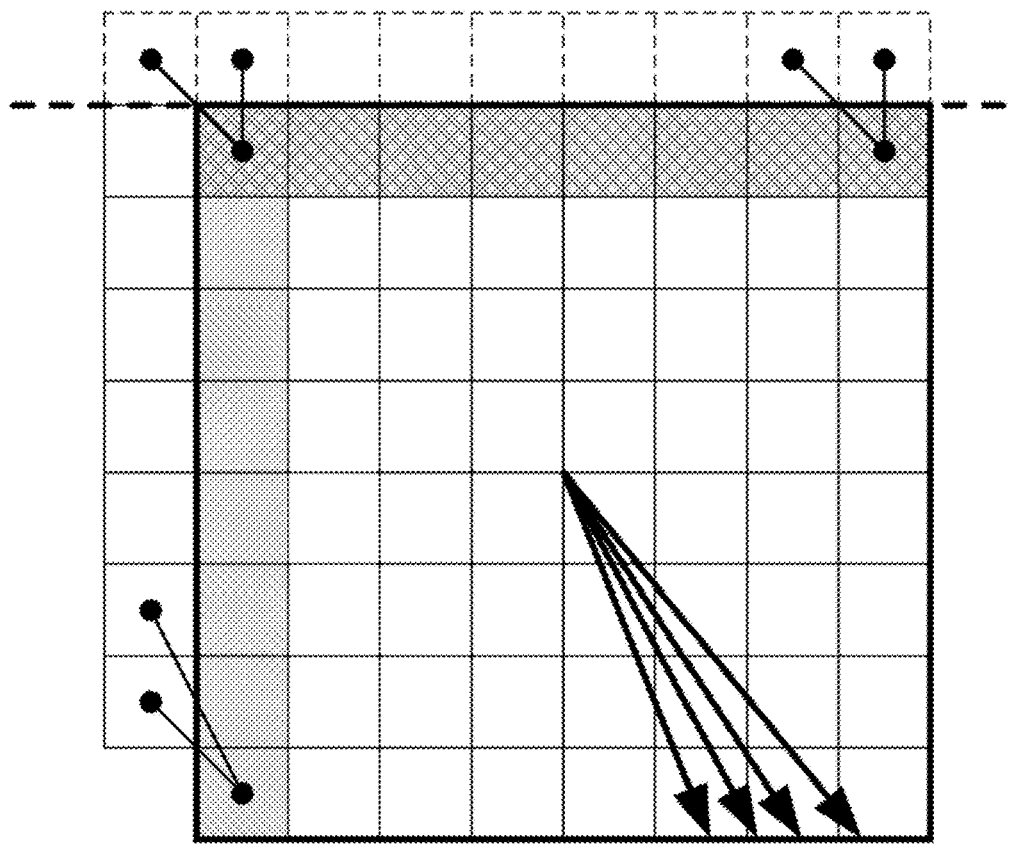
FIGS. 25A-H depict example boundary prediction filtering at right face boundary for: (A) intra mode 2; (B) intra modes 3-6; (C) intra modes 7-9; (D) intra mode 10; (E) intra modes 11-17; (F) intra mode 18; (G) intra modes 19-21; and (H) intra mode 22.
Figure 25A:
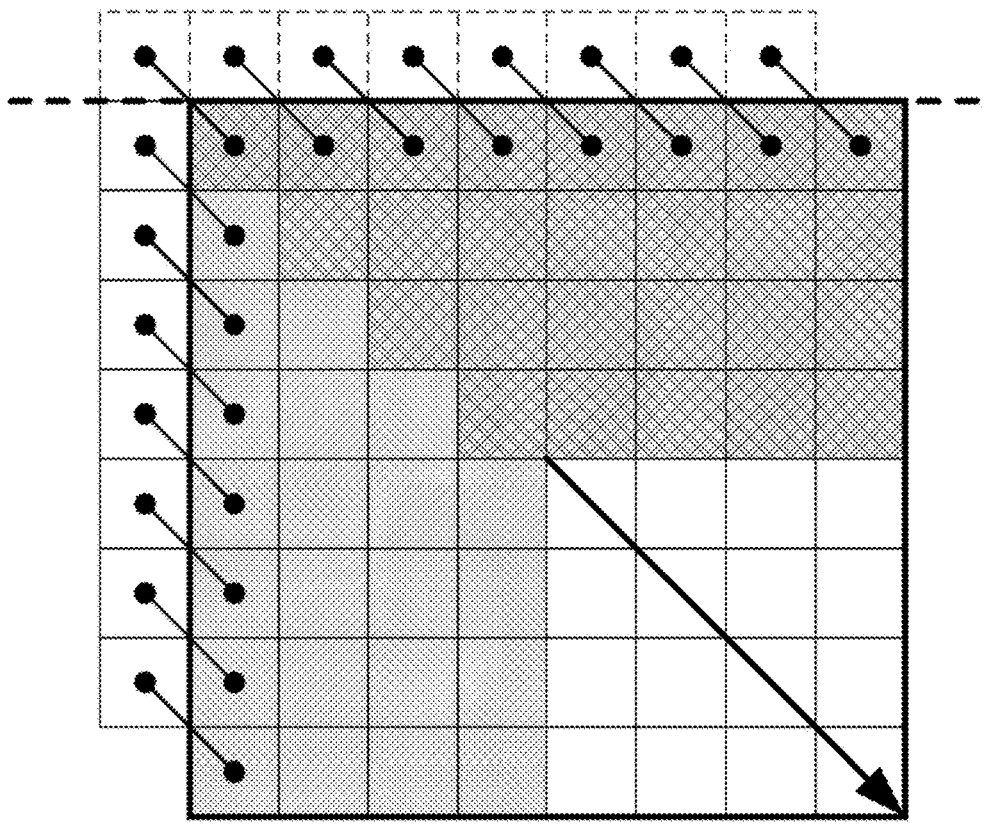
Figure 25D:
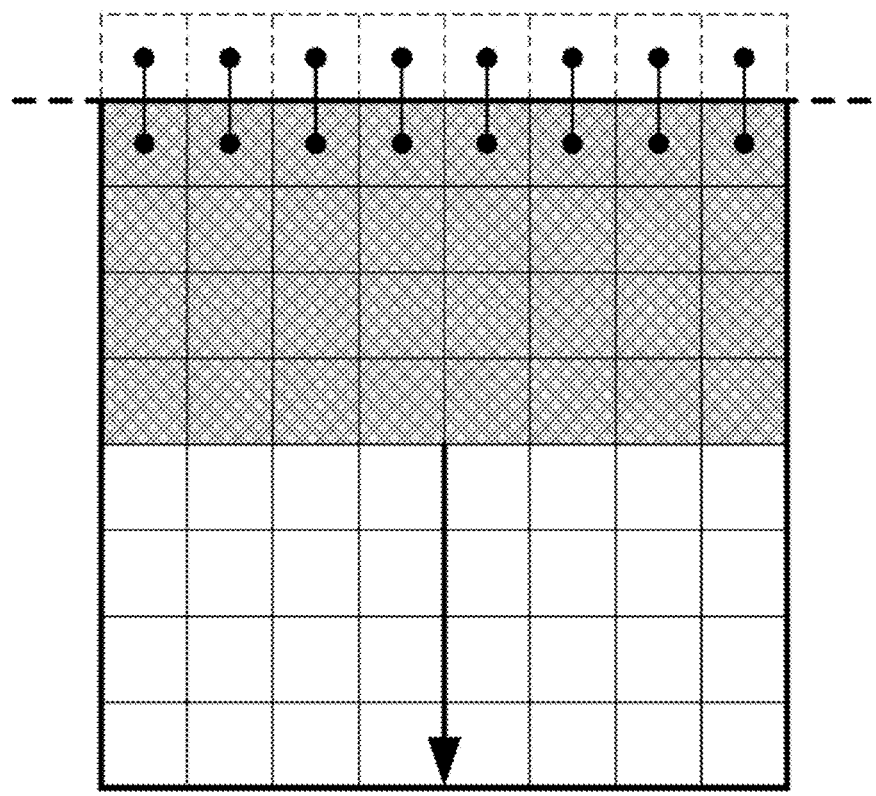
Figure 25C:
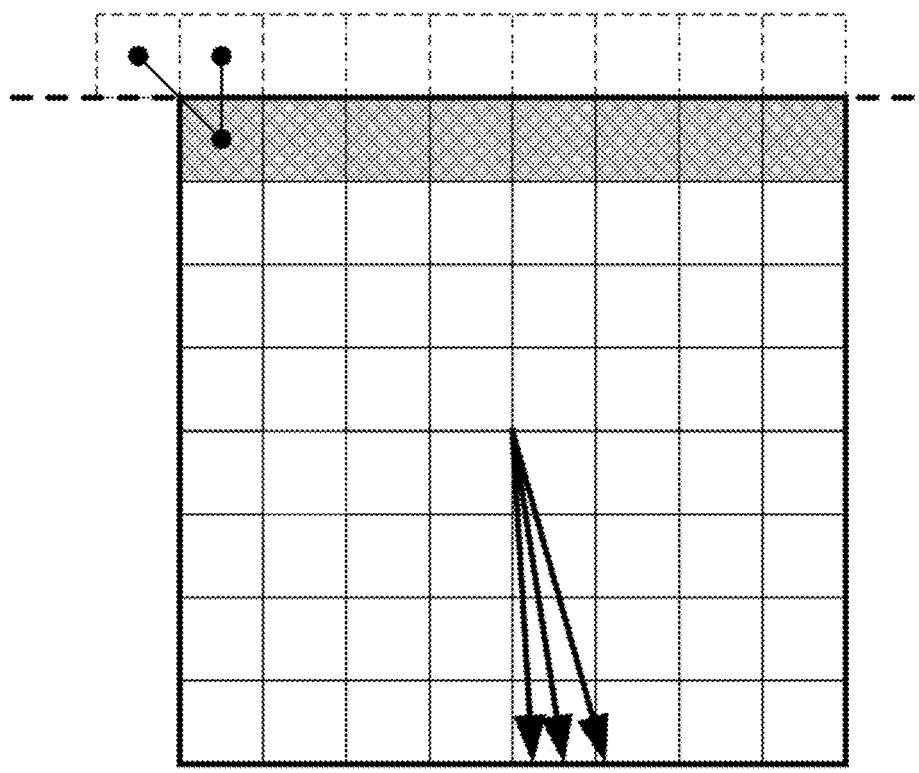
Figure 25F:
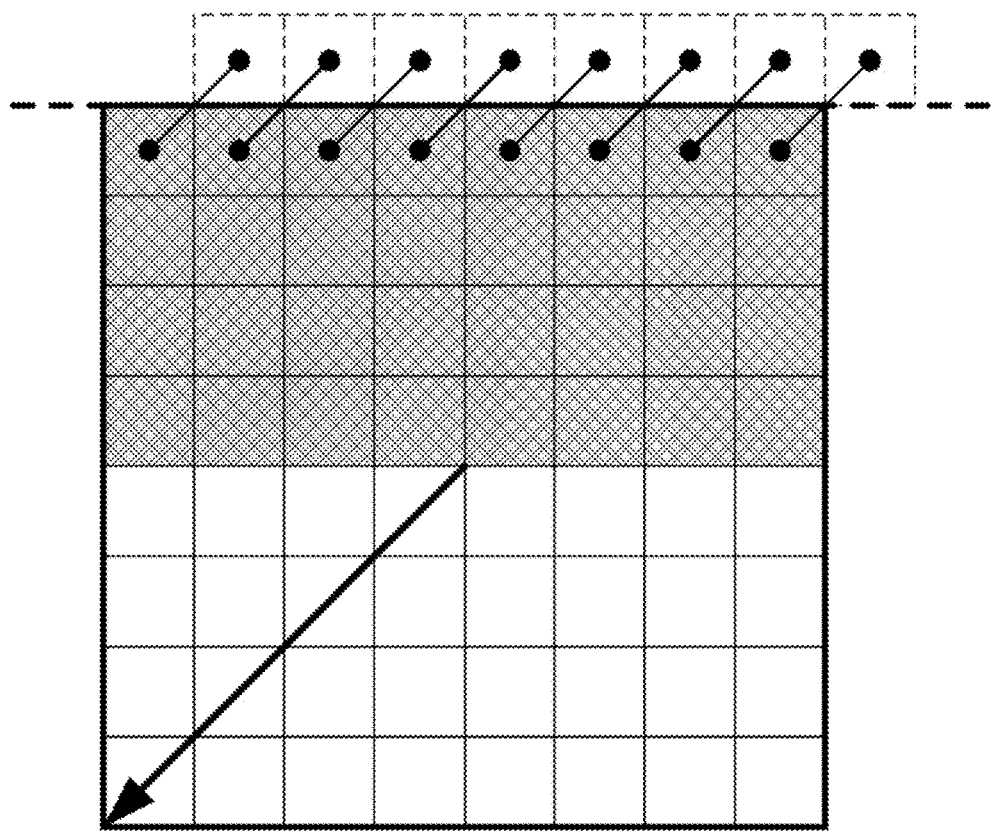
Figure 25E:
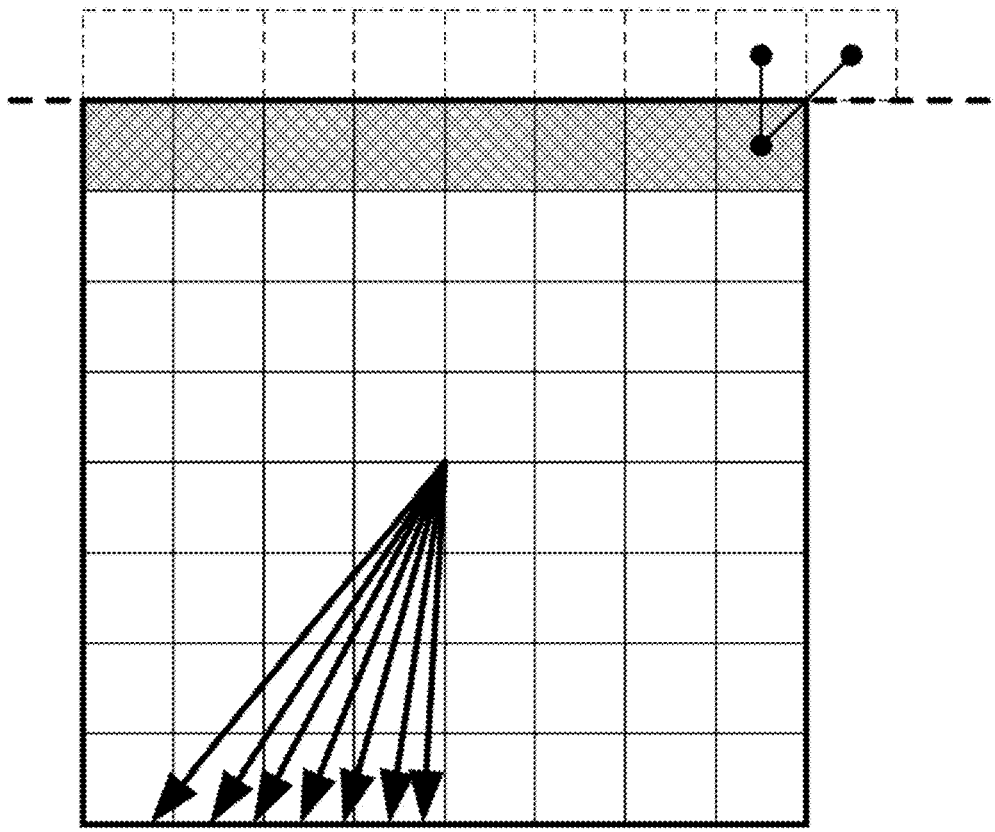
Figure 25H:
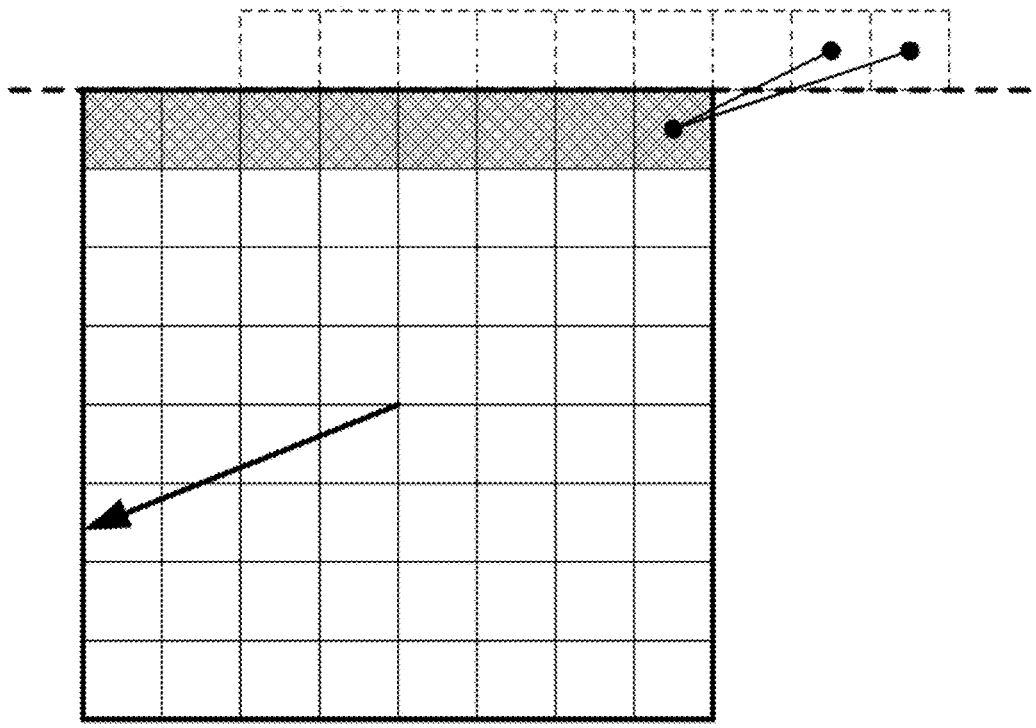

FIGS. 25A-H depict example boundary prediction filtering at right face boundary for intra mode 2 (e.g., FIG. 25A), intra modes 3-6 (e.g., FIG. 25B), intra modes 7-9 (e.g., FIG. 25C), intra mode 10 (e.g., FIG. 25D), intra modes 11-17 (e.g., FIG. 25E), intra mode 18 (e.g., FIG. 25F), intra modes 19-21 (e.g., FIG. 25G), and intra mode 22 (e.g., FIG. 25H). Reference samples depicted using dashed lines in FIGS. 25A-H may be located outside of the current face.

For other intra angular mode(s), if the current block is at the right face boundary, the predicted sample(s) $s_{i,j}$ of the block located at the right column(s) (e.g., right-most column (s) may be filtered, e.g., using the right reference column $R_{i,j}$ as follows:

For mode 2 (e.g., FIG. 25A)

$$s_{N-\delta,j} = a(\delta) \cdot s_{N-\delta,j} + b(\delta) \cdot R_{N+1,j-1-\delta} \tag{23}$$

$$j = 1 \ldots N, \delta = 0 \ldots \min(j-1, D), a(\delta) + b(\delta) = 1$$

For modes 3-6 (e.g., FIG. 25B) and/or modes 7-9 (e.g., FIG. 25C)

$$s_{N,j} = a \cdot s_{N,j} + b \cdot R_{N+1,j} + c \cdot R_{N+1,j-1} \tag{24}$$

$$j = 1 \ldots N, a + b + c = 1$$

For mode 10 (e.g., FIG. 25 D)

$$s_{N-\delta,j} = a(\delta) \cdot s_{N-\delta,j} + b(\delta) \cdot R_{N+1,j} \tag{25}$$

$$j = 1 \ldots N, \delta = 0 \ldots D, a(\delta) + b(\delta) = 1$$

For modes 11-17 (e.g., FIG. 25 E)

$$s_{N,j} = a \cdot s_{N,j} + b \cdot R_{N+1,j} + c \cdot R_{N+1,j+1} \tag{26}$$

$$j = 1 \ldots N, a + b + c = 1$$

For mode 18 (e.g., FIG. 25F)

$$s_{N-\delta,j} = a(\delta) \cdot s_{N-\delta,j} + b(\delta) \cdot R_{N+1,j+1+\delta} \tag{27}$$

$$j = 1 \ldots N, \delta = 0 \ldots D, a(\delta) + b(\delta) = 1$$

Figure 25G:
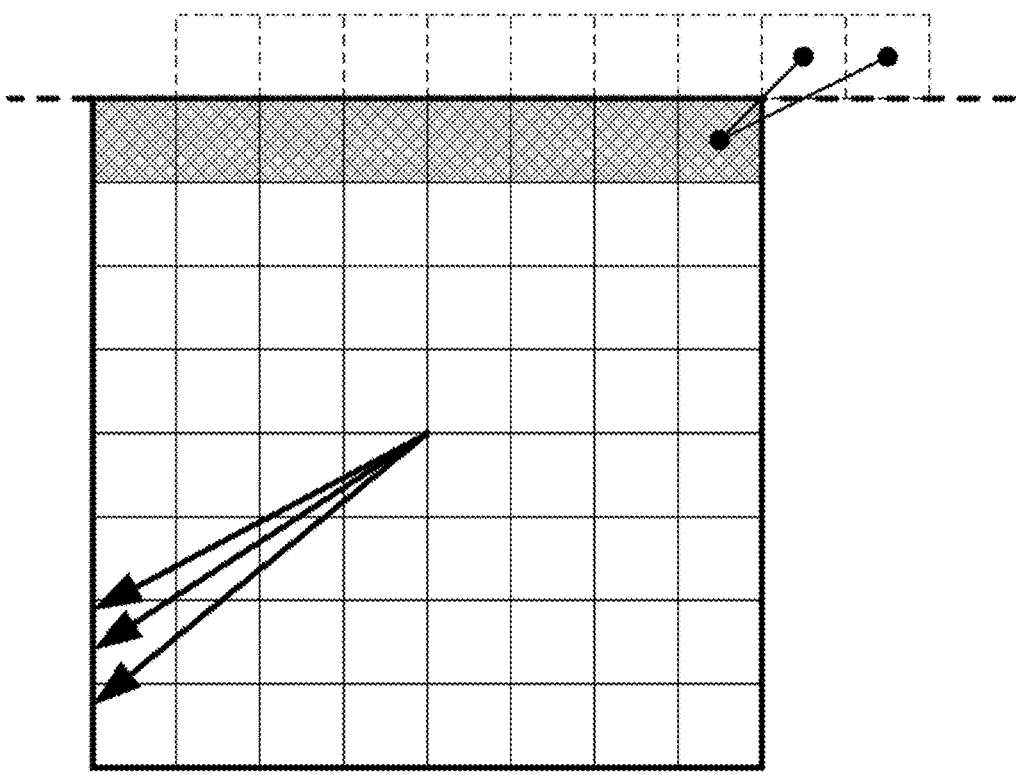

For modes 19-21 (e.g., FIG. 25G)

$$s_{N,j} = a \cdot s_{N,j} + b \cdot R_{N+1,j+1} + c \cdot R_{N+1,j+2} \tag{28}$$

$$j = 1 \ldots N, a + b + c = 1$$

For modes 22 (e.g., FIG. 25H)

$$s_{N,j} = a \cdot s_{N,j} + b \cdot R_{N+1,j+2} + c \cdot R_{N+1,j+3} \tag{29}$$

$$j = 1 \ldots N, a + b + c = 1$$

where D may be a parameter that controls the number of right-most columns and may be filtered. The weights 'a', 'b', and 'c' may be chosen, e.g., depending on the intra mode and/or distance to the reference samples. For example, a look up table (LUT) may be used to get the parameter(s) as a function of the intra mode. In the LUT, depending on the intra mode, higher weight may be given to a reference sample(s) that may be closer to the current position. For example, for modes 2 and 18, the weights defined in Table 1 may be used (e.g., Equations (23) and (27), respectively) to filter the block right-most columns.

TABLE 1

Weights for diagonal, vertical, and/or horizontal mode

| δ | a (δ) | b (δ) |
|---|---|---|
| 0 | 8/16 | 8/16 |
| 1 | 12/16 | 4/16 |
| 2 | 14/16 | 2/16 |
| 3 | 15/16 | 1/16 |

The weights defined in Table 1 may be used for the horizontal mode (e.g., mode 10). For modes 19 to 22, the weights defined in Table 2 may be used.

TABLE 2

Weights for near diagonal mode

| Mode | a | b | c |
|---|---|---|---|
| 19 | 8/16 | 6/16 | 2/16 |
| 20 | 12/16 | 2/16 | 2/16 |
| 21 | 12/16 | 1/16 | 3/16 |
| 22 | 12/16 | 3/16 | 1/16 |

For the other mode(s), the weights may be determined such that the values for 'b' and/or 'c' may map to the position in the right reference sample column. The predicted sample may be projected considering the opposite angular direction and may weigh (e.g., equally weigh) this value with the predicted sample value. For example, for modes 3 to 9, the weights may be determined as $$a = 0.5, b = \left| \frac{\Delta_y}{2\Delta_x} \right|,$$

c=0.5−b, where $\Delta_x$ and $\Delta_y$ may be the horizontal and vertical components of the angular direction, respectively.

For vertical intra mode(s), e.g., which may be close to vertical, if the current block is at the bottom face boundary, e.g., of a face in a frame-packed picture associated with 360-degree video, the predicted samples $s_{i,j}$ of the block located at the bottom-most row may be adjusted, e.g., using the below reference row $R_{i,j}$ as follows:

$$s_{i,N} = s_{i,N} + (R_{i,N+1} - R_{0,N+1}) \quad (30)$$

$$i = 1 \ldots N$$

Filtering (e.g., boundary prediction filtering) may be applied to the current block, e.g., using the cross-face boundary neighboring block as described herein. FIGS. 26A-H depict example boundary prediction filtering at bottom face boundary for intra mode 14 (e.g., FIG. 26A), intra modes 15-17 (e.g., FIG. 26B), intra mode 18 (e.g., FIG. 26C), intra modes 19-25 (e.g., FIG. 26D), intra mode 26 (e.g., FIG. 26E), intra modes 27-29 (e.g., FIG. 26F), intra modes 30-33 (e.g., FIG. 26G), and intra mode 34 (e.g., FIG. 26H). Reference sample(s) depicted using dashed lines in FIGS. 26A-H may be located outside of the current face.

Figure 26B:
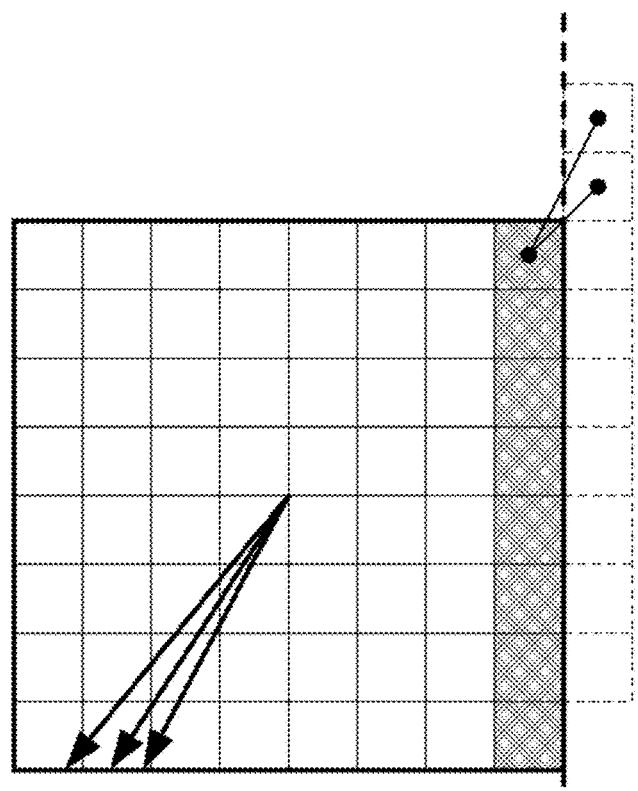
FIGS. 26A-H depict example boundary prediction filtering at bottom face boundary for: (A) intra mode 14; (B) intra modes 15-17; (C) intra mode 18; (D) intra modes 19-25; (E) intra mode 26; (F) intra modes 27-29; (G) intra modes 30-33; and (H) intra mode 34.
Figure 26A:
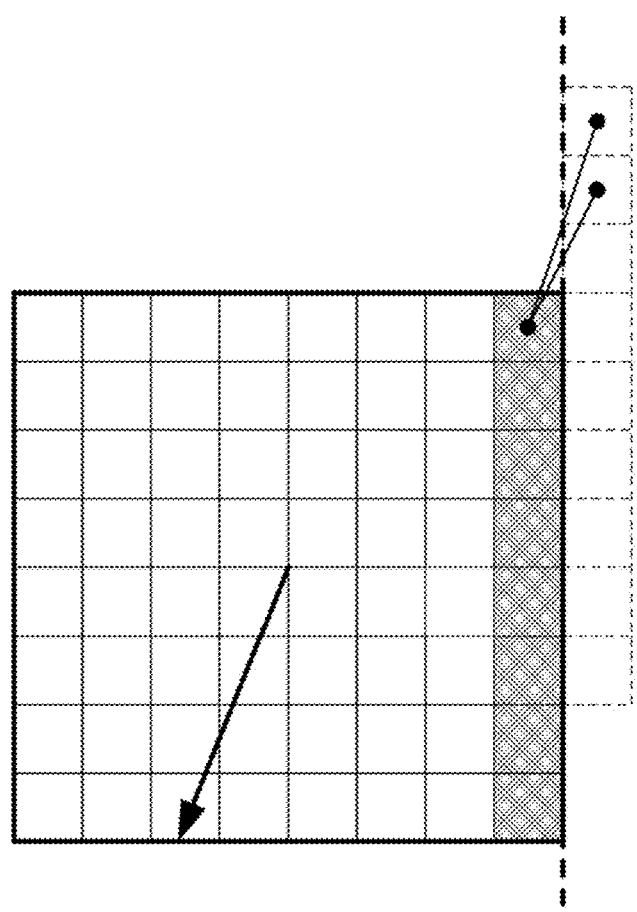

For other intra angular mode(s), if the current block is at the bottom face boundary, the predicted sample(s) $s_{i,j}$ of the block located at the bottom row(s) (e.g., bottom-most row(s)) may be filtered, e.g., using the below reference row $R_{i,j}$ as follows:

For modes 14 (e.g., FIG. 26A)

$$s_{i,N} = a \cdot s_{i,N} + b \cdot R_{i+2,N+1} + c \cdot R_{i+3,N+1} \quad (31)$$

$$j = 1 \ldots N, a + b + c = 1$$

For modes 15-17 (e.g., FIG. 26B)

$$s_{i,N} = a \cdot s_{i,N} + b \cdot R_{i+1,N+1} + c \cdot R_{i+2,N+1} \quad (32)$$

$$j = 1 \ldots N, a + b + c = 1$$

Figure 26D:
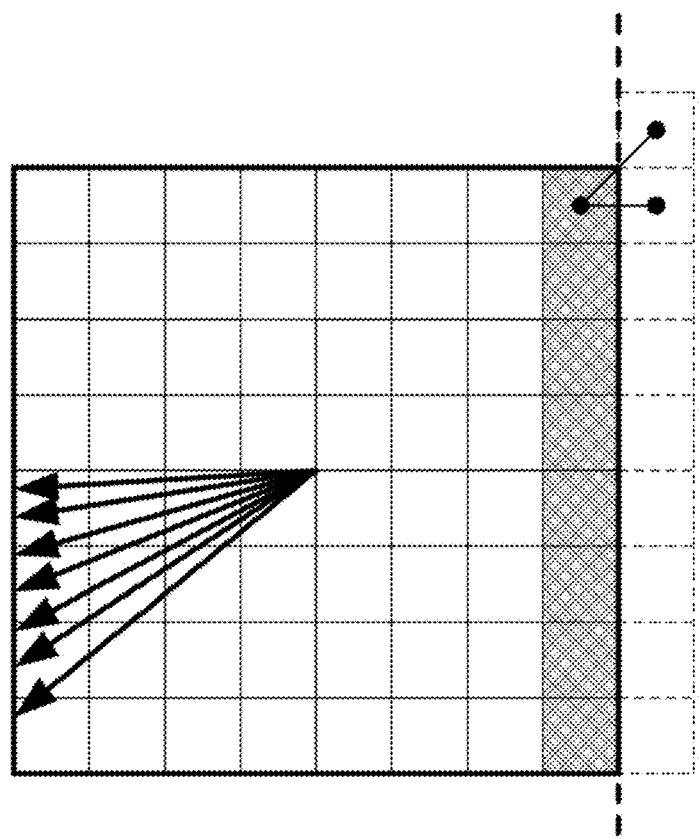
Figure 26C:
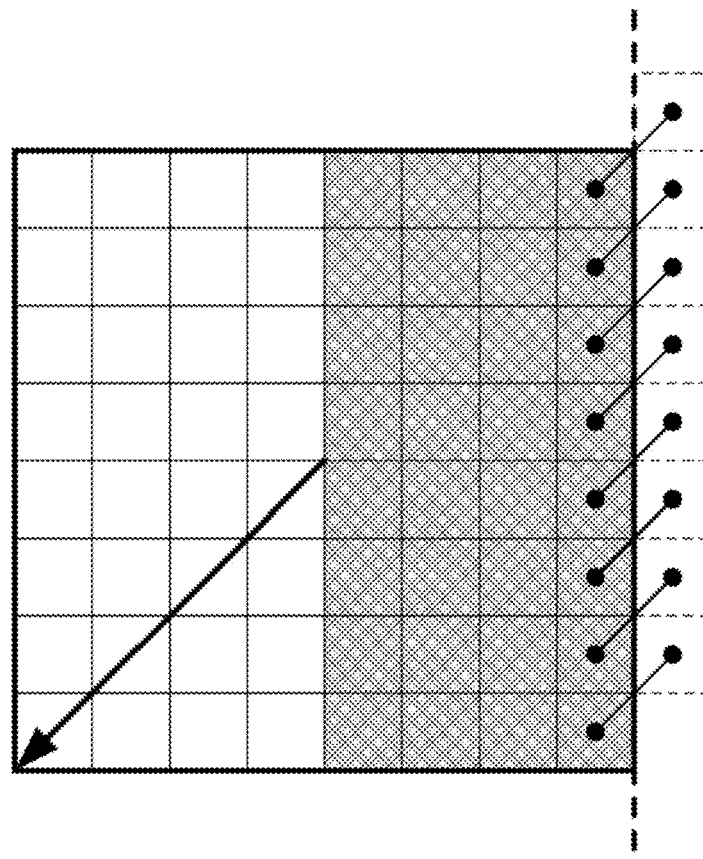
Figure 26F:
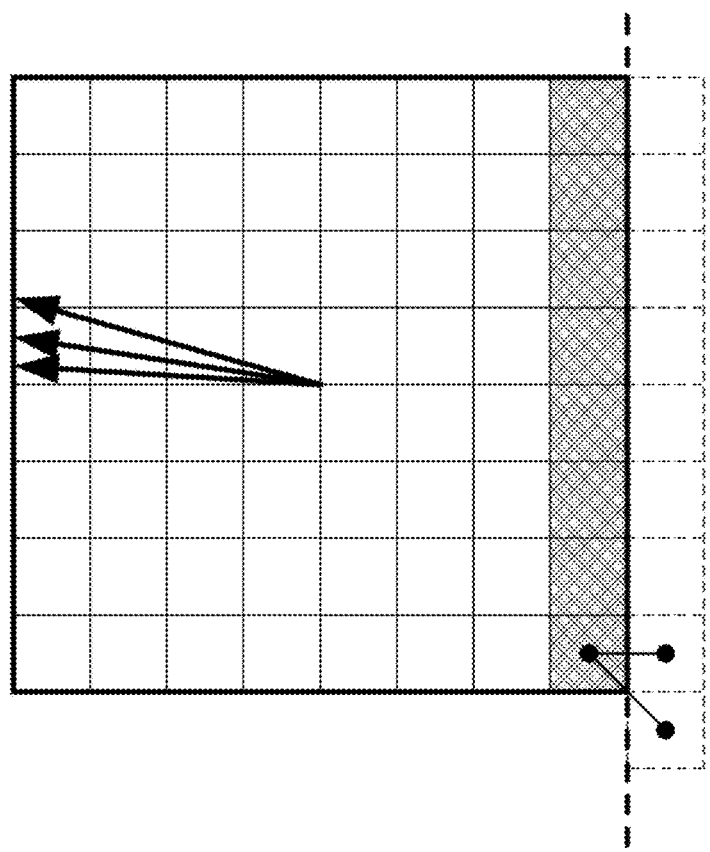

For mode 18 (e.g., FIG. 26C)

$$s_{i,N-\delta} = a(\delta) \cdot s_{i,N-\delta} + b(\delta) \cdot R_{i+1+\delta,N+1} \quad (34)$$

$$i = 1 \ldots N, \delta = 0 \ldots D, a(\delta) + b(\delta) = 1$$

For modes 19-25 (e.g., FIG. 26D)

$$s_{i,N} = a \cdot s_{i,N} + b \cdot R_{i,N+1} + c \cdot R_{i+1,N+1} \quad (34)$$

$$i = 1 \ldots N, a + b + c = 1$$

Figure 26E:
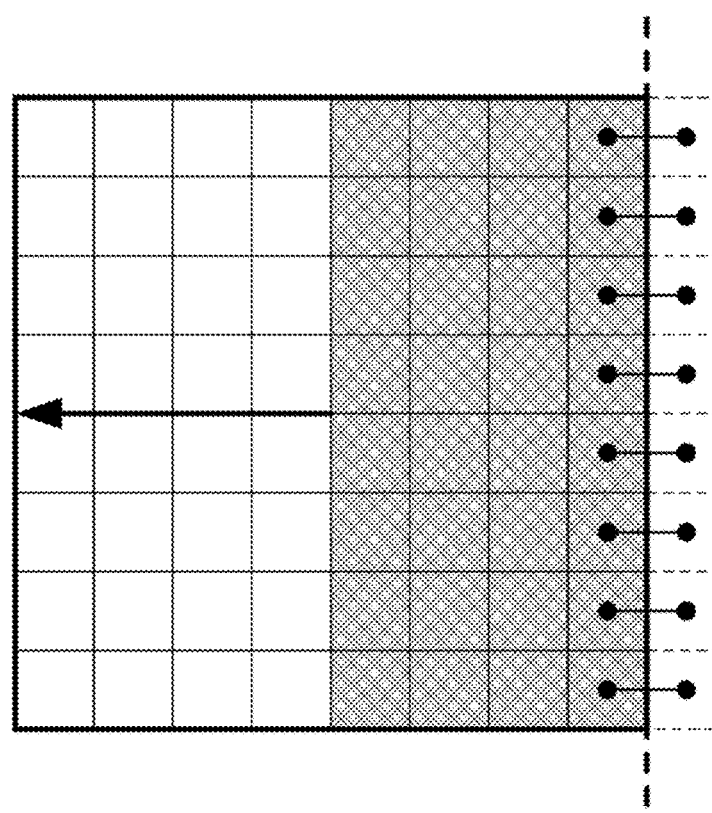

For mode 26 (e.g., FIG. 26E)

$$s_{i,N-\delta} = a(\delta) \cdot s_{i,N-\delta} + b(\delta) \cdot R_{i,N+1} \quad (35)$$

$$i = 1 \ldots N, \delta = 0 \ldots D, a(\delta) + b(\delta) = 1$$

Figure 26H:
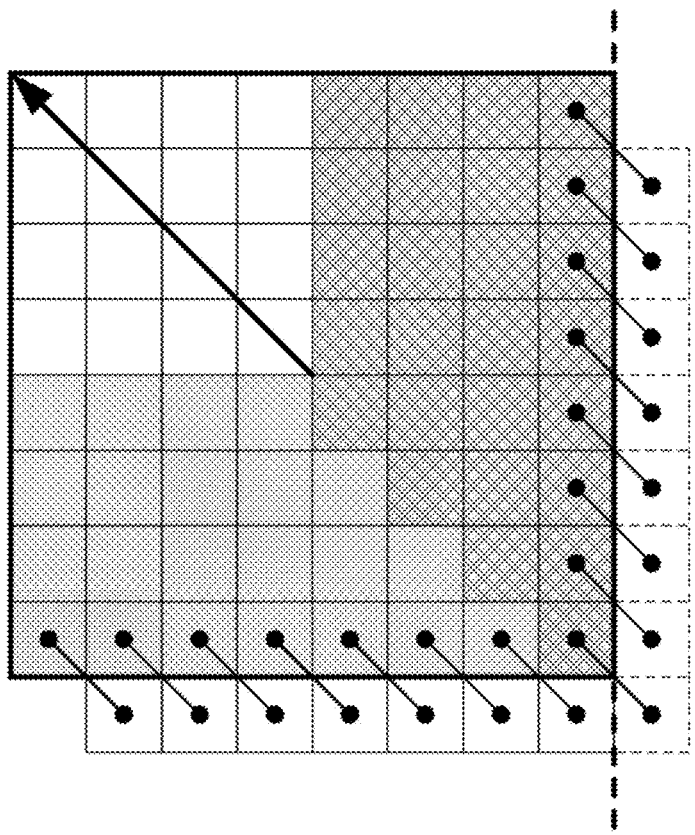
Figure 26G:
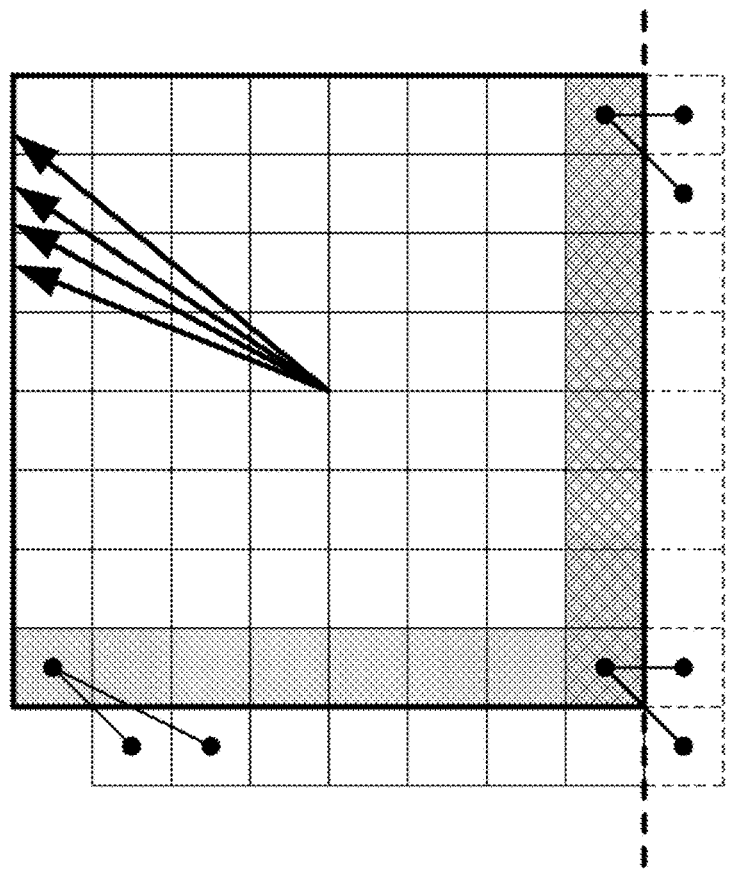

For modes 27-29 (e.g., FIG. 26F) and modes 30-33 (e.g., FIG. 26G)

$$s_{i,N} = a \cdot s_{i,N} + b \cdot R_{i-1,N+1} + c \cdot R_{i,N+1} \quad (36)$$

$$i = 1 \ldots N, a + b + c = 1$$

For mode 34 (e.g., FIG. 26H)

$$s_{i,N-\delta} = a(\delta) \cdot s_{i,N-\delta} + b(\delta) \cdot R_{i-1-\delta,N+1} \quad (37)$$

$$i = 1 \ldots N, \delta = 0 \ldots \min(i-1, D), a(\delta) + b(\delta) = 1$$

where D may be a parameter that controls the number of bottom-most rows and may be filtered. The weights 'a', 'b', and 'c' may be selected, e.g., depending on the intra mode and/or distance to the reference samples.

For intra angular mode(s), if the current block is at the bottom right face boundary, e.g., of a face in a frame-packed picture associated with 360-degree video, the predicted samples of the block located at the right column(s) (e.g., right-most column(s)) may be filtered, e.g., using the right reference column, and the block located at the bottom row(s) (e.g., bottom-most row(s)) may be filtered, e.g., using the below reference row, as described herein.

For DC mode, if the current block is at the right face boundary, e.g., of a face in a frame-packed picture associated with 360-degree video, the predicted sample(s) of the block located at the right column(s) (e.g., right-most column(s)) may be filtered, e.g., using the right reference column (e.g., according to Equation (25)). If the current block is at the bottom face boundary, e.g., of a face in a frame-packed picture associated with 360-degree video, the predicted sample(s) of the block located at the bottom row(s) (e.g., bottom-most row(s)) may be filtered, e.g., using the below reference row (e.g., according to Equation (35). If the current block is at the bottom right face boundary, e.g., of a face in a frame-packed picture associated with 360-degree video, the predicted sample(s) of the block located at the right column(s) (e.g., right-most column(s) may be filtered, e.g., using the right reference column, and the block located at the bottom row(s) (e.g., bottom-most row(s)) may be filtered, e.g., using the below reference row (e.g., according to Equations (25) and (35)).

The filtering process may be implemented, e.g., using fixed point precision and/or bit shift operation. Similar filtering operations may be applied to the block located at the right column(s) (e.g., right-most column(s)) and/or the block located at the bottom row(s) (e.g., bottom-most row(s)), e.g., when considering finer intra angular granularity and/or rectangular blocks.

For in-loop filtering, filtering may be applied across one or more (e.g., all) face boundaries. For example, the filtering may be applied across face boundaries including the right and/or bottom face boundaries. If a current block is on the left (e.g., or above) face boundary, e.g., of a face in a frame-packed picture associated with 360-degree video, the left (e.g., or above) reconstructed sample(s) may be used for filtering the block located at the left-most column(s) (e.g., or top-most row(s)), even if the block may be on the frame-packed picture boundary. If a block is on the top left face boundary, e.g., of a face in a frame-packed picture associated with 360-degree video, the left and above reconstructed sample(s) may be used for filtering the block located at the left-most column(s) and top-most row(s), respectively, even if the block may be on the frame-packed picture boundary. If a block is on the right (e.g., or bottom) face boundary, e.g., of a face in a frame-packed picture associated with 360-degree video, the right (e.g., or below) reconstructed sample(s) may be used for filtering the block located at the right-most column(s) (e.g., or bottom-most row(s), even if the block may be on the frame-packed picture boundary. If a block is on the bottom right face boundary, e.g., of a face in a frame-packed picture associated with 360-degree video, the right and below reconstructed sample(s) may be used for filtering the block located at the right-most column(s) and bottom-most row(s), respectively, even if the block may be on the frame-packed picture boundary. The reconstructed sample(s) may be outside of the current face, and the reconstructed samples may be obtained, e.g., using geometry padding.

For cross-component linear model prediction, reconstructed sample(s) (e.g., additional resource sample(s)) may be used. For example, the reconstructed sample(s) (e.g., additional resource sample(s)) may be based on the position of the current block inside a geometry face.

Figure 27B:
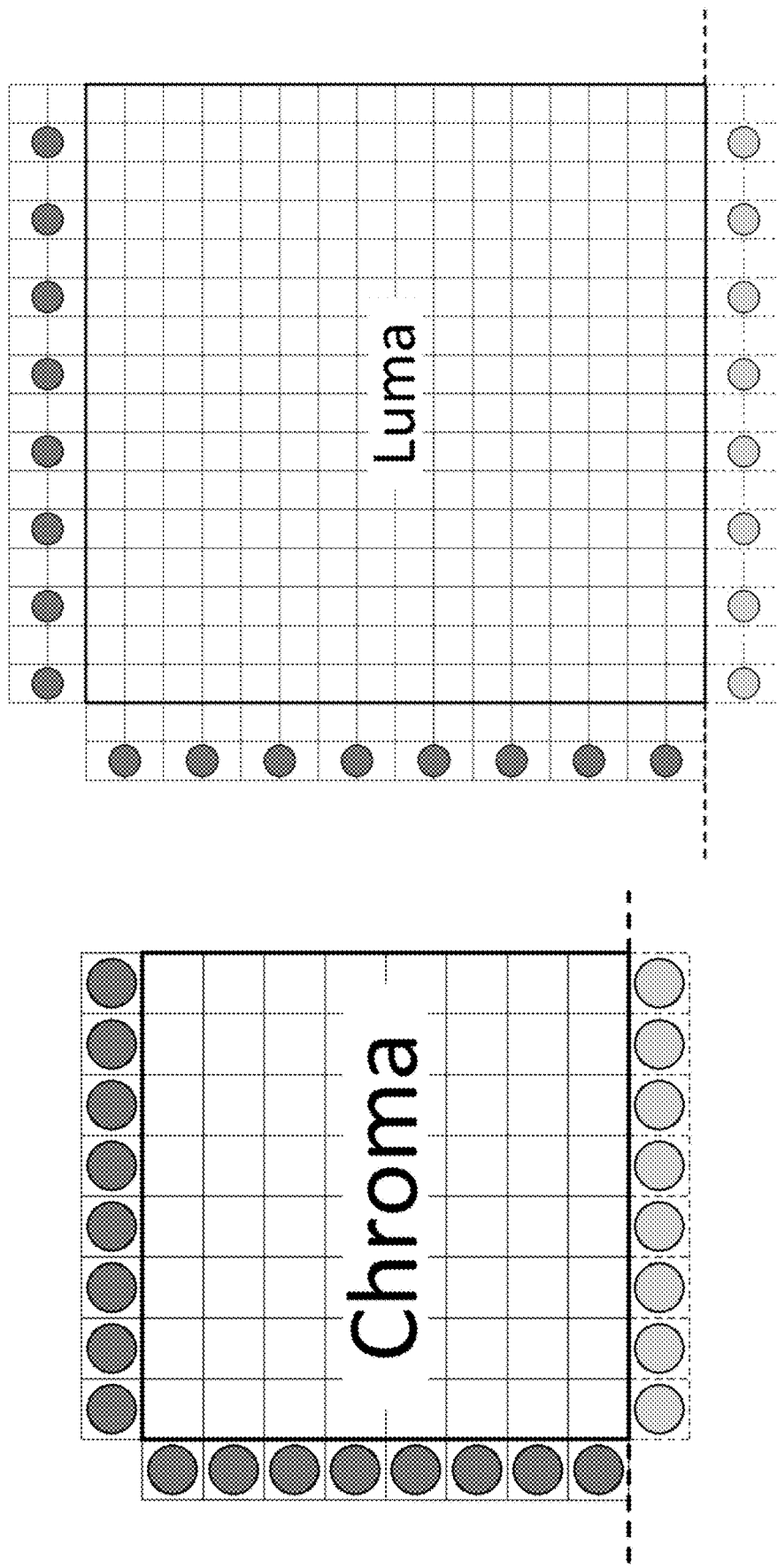
Figure 27C:
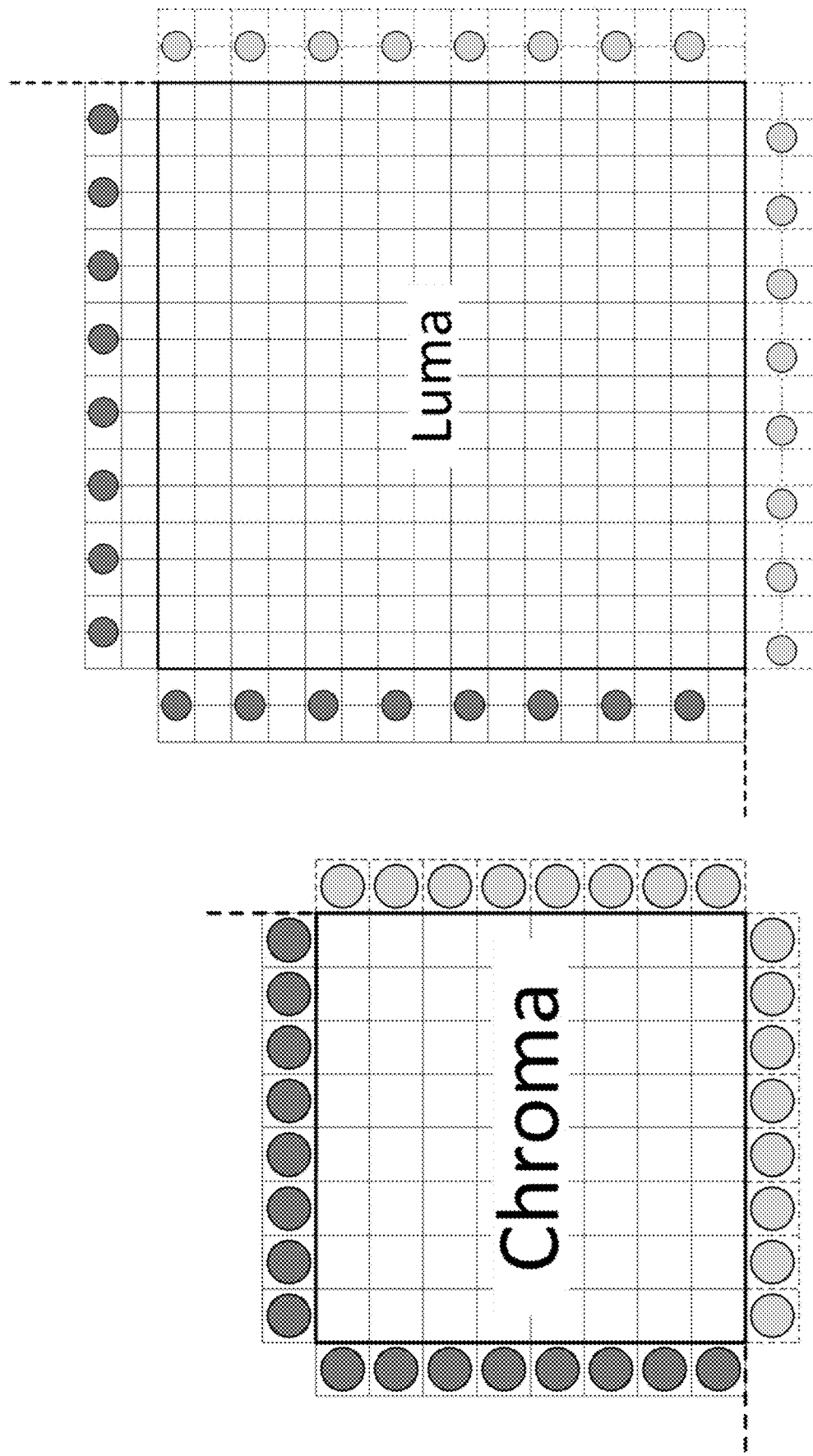

FIGS. 27A-C depict example locations of the samples used for cross-component linear model prediction at the right face boundary (e.g., FIG. 27A), bottom face boundary (e.g., FIG. 27B), and bottom right face boundary (e.g., FIG. 27C). Reconstructed samples depicted using dotted lines in FIGS. 27A-C may be located outside of the current face. If the current block is at the right face boundary, e.g., of a face in a frame-packed picture associated with 360-degree video, the reconstructed sample(s) located on the right side of the current block may be used, e.g., in addition to the reconstructed sample(s) located on the left side of and/or the reconstructed sample(s) located above the current block to predict the parameter(s) of the linear model, as depicted on FIG. 27A. In this case, the linear model parameter(s) may be computed as follows (e.g., Equations (38)-(40)): Equation (38) is shown in FIG. 28 and $$\beta = \frac{\left(\sum_{i=1}^{N} C_{i,0} + \sum_{j=1}^{N} C_{0,j} + \sum_{j=1}^{N} C_{N+1,j}\right) - \alpha \cdot \left(\sum_{i=1}^{N} L'_{i,0} + \sum_{j=1}^{N} L'_{0,j} + \sum_{j=1}^{N} L''_{N+1,j}\right)}{3 \cdot N} \quad (39)$$

where $L''_{i,j}$ may be the downsampled reconstructed luma samples, e.g., located on the right side of the current block. $L''_{i,j}$ may be computed, e.g., considering the availability of reconstructed luma samples and/or the chroma location, as follows:

$$L''_{i,j} = \frac{L_{2 \cdot i - 1, 2 \cdot j - 1} + L_{2 \cdot i - 1, 2 \cdot j}}{2} \quad (40)$$

One or more downsampling filters may be applied, e.g., using a cross-face boundary neighboring block(s). If a pre-processing (e.g., filtering) is applied on the reconstructed samples located on the left side of the current block, a similar (e.g., same) pre-processing may be applied on the reconstructed samples located on the right side of the current block.

If the current block is at the bottom face boundary, e.g., of a face in a frame-packed picture associated with 360-degree video, the reconstructed samples located below the current block may be used, e.g., in addition to the reconstructed samples located on the left side of and/or the reconstructed samples located above the current block, to predict the parameters of the linear model, as depicted on FIG. 27B. In this case, the linear model parameters may be computed as follows (e.g., Equations (41)-(42)): Equation (41) is shown in FIG. 28 and $$\beta = \frac{\left(\sum_{i=1}^{N} C_{i,0} + \sum_{j=1}^{N} C_{0,j} + \sum_{i=1}^{N} C_{i,N+1}\right) - \alpha \cdot \left(\sum_{i=1}^{N} L'_{i,0} + \sum_{j=1}^{N} L'_{0,j} + \sum_{i=1}^{N} L''_{i,N+1}\right)}{3 \cdot N} \quad (42)$$

The reconstructed luma samples located below the current block may be downsampled (e.g., according to Equation (16)). One or more downsampling filters may be applied, e.g., using a cross-face boundary neighboring block(s). If a pre-processing (e.g., filtering) is applied on the reconstructed samples located above the current block, a similar (e.g., same) pre-processing may be applied on the reconstructed samples located below the current block.

If the current block is at the bottom right face boundary, e.g., of a face in a frame-packed picture associated with 360-degree video, the reconstructed samples located on the right side of and below the current block may be used (e.g., in addition to the reconstructed samples located on the left side of and the reconstructed samples located above the current block) to predict the parameters of the linear model, as depicted on FIG. 27C. The linear model parameters may be computed as follows (e.g., Equations (43) and (44)):

Equations (43) and (44) are shown in FIG. 28.

For a rectangular block(s), the neighboring samples of the longer boundary may be subsampled, e.g., using a cross-face boundary neighboring block(s). For example, the neighboring samples of the longer boundary of the rectangular block may be subsampled to have the same number of samples to the shorter boundary. The cross-component linear model prediction described herein may be used to predict between two chroma components (e.g., in the sample domain or in the residual domain). Multiple cross-component linear models may be used at the face boundary, where one or more cross-component linear model predictions may be defined on a range of sample values and may be applied as described herein. If a reconstructed sample(s) is outside of the current face, the reconstructed samples may be obtained, e.g., using geometry padding.

Figure 29B:
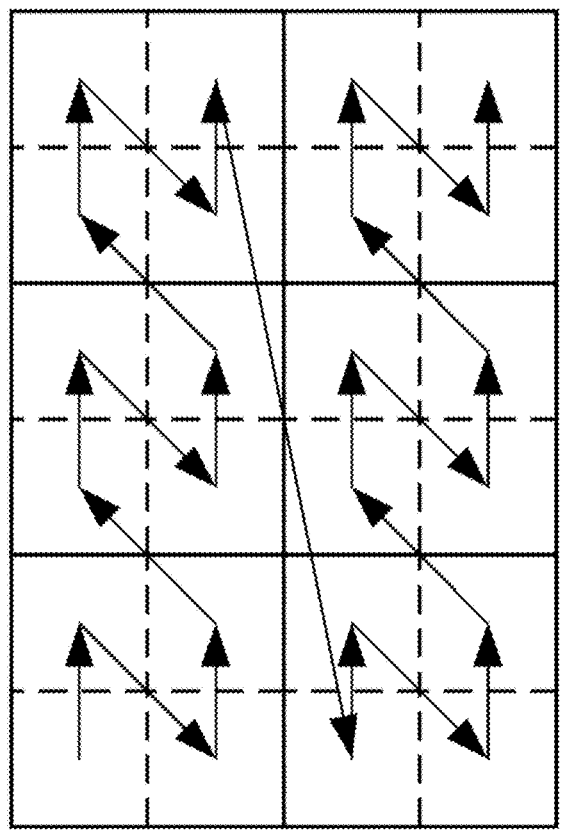
FIGS. 29A-B depicts examples of block processing order for CMP 3×2 packing configuration: (A) raster scan order; and (B) face scan order.
Figure 29A:
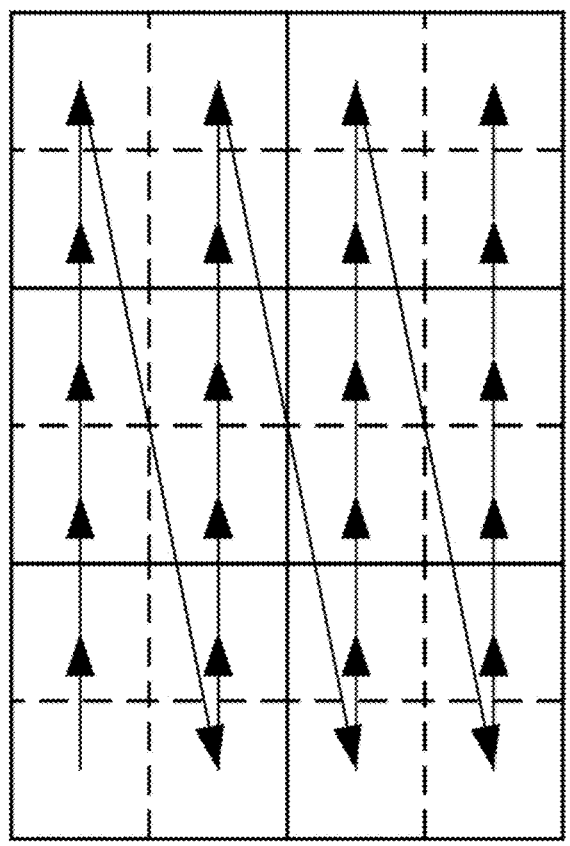

One or more available blocks and/or samples located on the other side of the right and/or bottom face boundaries (e.g., opposite side of a face boundary from the current block location and in the same direction of the coding order relative to the current block or cross-face boundary neighboring block) may be used for prediction. The availability of face neighbor blocks and/or samples may depend on the coding order in which the blocks of the frame packed picture are processed. For example, FIG. 29A depicts an example raster scan order (e.g., from top to bottom and/or from left to right) for CMP 3×2 packing configuration. The blocks may be processed face-by-face, e.g., using a raster scan order within one or more faces (e.g., as illustrated in FIG. 29B). Using the face scan order shown in FIG. 29B may increase the availability of the face neighbor blocks and/or samples. One or more different frame packing configurations may be used to achieve a similar result. For example, in the situation depicted in FIG. 29A, if a 6×1 packing configuration is used (e.g., instead of or in addition to the 3×2 packing configuration), the raster scan order may process one or more faces one by one. The block coding order (e.g., processing order) may be different depending on the used face arrangement.

Figure 30:
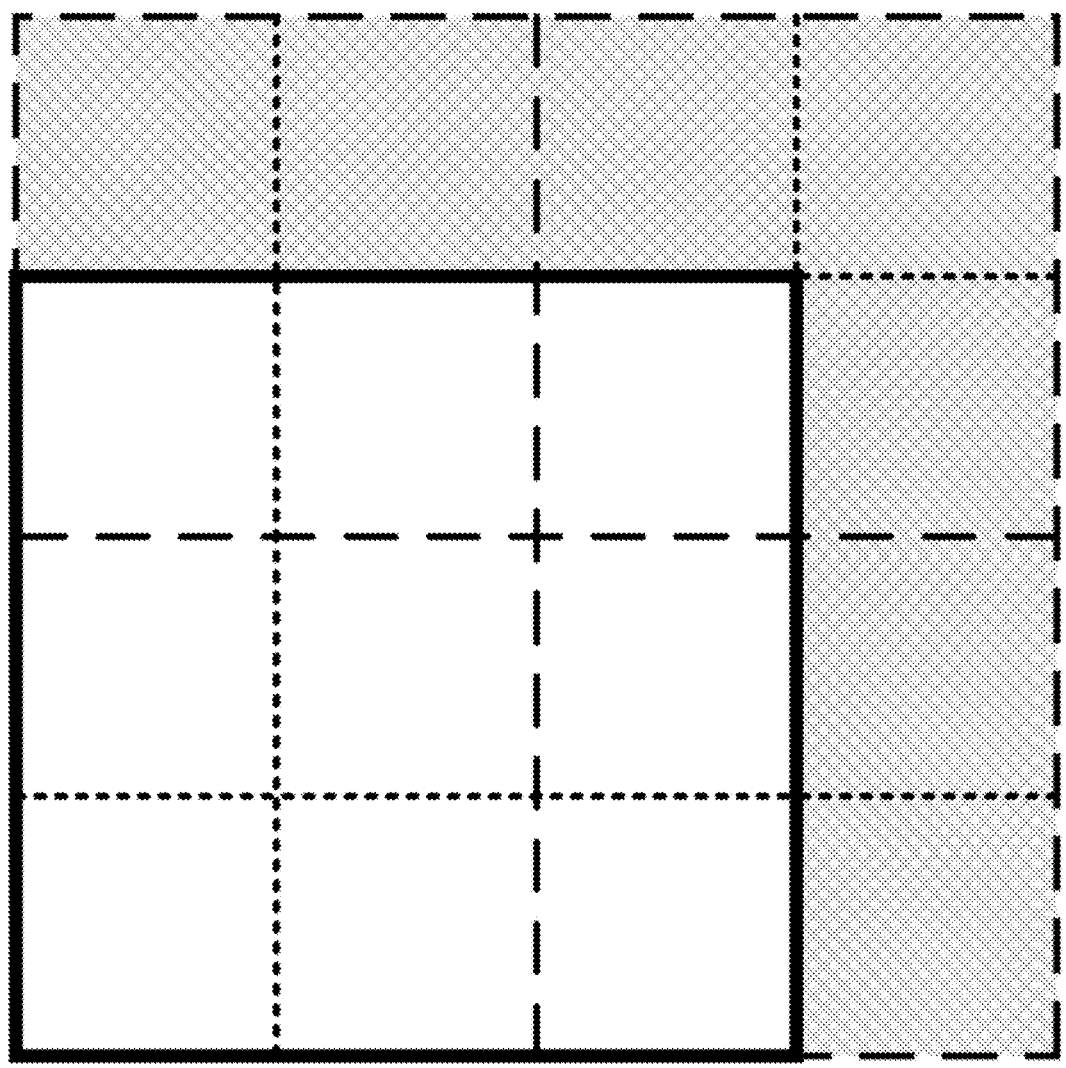
FIG. 30 depicts an example coding tree unit (CTU) and block partitioning.

A constraint(s) may be applied, e.g., during block partitioning. For example, a constraint(s) may be applied during block partitioning to reduce block overlapping over two or more faces. If one or more coding tree units (CTUs) are used, the CTUs may be configured such that one or more (e.g., all) coded blocks within a CTU belongs to the same face. If the face size is not a multiple of the CTU size, the overlapping CTUs may be used where the blocks that are within the face that the CTU belongs to may be coded. FIG. 30 depicts an example CTU and block partitioning of a face where the face size is not a multiple of the CTU size. The solid lines shown in FIG. 30 may represent the face boundaries. The dashed lines may represent the CTU boundaries and the dotted lines may represent the block boundaries. Blocks depicted using a hatched pattern may be located outside of the current face. One or more different block scan orders may be used for the intra and inter coded frames. For example, intra-coded frames may use the face scan order (e.g., FIG. 29B). Inter-coded frames may use the raster scan order (e.g., FIG. 29A). Different scan order(s) between and/or within different faces may be used, e.g., based on the coding mode (e.g., prediction mode) of the face.

Loop filter operation(e.g., as described herein where using neighboring samples from already-coded faces to the right and/or bottom boundaries in loop filtering operations) may be enabled or disabled. For example, loop filter operation may be enabled or disabled based on face scan order and/or frame packing configuration. If proper neighboring samples in the 3D geometry are not used in deblocking filter or other in-loop filters, objectionable visual artefacts in the form of face seams may become visible in the reconstructed video. For example, when the reconstructed video is used to render a viewport and displayed to the user, e.g., via head mount device (HMD) or via 2D screen, face seams may become visible in the reconstructed video. For example, FIG. 18B illustrates a 3×2 CMP example. The 3 faces in the top half shown in FIG. 18B may be horizontally continuous in the 3D geometry. The 3 faces in the bottom half may be horizontally continuous in the 3D geometry. The top half and bottom half may be discontinuous in the 3D geometry. The 3×2 CMP picture may be coded using two tiles (e.g., a tile for the top half and a tile for the bottom half of the 3×2 CMP picture) and loop filtering may be disabled across the tile boundaries. For example, loop filtering may be disabled across the tile boundaries, e.g., by setting the value of the picture parameter set (PPS) syntax element loop_filter_across_tiles_enabled_flag to 0. Loop filtering may be disabled, e.g., to avoid applying deblocking and/or other in-loop filters across the discontinuous edge (e.g., the horizontal edge separating the top and bottom halves).

Face scan order may be used to encode and/or decode the blocks in a frame-packed picture. The 6 faces shown in FIG. 18B may be processed using the order shown in FIG. 29B. Face scan order may be achieved by aligning the 6 faces with 6 tiles. In this case, setting an indicator (e.g., loop_filter_across_tiles_enabled_flag to 0) may cause deblocking and in-loop filters to be disabled across the horizontal edges between tiles (e.g., which may be discontinuous and may be disabled) and across the vertical edges (e.g., which may be continuous and may not be disabled). Whether the edges loop filters are applied or the edges loop filters are not applied may be specified. The type of loop filters may be considered. For example, loop-filters, such as deblocking and/or Adaptive Loop Filters (ALF), may be N-tap filters that use neighboring samples in the filtering process. One or more of the neighboring samples used for the filters may be cross discontinuous edges. Loop-filters, such as Sample Adaptive Offset (SAO), may add an offset to correct the decoded sample value at the current position. In examples, loop-filters (e.g., SAO) may not use neighboring sample values in the filtering operation. Deblocking and/or ALF across some tiles and/or face boundaries may be disabled. SAO may be enabled. For example, deblocking and/or ALF across some tiles and/or face boundaries may be disabled, while SAO may be enabled.

Extensions to an indicator (e.g., loop_filter_across_tiles_enabled_flag) may be indicated (e.g., in a bitstream) to a coding device. The indicator (e.g., loop_filter_across_tiles_enabled_flag) syntax element may be separated. For example, the loop_filter_across_tiles_enabled_flag syntax element may be separated into two or more syntax elements (e.g., two syntax elements). In examples, whether to apply loop filter to the horizontal edges may be indicated, e.g., via a syntax element. In examples, whether to apply loop filter to the vertical edges may be indicated, e.g., via a syntax element.

The indicator (e.g., loop_filter_across_tiles_enabled_flag) syntax element may be separated into two or more syntax elements may be indicated (e.g., in a bitstream) to a coding device. Whether to enable or disable loop filters across a given edge may be indicated, e.g., via the two or more separated syntax elements. For example, the frame-packed projection format including M×N faces (e.g., FIG. 18B where M=3 and N=2) may be considered. In the frame-packed projection format including M×N faces, (M−1)×N vertical edges between faces in the picture may exist, and M×(N−1) horizontal edges between faces in the picture may exist. In this case, (M−1)×N+M×(N−1) indications (e.g., flags) may specify whether to enable or disable one or more of the horizontal and/or vertical edges. The semantics of the indicator (e.g., loop_filter_across_tiles_enabled_flag) syntax element may be adapted to disable or enable loop filters across edges between continuous faces. In this case, loop filters may be disabled across edges between discontinuous faces, e.g., to avoid the occurrence of seam. Signaling may be configured to specify which edges are between continuous faces and/or which edges are between discontinuous faces.

The indicator (e.g., loop_filter_across_tiles_enabled_flag) syntax element may be separated into two or more syntax elements. The two or more syntax elements may be used to control a different type of loop filter. For example, an indication (e.g., flag) may be used to enable or disable deblocking. An indication (e.g., flag), for example, may be used to enable or disable ALF. An indication (e.g., flag), for example, may be used to enable or disable SAO. If more loop filters are used in the video encoder and/or decoder (e.g., shown in FIG. 7 and FIG. 8), more indication (e.g., flags) may be used. The indicator (e.g., loop_filter_across_tiles_enabled_flag) syntax element may be separated (e.g., into two syntax elements). For example, an indication (e.g., flag) may be controlling loop filters that use neighboring samples. A different indication (e.g., flag), for example, may be controlling loop filters that do not use neighboring samples. The indicator (e.g., loop_filter_across_tiles_enabled_flag) syntax element may indicate whether to disable or enable loop filters that use neighboring samples. In this case, loop filters that do not use neighboring samples may be enabled.

The extensions described herein may be combined. For example, if multiple indications (e.g., flags) are used, one or more indications (e.g., flags) may be used for controlling a type of loop filter, and the semantics of the one or more indications (e.g., flags) may be adapted accordingly. For example, the semantics of the one or more indications may be adapted to control whether to apply that filter to edges across continuous faces, and that filter may be disabled for edges across discontinuous faces (e.g., to avoid the occurrence of seam).

The extensions to the indicator (e.g., loop_filter_across_tiles_enabled_flag) described herein may be using tiles as an exemplary manner. Those skilled in the art would appreciate that they may apply to other face levels (e.g., slices). For example, pps_loop_filter_across_slices_enabled_flag and/or slice_loop_filter_across_slices_enabled_flag, which control whether to apply loop filters across slides may be used as an indicator (e.g., different indicator). As the coded blocks within a CTU belong to the same tile and/or slice, the tile and/or slice size may be a multiple of the CTU size. The face size may not be a multiple of the CTU size. Tiles and/or slices described herein may be replaced with faces (e.g., to avoid using tiles and/or slices and to change the semantic described herein). For example, an indicator (e.g., loop_filter_across_tiles_enabled_flag) syntax described herein and its one or more extensions may be replaced with (e.g., or used in conjunction with) a different indicator (e.g., loop_filter_across_faces_enabled_flag). Face-based loop filter control indications (e.g., flags) may work when tiles and/or slices are enabled. In this case, such face-based loop filter control indications (e.g., flags) may be applicable to edges on face boundaries, and the tile and/or slice-based loop filter control indications (e.g., flags) may be applied to edges on tile and/or slice boundaries.

Overlapping CTUs such that one or more (e.g., all) coded blocks within a CTU belonging to the same face and the blocks that are within the face that the CTU belongs to may be coded. In this way, tiles and/or slices may be used (e.g., even if the face size is not a multiple of the CTU size).

Figure 31:
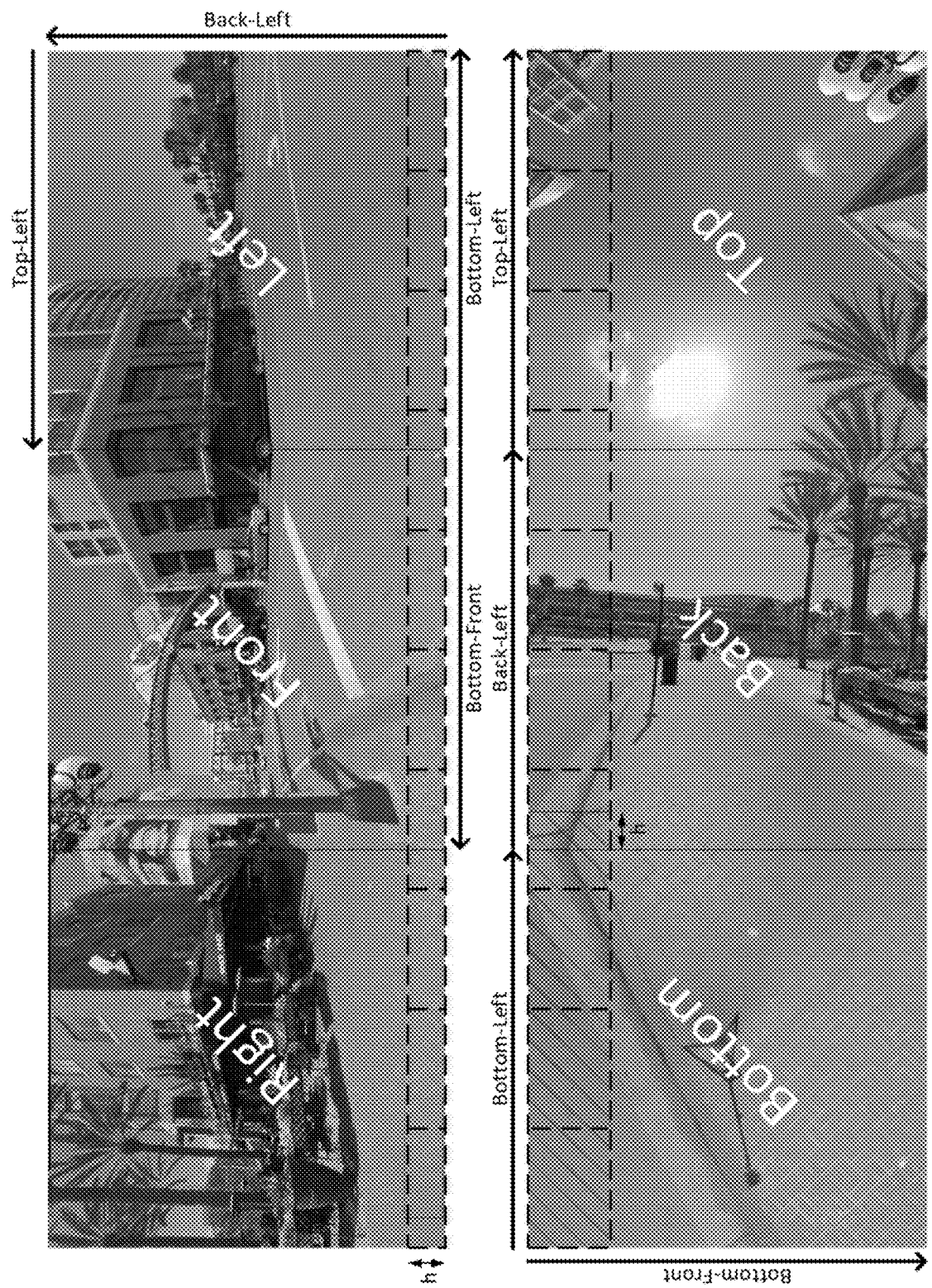
FIG. 31 depicts an example 3×2 packing configuration. The dashed lines may represent the CTU boundaries, and the arrows may represent the shared boundary between two faces.

For CMP and/or related cube-based geometries, 3×2 packing configuration may be used. For example, the 3×2 packing configuration may be used for a representation (e.g., compact representation) and may form a rectangular frame packed picture. The 3×2 packing configuration may skip filling the empty regions with default (e.g., void) samples to form a rectangular frame packed picture (e.g., 4×3 packing configuration) shown in FIG. 2B. One or more faces of the 3×2 packing configuration may be arranged such that the discontinuity between two neighboring faces in the frame picture may be reduced. A 3×2 packing configuration may be defined such that the right, front, and left faces may be placed in the top row (e.g., in this particular order), and the bottom, back, and top faces may be placed in the bottom row (e.g., in this particular order), as depicted in FIG. 31. FIG. 31 illustrates an example 3×2 packing configuration (e.g., having the right, front, and left faces placed in the top row and the bottom, back, and top faces placed in the bottom row). The dashed lines from FIG. 31 may represent the CTU boundaries. The arrow may represent the shared boundary between two faces. Within a face row (e.g., each face row), the faces may rotated. For example, the face row may rotate to minimize the discontinuities between two neighboring faces. The face size may not be a multiple of the CTU size. Part of the second face row may be coded, e.g., before the first face row is fully coded. When coding one or more blocks in the bottom, back, and top faces, neighboring blocks in the right, front, and/or left faces may not be available. For example, for the 3×2 packing configuration depicted in FIG. 31, when encoding the blocks in the first (e.g., partial) CTU row of the bottom face (e.g., shaded area in FIG. 31), information may not be inferred from the neighboring blocks in the front and left faces, as the corresponding neighboring blocks may not have been encoded yet. Similarly, for the back face, the first blocks within a width of size h=mod(face size, CTU size), where mod(x,y) may be the modulo operator, in the first (e.g., partial) CTU row (e.g., shaded area in FIG. 31) may not infer information from the neighboring blocks in the left face, as the corresponding neighboring blocks may not have been encoded yet.

Figure 32:
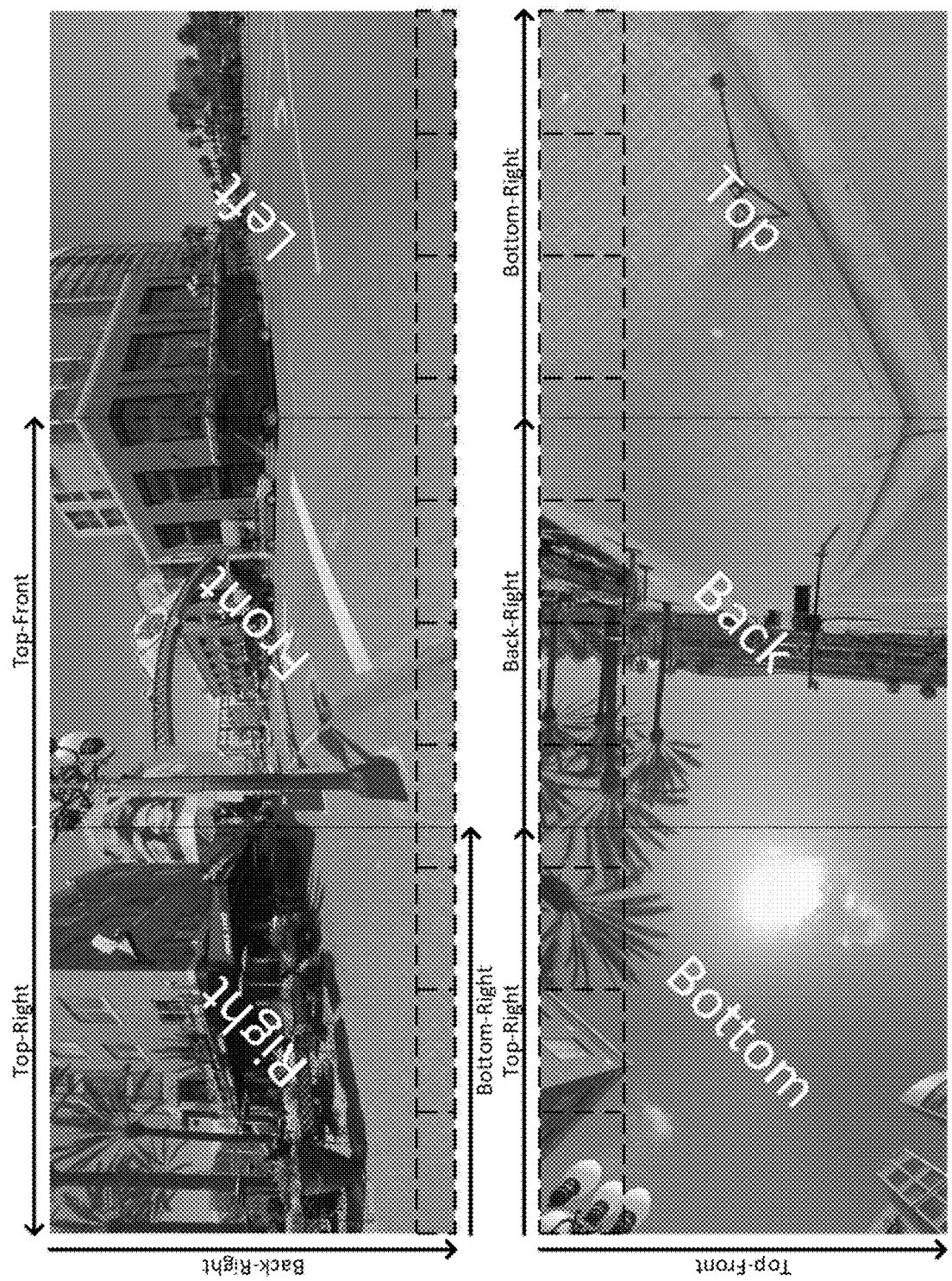
FIG. 32 depicts an example 3×2 packing configuration as described herein. The dashed lines may represent the CTU boundaries, and the arrows may represent the shared boundary between two faces.

A 3×2 packing configuration may be used and/or signaled in a bitstream, e.g., to/from a coding device. For example, when 3×2 packing configuration described herein is used, information from one or more neighboring faces in the first face row may be inferred for the faces located in the second face row. The 3×2 packing configuration may be defined such that the right, front, and left faces are placed in the first face row (e.g., in this particular order), and the top, back, and bottom faces are placed in the second face row (e.g., in this particular order), as depicted in FIG. 32. FIG. 32 illustrates an example 3×2 packing configuration (e.g., having the right, front, and left faces in the first face row and the top, back, and bottom faces in the second face row). Within a face row (e.g., each face row), the faces may be rotated, e.g., to minimize the discontinuities between two neighboring faces. For the 3×2 packing configuration shown in FIG. 32, one or more faces in the second face row may be rotated by 180 degrees (e.g., in comparison to the 3×2 packing configuration illustrated in FIG. 31). With the configuration shown in FIG. 32, neighboring blocks in the right, front, and left faces may be available when encoding the top, back, and bottom faces.

The definition of front, back, left, right, top, and/or bottom faces described herein may be relative. Rotation may be applied to the cube to get a similar arrangement as described herein.

Figure 33A:
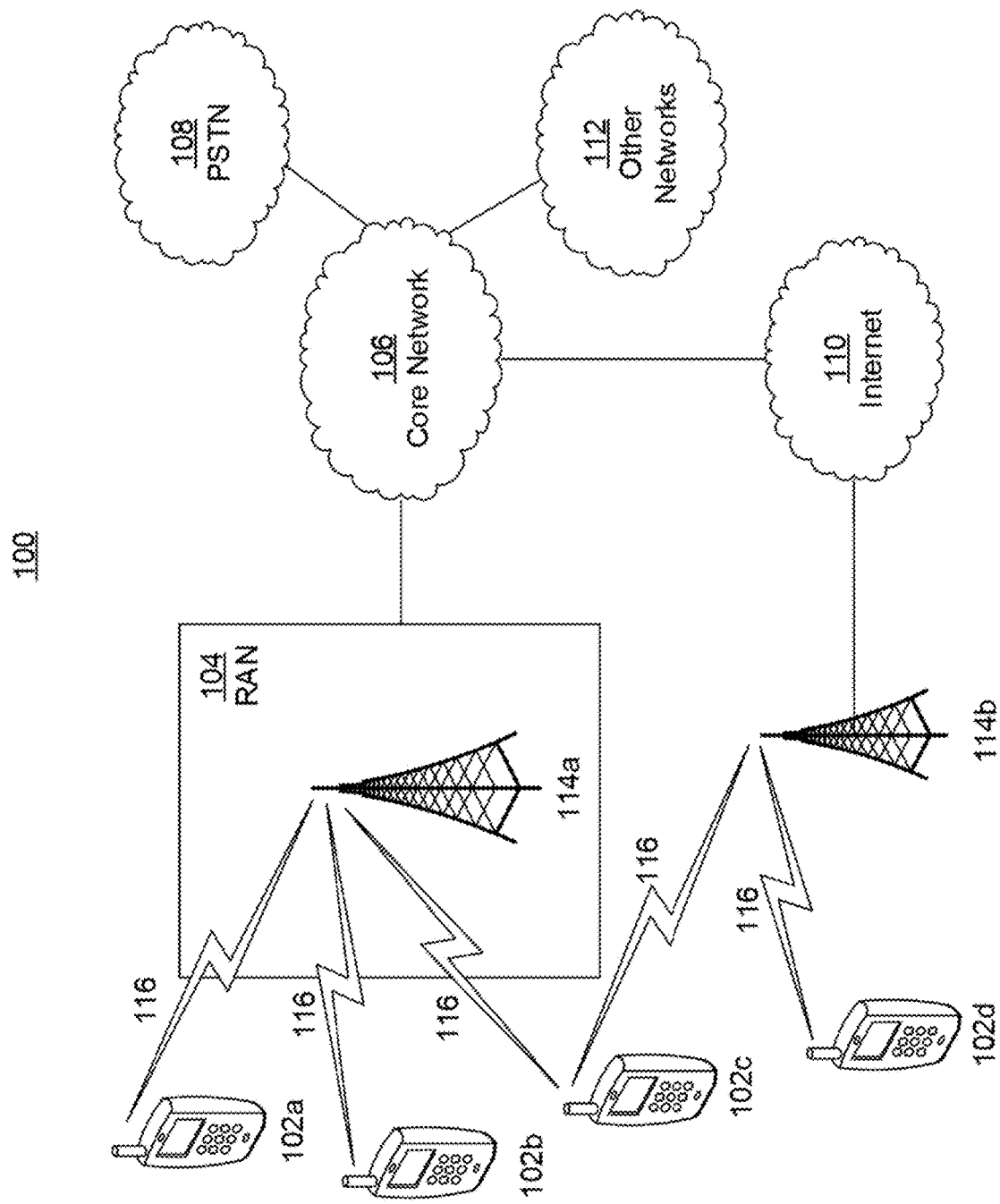
FIG. 33A is a system diagram illustrating an example communications system in which one or more disclosed embodiments may be implemented.

FIG. 33A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 33A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 33A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 33A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 33A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 33A may be configured to communicate with the base station 114a, which may employ a cellular-based radio technology, and with the base station 114b, which may employ an IEEE 802 radio technology.

Figure 33B:
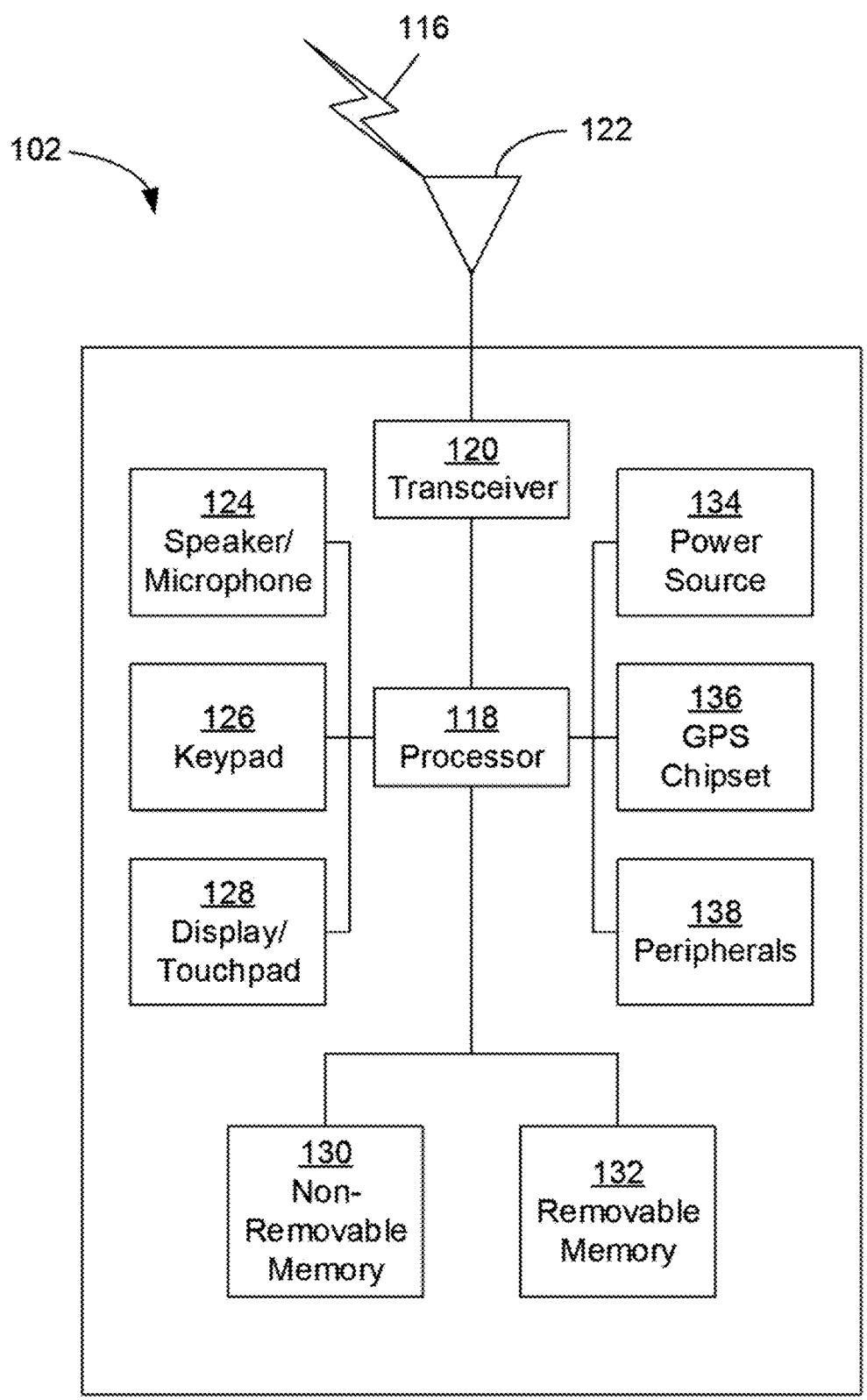
FIG. 33B is a system diagram illustrating an example wireless transmit/receive unit (WTRU) that may be used within the communications system illustrated in FIG. 33A according to an embodiment.

FIG. 33B is a system diagram illustrating an example WTRU 102. As shown in FIG. 33B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 33B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 33B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 33C:
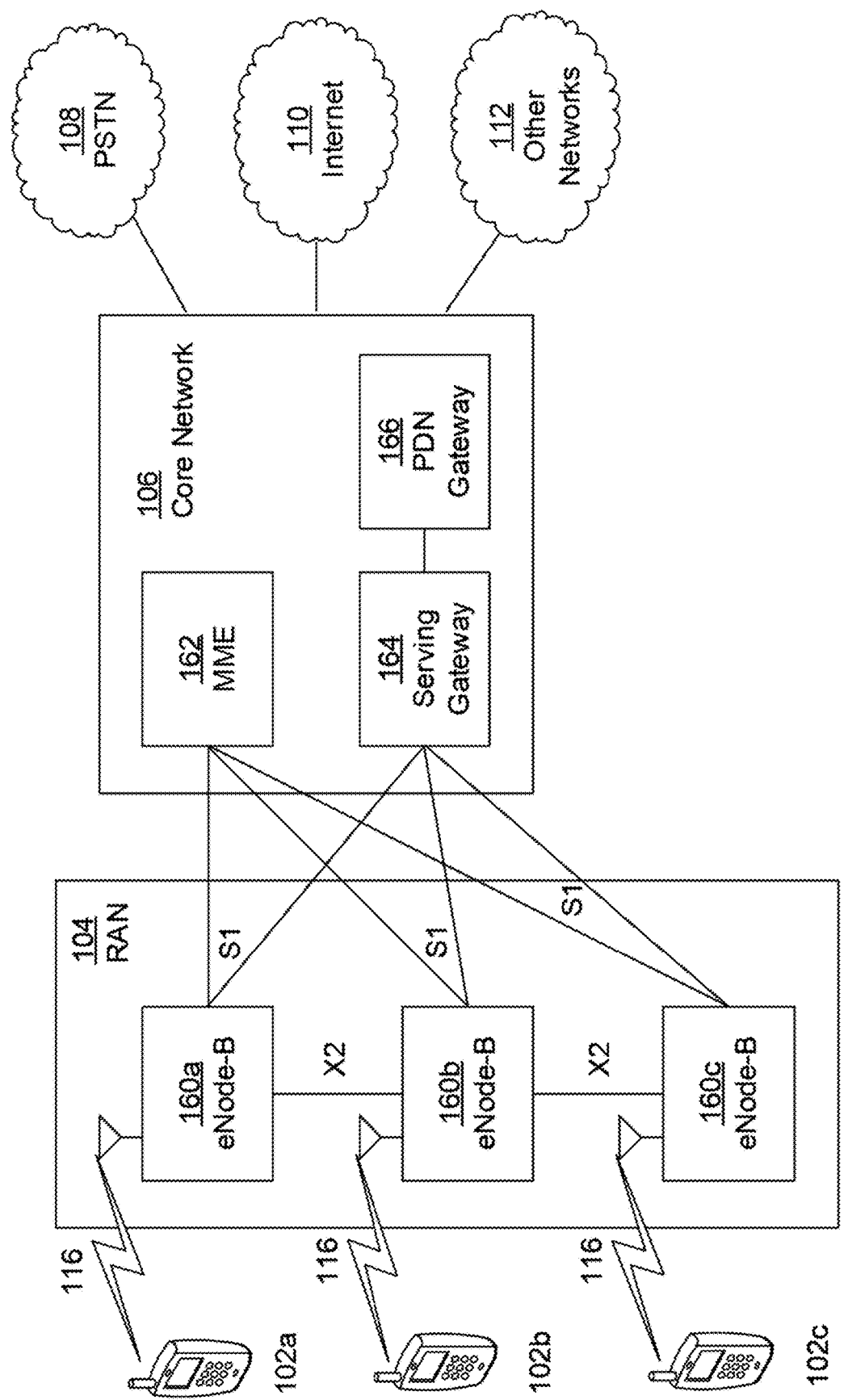
FIG. 33C is a system diagram illustrating an example radio access network (RAN) and an example core network (CN) that may be used within the communications system illustrated in FIG. 33A according to an embodiment.

FIG. 33C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 33C, the eNode-Bs 160a, 160b, 160c may communicate with one another over an X2 interface.

The CN 106 shown in FIG. 33C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 33A-33D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 33D:
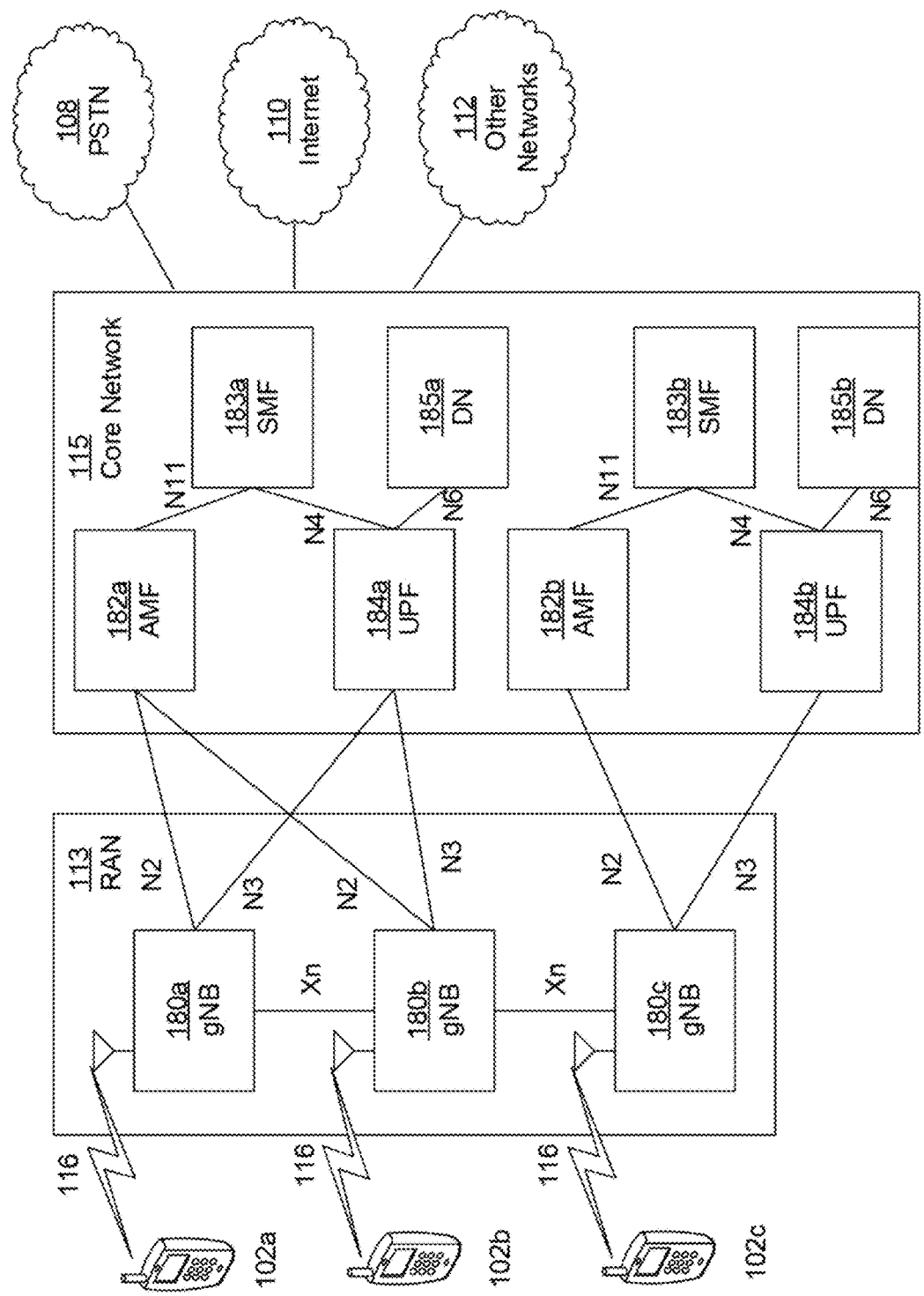
FIG. 33D is a system diagram illustrating a further example RAN and a further example CN that may be used within the communications system illustrated in FIG. 33A according to an embodiment.

FIG. 33D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 33D, the gNBs 180a, 180b, 180c may communicate with one another over an Xn interface.

The CN 115 shown in FIG. 33D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 33A-33D, and the corresponding description of FIGS. 33A-33D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

What is claimed:

1. A method of decoding comprising:
obtaining a picture in video data, wherein the picture is associated with a 360-degree video;
determining that the picture comprises a plurality of faces;

based on the determination that the picture comprises the plurality of faces, identifying a first face in the picture to which a current sample belongs to;

determining that the current sample is located at a boundary of the first face;

based on the determination that the current sample is located at the boundary of the first face, identifying a second face in the picture, wherein the second face shares the boundary of the first face;

identifying a sample in the second face for predicting the current sample, wherein the sample in the second face is available for predicting the current sample is determined based on a coding order, wherein the coding order comprises at least one of a first coding order, a second coding order, or a third coding order, wherein the first coding order is from left to right direction relative to the current sample, wherein the second coding order is from top to bottom direction relative to the current sample, and wherein the third coding order is left to right and top to bottom direction relative to the current sample;

determining that the identified sample in the second face is available; and based on the determination that the sample in the second face is available, predicting the current sample using the sample from the second face.

2. The method of claim 1, wherein the boundary corresponds to a cross-face boundary neighboring the first face to the second face.

3. The method of claim 1, wherein the first face is a spherical neighboring face to the second face and the boundary between the first face and the second face is a spherical boundary.

4. The method of claim 1, wherein the sample in the second face is available for predicting the current sample is determined based on a face scanning order associated with the plurality of faces.

5. The method of claim 4, wherein the face scanning order indicates decoding samples in the second face before decoding samples in the first face.

6. The method of claim 1, wherein the method comprises:
identifying a plurality of spherical neighboring faces of the first face, wherein the second face is identified based on the identified plurality of spherical neighboring faces.

7. The method of claim 1, wherein the method comprises:
based on the determination that the sample in the second face is available, enabling a loop filtering across the boundary between the first face and the second face, wherein the loop filtering comprises at least one of an in-loop filtering, a sample adaptive offset (SAO) filtering, a deblocking filtering, or an adaptive loop filtering (ALF).

8. The method of claim 1, wherein the method comprises:
based on the determination that the current sample is located at the boundary of the first face, identifying a third face in the picture, wherein the first face is a spherical neighboring face to the third face and the boundary between the first face and the third face is a spherical boundary;

identifying a sample in the third face for predicting the current sample;

determining whether the identified sample in the third face is available; and based on a determination that the sample in the third face is unavailable, disabling a loop filtering across the boundary between the first face and the third face, wherein the loop filtering comprises at least one of an in-loop filtering, a sample adaptive offset (SAO) filtering, a deblocking filtering, or an adaptive loop filtering (ALF).

9. A device for video decoding comprising:
a processor configured to:
obtain a picture in video data, wherein the picture is associated with a 360-degree video;

determine that the picture comprises a plurality of faces;

based on the determination that the picture comprises the plurality of faces, identify a first face in the picture to which a current sample belongs to;

determine that the current sample is located at a boundary of the first face;

based on the determination that the current sample is located at the boundary of the first face, identify a second face in the picture, wherein the second face shares the boundary of the first face;

identify a sample in the second face for predicting the current sample, wherein the sample in the second face is available for predicting the current sample is determined based on a coding order, wherein the coding order comprises at least one of a first coding order, a second coding order, or a third coding order, wherein the first coding order is from left to right direction relative to the current sample, wherein the second coding order is from top to bottom direction relative to the current sample, and wherein the third coding order is left to right and top to bottom direction relative to the current sample;

determine that the identified sample in the second face is available; and based on the determination that the sample in the second face is available, predict the current sample using the sample from the second face.

10. The device of claim 9, wherein the boundary corresponds to a cross-face boundary neighboring the first face to the second face.

11. The device of claim 9, wherein the first face is a spherical neighboring face to the second face and the boundary between the first face and the second face is a spherical boundary.

12. The device of claim 9, wherein the sample in the second face is available for predicting the current sample is determined based on a face scanning order associated with the plurality of faces.

13. The device of claim 12, wherein the face scanning order indicates decoding samples in the second face before decoding samples in the first face.

14. The device of claim 9, wherein the processor is configured to:
identify a plurality of spherical neighboring faces of the first face, wherein the second face is identified based on the identified plurality of spherical neighboring faces.

15. The device of claim 9, wherein the processor is configured to:
based on the determination that the sample in the second face is available, enable a loop filtering across the boundary between the first face and the second face, wherein the loop filtering comprises at least one of an in-loop filtering, a sample adaptive offset (SAO) filtering, a deblocking filtering, or an adaptive loop filtering (ALF).

16. The device of claim 9, wherein the processor is configured to:

based on the determination that the current sample is located at the boundary of the first face, identify a third face in the picture, wherein the first face is a spherical neighboring face to the third face and the boundary between the first face and the third face is a spherical boundary;

identify a sample in the third face for predicting the current sample;

determine whether the identified sample in the third face is available; and based on a determination that the sample in the third face is unavailable, disable a loop filtering across the boundary between the first face and the third face, wherein the loop filtering comprises at least one of an in-loop filtering, a sample adaptive offset (SAO) filtering, a deblocking filtering, or an adaptive loop filtering (ALF).

* * * * *